US011897255B2

(12) United States Patent
Mizushima et al.

(10) Patent No.: US 11,897,255 B2
(45) Date of Patent: *Feb. 13, 2024

(54) RECORDING APPARATUS AND RECORDING SYSTEM

(71) Applicant: SEIKO EPSON CORPORATION, Tokyo (JP)

(72) Inventors: Nobuyuki Mizushima, Shiojiri (JP); Kazuyoshi Ohashi, Matsumoto (JP); Akinori Muromachi, Matsumoto (JP); Kohei Ueno, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 17/243,925

(22) Filed: Apr. 29, 2021

(65) Prior Publication Data

US 2021/0245526 A1 Aug. 12, 2021

Related U.S. Application Data

(63) Continuation of application No. 16/232,822, filed on Dec. 26, 2018, now Pat. No. 11,040,551.

(30) Foreign Application Priority Data

Dec. 27, 2017 (JP) ................................ 2017-252038
Dec. 27, 2017 (JP) ................................ 2017-252075
Feb. 20, 2018 (JP) ................................ 2018-027841

(51) Int. Cl.
*B41J 11/00* (2006.01)
*B41J 13/02* (2006.01)
*B41J 3/60* (2006.01)

(52) U.S. Cl.
CPC ......... *B41J 11/00242* (2021.01); *B41J 13/02* (2013.01); *B41J 3/60* (2013.01)

(58) Field of Classification Search
CPC .... B41J 11/00242; B41J 3/60; B41J 11/0024; B41J 11/002; B41J 13/02
See application file for complete search history.

(56) References Cited

U.S. PATENT DOCUMENTS

| | | | | |
|---|---|---|---|---|
| 9,950,545 | B2 | 4/2018 | Yoshinuma | |
| 11,040,551 | B2 * | 6/2021 | Mizushima | B41J 13/02 |

(Continued)

FOREIGN PATENT DOCUMENTS

| | | |
|---|---|---|
| EP | 2141551 | 1/2010 |
| JP | H03-151239 | 6/1991 |

(Continued)

*Primary Examiner* — Jannelle M Lebron
(74) *Attorney, Agent, or Firm* — WORKMAN NYDEGGER

(57) ABSTRACT

A recording unit which is provided in a recording system includes a heat roller pair which contacts paper and performs drying of the paper after recording by a line head using heating and a control unit which controls operation of the heat roller pair, in which a heating region of the heat roller pair is divided into a plurality of subdivisions in a width direction which intersects the medium transport direction and the heat roller pair is configured to be capable of modifying a heating state for each subdivision region, and in which the control unit controls the heating state of each of the subdivision regions in the heat roller pair according to conditions when performing drying of the paper using the heat roller pair.

20 Claims, 17 Drawing Sheets

(56) References Cited

U.S. PATENT DOCUMENTS

| | | | |
|---|---|---|---|
| 2004/0141038 | A1 | 7/2004 | Takagi et al. |
| 2004/0141039 | A1 | 7/2004 | Choi et al. |
| 2009/0073211 | A1 | 3/2009 | Imoto |
| 2010/0192792 | A1 | 8/2010 | Hall et al. |
| 2012/0249704 | A1 | 10/2012 | Kato |
| 2014/0354728 | A1 | 12/2014 | Murata et al. |
| 2017/0087874 | A1 | 3/2017 | Maida |

FOREIGN PATENT DOCUMENTS

| | | |
|---|---|---|
| JP | 2000-275990 | 10/2000 |
| JP | 2003-151722 | 5/2003 |
| JP | 2003-267595 | 9/2003 |
| JP | 2004-122724 | 4/2004 |
| JP | 2007-144830 | 6/2007 |
| JP | 2008-179012 | 8/2008 |
| JP | 2009-012414 | 1/2009 |
| JP | 2009-066905 | 4/2009 |
| JP | 2009-083355 | 4/2009 |
| JP | 2010-033018 | 2/2010 |
| JP | 2011-025614 | 2/2011 |
| JP | 2011-225315 | 11/2011 |
| JP | 2011-230465 | 11/2011 |
| JP | 2012-210758 | 11/2012 |
| JP | 2014-233879 | 12/2014 |
| JP | 2015-047729 | 3/2015 |
| JP | 2017-065160 | 4/2017 |
| JP | 2017-132636 | 8/2017 |

* cited by examiner

RECORDING APPARATUS AND RECORDING SYSTEM

CROSS REFERENCES TO RELATED APPLICATIONS

The present application is a continuation of U.S. patent application Ser. No. 16/232,822, filed Dec. 26, 2018, which claims the benefit of and priority to JP Patent Application Nos. 2018-027841, filed Feb. 20, 2018, 2017-252038, filed Dec. 27, 2017, and 2017-252075, filed Dec. 27, 2017, the entire disclosures of which are hereby incorporated by reference in their entireties.

BACKGROUND

1. Technical Field

The present disclosure relates to a recording apparatus which includes a recording section which discharges a liquid onto a medium which is transported to perform recording, and to a recording system which includes the recording apparatus which includes the recording section.

2. Related Art

In a recording apparatus which is represented by an ink jet printer and includes a recording section which discharges (ejects) a liquid (an ink) onto a medium to perform recording, when the drying of the medium after the recording is insufficient, the following problems may occur.

For example, there is a case in which the medium curls such that a recording surface faces the outside, the medium which is curled catches easily in the transport path, and there is a concern that the medium will cause jamming. The medium which contains a liquid component has reduced rigidity, catches easily in the transport path, and there is a concern that the medium will cause jamming. There is also a concern that the liquid which is not completely dried will adhere to a transport unit such as a roller.

In order to avoid these problems, there is proposed a recording apparatus which is provided with a heating unit in the transport path after the recording by the recording section and which is configured to evaporate the liquid which is ejected onto the medium (for example, JP-A-2012-210758). The heating unit described in JP-A-2012-210758 is configured by a pair of rollers which are heated by a heater. According to the heating unit of this configuration, it is possible to perform the drying of the medium in a short time.

Here, since the drying of the medium by the heating unit requires comparatively great power consumption, when the drying by the drying unit is performed, the running cost of the recording apparatus increases.

Incidentally, the distribution of the liquid component in the medium after the recording changes according to the recording content, and it not necessarily uniform.

When a medium in which a region having a large liquid component and a region having a small liquid component are both present is dried using a drying unit in a uniform heating state, drying marks may be formed.

When the drying is performed using a drying unit in which the heating state is matched to the region having a large liquid component in order to suppress the drying marks, greater heating than necessary is performed on the region having a small liquid component and the running cost increases.

SUMMARY

An advantage of some aspects of the disclosure is to provide a recording apparatus which takes into consideration both suitable drying of a medium after the recording and suppressing the running cost, and a recording system which includes the recording apparatus.

According to an aspect of the disclosure, there is provided a recording apparatus which includes a recording section which discharges a liquid onto a medium which is transported to perform recording, a drying unit which contacts the medium and performs drying of the medium after the recording by heating the medium, and a control unit which controls operation of the drying unit, in which the drying unit is configured such that a heating region is divided into a plurality of subdivisions in a width direction which intersects a medium transport direction and to be capable of modifying a heating state for each subdivision region, and in which the control unit controls the heating state of each subdivision region in the drying unit according to conditions when performing drying of the medium using the drying unit.

Accordingly, since the drying unit is configured such that a heating region is divided into a plurality of subdivisions in a width direction which intersects a medium transport direction and to be capable of modifying a heating state for each subdivision region, and the control unit controls the heating state of each subdivision region in the drying unit according to conditions when performing drying of the medium using the drying unit, it is possible to suppress wasteful power consumption.

For example, as long as the conditions when performing the drying of the medium are conditions under which it is not necessary to achieve a uniform heating state of the heating unit along the entirety thereof in the width direction, it is possible to suppress the power consumption in the drying unit by setting the heating states in a portion of the subdivision regions among the plurality of subdivision regions to a low temperature, not heating the portion of the subdivision regions, or the like.

In the present specification, the expression "perform the drying" is not limited to a case in which the drying is performed until the medium contained in the medium is completely eliminated, and includes reducing the moisture contained in the medium and obtaining a state in which there is less humidity than before performing the drying. The expression "suppress the power consumption" includes a case in which power is not consumed.

In the recording apparatus, using a size of the medium in the width direction as a condition when performing the drying, the control unit may set the heating state of the subdivision regions corresponding to regions other than end portions in the width direction to a first state, and may set the heating state of the subdivision regions corresponding to the end portions in the width direction of the medium to a second state in which more heating is performed than the first state.

When the drying of the end portions in the width direction of the medium is insufficient, there is a concern that the end portions will lift up easily and the end portions will be scuffed or catch on the inside of the transport path.

In the recording apparatus, since, using a size of the medium in the width direction as a condition when performing the drying, the control unit sets the heating state of the subdivision regions corresponding to regions other than end portions in the width direction to a first state, and sets the heating state of the subdivision regions corresponding to the end portions in the width direction of the medium to a second state in which more heating is performed than the first state, it is possible to reliably perform the drying of the end portion in the width direction of the medium and to reduce the concern of problems caused by the end portions lifting up occurring.

In the recording apparatus, using a discharge amount of the liquid as the condition when performing the drying, in the width direction of the medium, the control unit may set the heating state of the subdivision regions corresponding to a recording region in which the discharge amount of the liquid is less than or equal to a predetermined threshold value to the first state, and may set the heating state of the subdivision regions corresponding to a recording region in which the discharge amount of the liquid exceeds the predetermined threshold value to the second state in which more heating is performed than the first state.

Accordingly, since, using a discharge amount of the liquid as the condition when performing the drying, in the width direction of the medium, the control unit sets the heating state of the subdivision regions corresponding to a recording region in which the discharge amount of the liquid is less than or equal to a predetermined threshold value to the first state, and sets the heating state of the subdivision regions corresponding to a recording region in which the discharge amount of the liquid exceeds the predetermined threshold value to the second state in which more heating is performed than the first state, it is possible to reliably perform the drying of the medium in the second state, it is possible to suppress the power consumption in the first state to perform the suppression of the running cost.

In the recording apparatus, the drying unit may be configured to include a roller pair which pinches the medium between a first roller and a second roller and may be configured such that at least one of the first roller and the second roller is heated.

Accordingly, in the configuration in which the drying unit is configured to include a roller pair which pinches the medium between a first roller and a second roller and is configured such that at least one of the first roller and the second roller is heated, the same operational effects may be obtained as in the configurations described above.

In the recording apparatus, of the first roller and the second roller, a plurality of the rollers that are heated may be disposed in the width direction and may be configured to be capable of individually controlling the heating state.

Accordingly, since, of the first roller and the second roller, a plurality of the rollers that are heated is disposed in the width direction and is configured to be capable of individually controlling the heating state, it is possible to divide the heating region of the heating unit into a plurality of subdivisions in the width direction and it is possible to easily form the configuration which enables the modification of the heating state for each subdivision region.

In the recording apparatus, of the first roller and the second roller, the rollers that are heated may be provided to extend along an entirety of the width direction and may be configured to be capable of partially modifying the heating state in the width direction.

Accordingly, since, of the first roller and the second roller, the rollers that are heated are provided to extend along an entirety of the width direction and are configured to be capable of partially modifying the heating state in the width direction, it is possible to divide the heating region of the heating unit into a plurality of subdivisions in the width direction and it is possible to easily obtain the configuration which enables the modification of the heating state for each subdivision region.

In the recording apparatus, of the first roller and the second roller, at least two of the rollers that are heated may be disposed in the width direction and may be configured such that each is capable of moving in the width direction.

Accordingly, since, of the first roller and the second roller, at least two of the rollers that are heated are disposed in the width direction and are configured such that each is capable of moving in the width direction, it is possible to divide the heating region of the heating unit into a plurality of subdivisions in the width direction and it is possible to obtain the configuration which enables the modification of the heating state for each subdivision region.

In the recording apparatus, the roller pair may be configured to be capable of switching between a pinching state in which it is possible to pinch the medium between the first roller and the second roller and a separated state in which the first roller and the second roller are separated from each other.

Accordingly, since the roller pair is configured to be capable of switching between a pinching state in which it is possible to pinch the medium between the first roller and the second roller and a separated state in which the first roller and the second roller are separated from each other, it is possible to reduce the degree to which the liquid of the recording surface adheres to the roller pair by setting the roller pair to the separated state in a case in which there is a great concern that the liquid of the recording surface will adhere to the roller pair (in a case such as in the middle of heating the roller pair), for example.

In the recording apparatus, in a case in which the roller pair does not reach a target heating state, the control unit may set the roller pair to the separated state, and in a case in which the roller pair reaches the target heating state, the control unit may set the roller pair to the pinching state.

For example, if a state in which the roller pair which serves as the drying unit reaches a temperature which is suitable for performing the drying of the medium is set to a target heating state, when the medium contacts the roller pair in a state in which the roller pair does not reach the target heating state, there is a concern that the liquid of the recording surface will adhere to the roller pair.

Accordingly, since, in a case in which the roller pair does not reach a target heating state, the control unit sets the roller pair to the separated state, and in a case in which the roller pair reaches the target heating state, the control unit sets the roller pair to the pinching state, it is possible to suppress the concern that the medium will contact the roller pair in a state in which the roller pair does not reach the target heating state and that the liquid of the recording surface will adhere to the roller pair.

In the recording apparatus, in the pinching state of the roller pair, both the first roller and the second roller may proceed to a medium transport path, and in the separated state of the roller pair, both the first roller and the second roller pair may withdraw from the medium transport path.

Accordingly, since a configuration is adopted in which in the separated state of the roller pair, both the first roller and the second roller pair withdraw from the medium transport path, it is possible to more reliably reduce the concern of the liquid of the recording surface adhering to the roller pair in the separated state.

In the recording apparatus, the first roller may be provided on a side of a most recent recording surface of the medium, may be provided to be capable of proceeding and withdrawing with respect to a medium transport path, and may separate from the medium transport path in the separated state, a spur capable of proceeding and withdrawing with respect to the medium transport path may be provided on the side of the most recent recording surface of the medium, and the spur may assume a state of progressing to the medium transport path to pinch the medium between the spur and the second roller in a state in which the first roller is separated from the medium transport path.

Accordingly, since the spur which is capable of pinching the medium between the spur and the second roller instead of between the first roller and the second roller in the separated state of the roller pair proceeds into the medium transport path to pinch the medium, it is possible to transport the medium using the second roller and the spur even in the separated state of the roller pair.

The recording apparatus may further include a plurality of downstream side transport paths which branch at a branching portion positioned on a downstream side of the recording section, in which the drying unit may be provided in a medium transport path between the recording section and the branching portion.

Accordingly, since the drying unit is provided in the medium transport path between the recording section and the branching portion, in a configuration which is provided with a plurality of downstream side transport paths, it is possible to dry the medium after the recording using the single drying unit, and it is possible to obtain a suppression of an increase in the size of the apparatus and a suppression of an increase in the cost of the apparatus.

The recording apparatus may further include a plurality of downstream side transport paths which branch at a branching portion positioned on a downstream side of the recording section, in which the drying units may be provided in each of the plurality of downstream side transport paths and may be individually controlled by the control unit.

Accordingly, since the recording apparatus further includes a plurality of downstream side transport paths which branch at a branching portion positioned on a downstream side of the recording section and the drying units are provided in each of the plurality of downstream side transport paths and are individually controlled by the control unit, it is possible to perform the drying of the medium under conditions which are suitable for each of the downstream side transport paths, it is possible to appropriately dry the medium, and it is possible to suppress the power consumption.

According to another aspect of the disclosure, there is provided a recording system which includes a recording unit which includes a recording section which discharges a liquid onto a medium to perform recording, an adjacent unit which is provided adjacent to the recording unit and accepts and transports the medium from the recording unit, a drying unit which contacts the medium and performs drying of the medium after the recording by heating the medium, and a control unit which controls operation of the drying unit, in which the drying unit is configured such that a heating region is divided into a plurality of subdivisions in a width direction which intersects a medium transport direction and to be capable of modifying a heating state for each subdivision region, and in which the control unit controls the heating state of each subdivision region in the drying unit according to conditions when performing drying of the medium using the drying unit.

Accordingly, since the drying unit is configured such that a heating region is divided into a plurality of subdivisions in a width direction which intersects a medium transport direction and to be capable of modifying a heating state for each subdivision region, and the control unit controls the heating state of each subdivision region in the drying unit according to conditions when performing drying of the medium using the drying unit, it is possible to suppress wasteful power consumption.

For example, as long as the conditions when performing the drying of the medium are conditions under which it is not necessary to achieve a uniform heating state of the heating unit along the entirety thereof in the width direction, it is possible to suppress the power consumption in the drying unit by setting the heating states in a portion of the subdivision regions among the plurality of subdivision regions to a low temperature, not heating the portion of the subdivision regions, or the like.

According to still another aspect of the disclosure, there is provided a recording apparatus which includes a recording section which discharges a liquid onto a medium to perform recording, a plurality of downstream side transport paths which branch at a branching portion positioned on a downstream side of the recording section, a drying unit which contacts the medium and performs drying of the medium after the recording by heating the medium, and a control unit which controls operation of the drying unit, in which the drying unit is provided in the medium transport path between the recording section and the branching portion, and in which the control unit controls operation of the drying unit according to which path of the plurality of downstream side transport paths to which the medium after the recording by the recording section is to be fed.

Accordingly, since the drying unit is provided in the medium transport path between the recording section and the branching portion, whichever path among the plurality of downstream side transport paths to which the medium after the recording by the recording section is to be transported, it is possible to dry the medium after the recording using the single drying unit, and it is possible to obtain a suppression of an increase in the size of the apparatus and a suppression of an increase in the cost of the apparatus.

Due to the control unit controlling the operation of the drying unit according to which path among the plurality of downstream side transport paths to which the medium is to be fed after the recording by the recording section, it is possible to suppress wasteful power consumption and to suppress the running cost in the recording apparatus.

For example, in a case in which the length of the downstream side transport path to which the medium is fed after the recording is short and the path has few curves and the like and is a simple path, there is little concern of the medium catching in the path even if the drying of the medium after the recording is not performed. Therefore, in this case, it is possible to suppress the power consumption in the drying unit, and thus, to suppress the running cost of the recording apparatus by shortening the drying time by the drying unit, by reducing the heating temperature for the drying, by not performing the heating for the drying, or the like.

In the present specification, the expression “suppress the power consumption” includes a case in which power is not consumed.

In the recording apparatus, in a case in which the plurality of downstream side transport paths includes a first downstream side transport path and a second downstream side transport path which has a longer path length than the first downstream side transport path, the control unit may set the drying unit to a first state in a case which the medium after the recording is fed to the first downstream side transport path, and may set the drying unit to a second state in which more heating is performed than the first state in a case in which the medium after the recording is fed to the second downstream side transport path.

Accordingly, since the control unit may set the drying unit to a first state in a case which the medium after the recording is fed to the first downstream side transport path, and may set the drying unit to a second heating state in which more heating is performed than the first state in a case in which the medium after the recording is fed to the second downstream side transport path having a path length longer than that of the first downstream side transport path, it is possible to reliably perform the drying of the medium and to reduce the concern of the occurrence of problems in a case in which problems such as paper jamming inside the path occur easily when the drying of the medium is insufficient and the medium is fed to the second downstream side transport path which has a long path length.

Meanwhile, in a case in which the medium is fed to the first downstream side transport path in which the path length is short and problems do not occur easily relative to the second downstream side transport path, it is possible to suppress the running cost of the recording apparatus.

In the recording apparatus, the drying unit may be configured to include a roller pair which pinches the medium between a first roller and a second roller and may be configured such that at least one of the first roller and the second roller is heated.

Accordingly, in the configuration in which the drying unit is configured to include a roller pair which pinches the medium between a first roller and a second roller and is configured such that at least one of the first roller and the second roller is heated, the same operational effects may be obtained as in the configurations described above.

In the recording apparatus, the roller pair may be configured to be capable of switching between a pinching state in which it is possible to pinch the medium between the first roller and the second roller and a separated state in which the first roller and the second roller are separated from each other.

Accordingly, since the roller pair is configured to be capable of switching between a pinching state in which it is possible to pinch the medium between the first roller and the second roller and a separated state in which the first roller and the second roller are separated from each other, it is possible to reduce the degree to which the liquid of the recording surface adheres to the roller pair by setting the roller pair to the separated state in a case in which there is a great concern that the liquid of the recording surface will adhere to the roller pair, for example.

In the recording apparatus, the control unit may set the first state of the drying unit to a non-heating state in which the roller pair is not heated and to the separated state, and the control unit may set the second state of the drying unit to a heating state in which the roller pair is heated and to the pinching state.

When the first state of the drying unit is set to the non-heating state in which the roller pair is not heated, the medium just after the recording in a state in which the temperature of the roller pair is lowered contacts the roller pair and there is a concern that the liquid of the recording surface will adhere to the roller pair.

However, according to this configuration, since the control unit sets the roller pair to the separated state when the roller pair is set to the non-heating state in which the roller pair is not heated, it is possible to suppress the concern that the liquid of the recording surface will adhere to the roller pair which is set to the non-heating state and in which the temperature is lowered.

In the recording apparatus, in a case in which the roller pair does not reach a target heating state, the control unit may set the roller pair to the separated state, and in a case in which the roller pair reaches the target heating state, the control unit may set the roller pair to the pinching state.

For example, if a state in which the roller pair which serves as the drying unit reaches a temperature which is suitable for performing the drying of the medium is set to a target heating state, when the medium contacts the roller pair in a state in which the roller pair does not reach the target heating state, there is a concern that the liquid of the recording surface will adhere to the roller pair.

Accordingly, since, in a case in which the roller pair does not reach a target heating state, the control unit sets the roller pair to the separated state, and in a case in which the roller pair reaches the target heating state, the control unit sets the roller pair to the pinching state, it is possible to suppress the concern that the medium will contact the roller pair in a state in which the roller pair does not reach the target heating state and that the liquid of the recording surface will adhere to the roller pair.

In the recording apparatus, in the pinching state of the roller pair, both the first roller and the second roller may proceed to a medium transport path, and in the separated state of the roller pair, both the first roller and the second roller pair may withdraw from the medium transport path.

Accordingly, since a configuration is adopted in which in the separated state of the roller pair, both the first roller and the second roller pair withdraw from the medium transport path, it is possible to more reliably reduce the concern of the liquid of the recording surface adhering to the roller pair in the separated state.

In the recording apparatus, the first roller may be provided on a side of a most recent recording surface of the medium, may be provided to be capable of proceeding and withdrawing with respect to a medium transport path, and may separate from the medium transport path in the separated state, a spur capable of proceeding and withdrawing with respect to the medium transport path may be provided on the side of the most recent recording surface of the medium, and the spur may assume a state of progressing to the medium transport path to pinch the medium between the spur and the second roller in a state in which the first roller is separated from the medium transport path.

Accordingly, since the spur which is capable of pinching the medium between the spur and the second roller instead of between the first roller and the second roller in the separated state of the roller pair proceeds into the medium transport path to pinch the medium, it is possible to transport the medium using the second roller and the spur even in the separated state of the roller pair.

According to still another aspect of the disclosure, there is provided a recording apparatus which includes a recording section which discharges a liquid onto a medium to perform recording, a plurality of downstream side transport paths which branch at a branching portion positioned on a downstream side of the recording section, a drying unit which contacts the medium and performs drying of the medium after the recording by heating the medium, and a control unit which controls operation of the drying unit, in which the plurality of downstream side transport paths includes a first downstream side transport path and a second downstream side transport path which has a longer path length than the first downstream side transport path, and in which the drying unit is not provided in the first downstream side transport path and is provided in the second downstream side transport path.

Accordingly, since the drying unit is not provided in the first downstream side transport path and is provided in the second downstream side transport path which has a longer path length than the first downstream side transport path, it is possible to reliably perform the drying of the medium and to reduce the concern of the occurrence of problems in a case in which problems such as paper jamming inside the path occur easily when the drying of the medium is insufficient and the medium is fed to the second downstream side transport path which has a long path length.

Meanwhile, in a case in which the medium is fed to the first downstream side transport path which has a short path length and in which problems do not occur easily, the drying by the drying unit is not performed and it is possible to suppress the running cost of the recording apparatus.

In the recording apparatus, the control unit may control the drying unit according to conditions when performing drying of the medium using the drying unit.

Accordingly, since the control unit controls the drying unit according to conditions when performing drying of the medium using the drying unit, it is possible to suppress wasteful power consumption and to suppress the running cost of the recording apparatus.

For example, as long as the conditions when performing the drying of the medium are suitable conditions for the drying of the medium, it is possible to suppress the power consumption in the drying unit, and thus, to suppress the running cost of the recording apparatus by shortening the drying time by the drying unit, by reducing the heating temperature for the drying, by not performing the heating for the drying, or the like.

According to still another aspect of the disclosure, there is provided a recording system which includes a recording unit which includes a recording section which discharges a liquid onto a medium to perform recording, a plurality of downstream side transport paths which branch at a branching portion positioned on a downstream side of the recording section, an adjacent unit which is provided adjacent to the recording unit and accepts and transports the medium from the recording unit, a drying unit which contacts the medium and performs drying of the medium after the recording by heating the medium, and a control unit which controls operation of the drying unit, in which the drying unit is provided in the medium transport path between the recording section and the branching portion, in which the plurality of downstream side transport paths includes a first downstream side transport path which connects to a first output portion which outputs the medium after the recording without delivering the medium to the adjacent unit, and a second downstream side transport path which connects to a second output portion to which the medium after the recording is transported after being transported in an adjacent unit path which is a medium transport path of the adjacent unit, and in which the control unit controls operation of the drying unit according to which path of the plurality of downstream side transport paths to which the medium after the recording by the recording section is to be fed.

Accordingly, since the drying unit is provided in the transport path between the recording section and the branching portion, whichever path among the plurality of downstream side transport paths to which the medium after the recording by the recording section is to be transported, it is possible to efficiently dry the medium after the recording using the single drying unit.

The control unit controls the operation of the drying unit according to which path among the plurality of downstream side transport paths to which the medium is to be fed after the recording by the recording section, and it is possible to suppress wasteful power consumption and to suppress the running cost in the recording apparatus.

According to still another aspect of the disclosure, there is provided a recording system which includes a recording unit which includes a recording section which discharges a liquid onto a medium to perform recording, a plurality of downstream side transport paths which branch at a branching portion positioned on a downstream side of the recording section, an adjacent unit which is provided adjacent to the recording unit and accepts and transports the medium from the recording unit, and a drying unit which contacts the medium and performs drying of the medium after the recording by heating the medium, in which the plurality of downstream side transport paths includes a first downstream side transport path which connects to a first output portion which outputs the medium after the recording without delivering the medium to the adjacent unit, and a second downstream side transport path which connects to a second output portion to which the medium after the recording is transported after being transported in an adjacent unit path which is a medium transport path of the adjacent unit, and in which the drying unit is not provided in the first downstream side transport path and is provided in the second downstream side transport path.

Due to the medium which is fed to the second downstream side transport path being delivered to the adjacent unit, the length of the path leading to the outputting of the medium is longer than in a case in which the medium is fed via the first downstream side transport path. When the length of the path increases, problems such as paper jamming inside the path caused by the drying of the medium being insufficient occur more easily.

Accordingly, since the drying unit is provided on the side at which the length of the path leading to the outputting of the medium is increased among the first downstream side transport path and the second downstream side transport path, that is, since the drying unit is provided on the second downstream side transport path side, it is possible to reduce the concern of the occurrence of the problems.

Meanwhile, in a case in which the medium is fed to the first downstream side transport path which has a short path length and in which problems do not occur easily, without performing drying using the drying unit, it is possible to avoid wasteful power consumption and to suppress the running cost of the recording system.

According to still another aspect of the disclosure, there is provided a recording apparatus which includes a recording section which discharges a liquid onto a medium to perform recording, a drying unit which contacts the medium and performs drying of the medium after the recording by heating the medium, and a control unit which controls operation of the drying unit, in which the control unit controls the drying unit according to conditions when performing drying of the medium using the drying unit.

Accordingly, since the control unit controls the drying unit according to conditions when performing drying of the medium using the drying unit, it is possible to suppress wasteful power consumption.

For example, as long as the conditions when performing the drying of the medium are suitable conditions for the drying of the medium, it is possible to suppress the power consumption in the drying unit by shortening the drying time by the drying unit, by reducing the heating temperature for the drying, by not performing the heating for the drying, or the like.

In the present specification, the expression "suppress the power consumption" includes a case in which power is not consumed.

In the recording apparatus, the control unit may control the drying unit based on a plurality of conditions using the plurality of conditions for the conditions when performing the drying.

Since the control unit controls the drying unit based on the plurality of conditions using the plurality of conditions for the conditions when performing the drying, it is possible to more suitably control the drying unit, and thus, it is possible to still further reduce the power consumption in the drying unit.

In the recording apparatus, the plurality of conditions may include at least two of the liquid discharge amount, the type of the medium, the size of the medium, the temperature in the installation environment of the apparatus, the humidity in the installation environment, the margin size of the leading end region of the medium, whether or not the most recent recording surface of the medium is the reverse surface of the surface on which recording is already performed, and the transport speed of the medium.

Accordingly, it is possible to more suitably control the drying unit based on at least two of the plurality of conditions, and thus, it is possible to still further reduce the power consumption in the drying unit.

In the recording apparatus, using a discharge amount of the liquid as the condition when performing the drying, in a case in which the discharge amount of the liquid is less than or equal to a predetermined threshold value, the control unit may set the drying unit to a first state, and in a case in which the discharge amount of the liquid exceeds the threshold value, the control unit may set the drying unit to a second state in which more heating is performed than the first state.

Accordingly, since, using a discharge amount of the liquid as the condition when performing the drying, in a case in which the discharge amount of the liquid is less than or equal to a predetermined threshold value the control unit sets the drying unit to the first state, and in a case in which the discharge amount of the liquid exceeds the threshold value, the control unit sets the drying unit to a second state in which more heating is performed than the first state, it is possible to reliably perform the drying of the medium in the second state, and it is possible to suppress the power consumption in the first state to perform the suppression of the running cost.

In the recording apparatus, the drying unit may be configured to include a roller pair which pinches the medium between a first roller and a second roller and may be configured such that at least one of the first roller and the second roller is heated.

Accordingly, in the configuration in which the drying unit is configured to include a roller pair which pinches the medium between a first roller and a second roller and is configured such that at least one of the first roller and the second roller is heated, the same operational effects may be obtained as in one of the configurations described above.

In the recording apparatus, a configuration may be adopted in which both the first roller and the second roller are heated.

Accordingly, since a configuration is adopted in which both the first roller and the second roller are heated, it is possible to more reliably perform the drying of the medium.

In the recording apparatus, the roller pair may be configured to be capable of switching between a pinching state in which it is possible to pinch the medium between the first roller and the second roller and a separated state in which the first roller and the second roller are separated from each other.

Accordingly, since the roller pair is configured to be capable of switching between a pinching state in which it is possible to pinch the medium between the first roller and the second roller and a separated state in which the first roller and the second roller are separated from each other, it is possible to reduce the degree to which the liquid of the recording surface adheres to the roller pair by setting the roller pair to the separated state in a case in which there is a great concern that the liquid of the recording surface will adhere to the roller pair (in a case such as in the middle of heating the roller pair), for example.

In the recording apparatus, the first state of the drying unit may be set to a non-heating state in which the roller pair is not heated and to the separated state, and the second state of the drying unit may be set to a heating state in which the roller pair is heated and to the pinching state.

When the first state of the drying unit is set to the non-heating state in which the roller pair is not heated, the medium just after the recording in a state in which the temperature of the roller pair is lowered contacts the roller pair and there is a concern that the liquid of the recording surface will adhere to the roller pair.

However, according to this configuration, since the control unit sets the roller pair to the separated state when the roller pair is set to the non-heating state in which the roller pair is not heated, it is possible to suppress the concern that the liquid of the recording surface will adhere to the roller pair which is set to the non-heating state and in which the temperature is lowered.

In the recording apparatus, in a case in which the roller pair does not reach a target heating state, the control unit may set the roller pair to the separated state, and in a case in which the roller pair reaches the target heating state, the control unit may set the roller pair to the pinching state.

For example, if a state in which the roller pair which serves as the drying unit reaches a temperature which is suitable for performing the drying of the medium is set to a target heating state, when the medium contacts the roller pair in a state in which the roller pair does not reach the target heating state, there is a concern that the liquid of the recording surface will adhere to the roller pair.

Accordingly, since, in a case in which the roller pair does not reach a target heating state, the control unit sets the roller pair to the separated state, and in a case in which the roller pair reaches the target heating state, the control unit sets the roller pair to the pinching state, it is possible to suppress the concern that the medium will contact the roller pair in a state in which the roller pair does not reach the target heating state and that the liquid of the recording surface will adhere to the roller pair.

In the recording apparatus, in the pinching state of the roller pair, both the first roller and the second roller may proceed to a medium transport path, and in the separated state of the roller pair, both the first roller and the second roller pair may withdraw from the medium transport path.

Accordingly, since a configuration is adopted in which in the separated state of the roller pair, both the first roller and the second roller pair withdraw from the medium transport path, it is possible to more reliably reduce the concern of the liquid of the recording surface adhering to the roller pair in the separated state.

In the recording apparatus, the first roller may be provided on a side of a most recent recording surface of the medium, may be provided to be capable of proceeding and withdrawing with respect to a medium transport path, and may separate from the medium transport path in the separated state, a spur capable of proceeding and withdrawing with respect to the medium transport path may be provided on the side of the most recent recording surface of the medium, and the spur may progress to the medium transport path to pinch the medium between the spur and the second roller in a state in which the first roller is separated from the medium transport path.

Accordingly, since the spur which is capable of pinching the medium between the spur and the second roller instead of between the first roller and the second roller in the separated state of the roller pair proceeds into the medium transport path to pinch the medium, it is possible to transport the medium using the second roller and the spur even in the separated state of the roller pair.

The recording apparatus may further include a plurality of downstream side transport paths which branch at a branching portion positioned on a downstream side of the recording section, in which the drying unit may be provided in a medium transport path between the recording section and the branching portion.

Accordingly, since the drying unit is provided in the medium transport path between the recording section and the branching portion, in a configuration which is provided with a plurality of downstream side transport paths, it is possible to dry the medium after the recording using the single drying unit, and it is possible to obtain a suppression of an increase in the size of the apparatus and a suppression of an increase in the cost of the apparatus.

The recording apparatus may further include a plurality of downstream side transport paths which branch at a branching portion positioned on a downstream side of the recording section, in which the drying units may be provided in each of the plurality of downstream side transport paths and may be individually controlled by the control unit.

Accordingly, since the recording apparatus further includes a plurality of downstream side transport paths which branch at a branching portion positioned on a downstream side of the recording section and the drying units are provided in each of the plurality of downstream side transport paths and are individually controlled by the control unit, it is possible to perform the drying of the medium under conditions which are suitable for each of the downstream side transport paths, it is possible to appropriately dry the medium, and it is possible to suppress the power consumption.

According to still another aspect of the disclosure, there is provided a recording system which includes a recording unit which includes a recording section which discharges a liquid onto a medium to perform recording, an adjacent unit which is provided adjacent to the recording unit and accepts and transports the medium from the recording unit, a drying unit which contacts the medium and performs drying of the medium after the recording by heating the medium, and a control unit which controls operation of the drying unit, in which the control unit controls the drying unit according to conditions when performing drying of the medium using the drying unit.

Accordingly, since the control unit controls the drying unit according to conditions when performing drying of the medium using the drying unit, it is possible to suppress wasteful power consumption.

For example, as long as the conditions when performing the drying of the medium are suitable conditions for the drying of the medium, it is possible to suppress the power consumption in the drying unit by shortening the drying time by the drying unit, by reducing the heating temperature for the drying, by not performing the heating for the drying, or the like.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

First Embodiment

Figure 1:
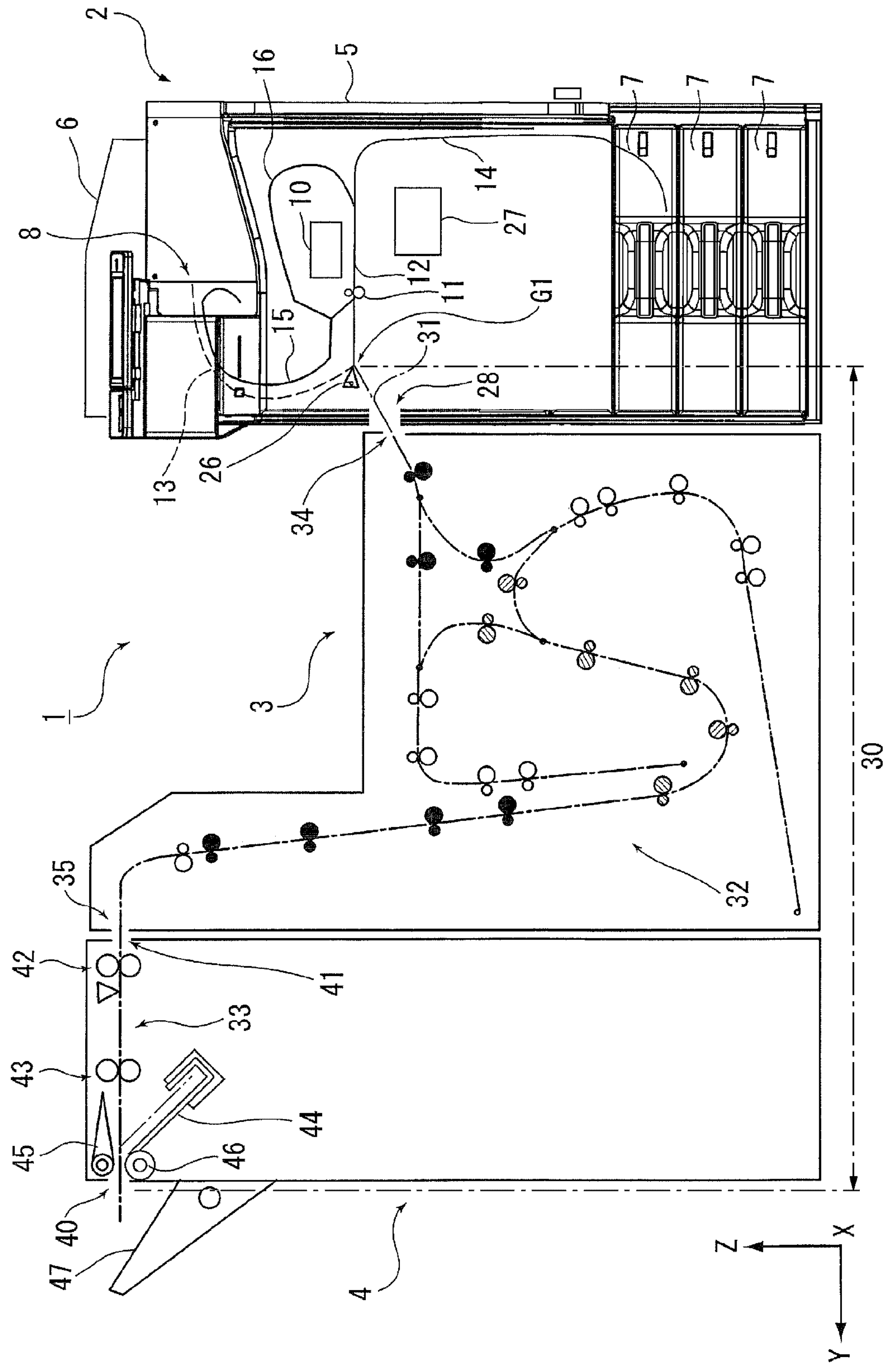
FIG. 1 is a schematic diagram of a recording system according to the disclosure.

Hereinafter, a description will be given of an example of an embodiment of the disclosure based on the drawings.

In the X-Y-Z coordinate system illustrated in the drawings, an X-axis direction is a width direction of the medium and indicates the apparatus depth direction, a Y-axis direction is a transport direction of the medium in the transport path inside the apparatus and indicates an apparatus width direction, and a Z-axis direction indicates an apparatus height direction.

Outline of Recording System

A recording system 1 illustrated in FIG. 1 is provided with a recording unit 2 which serves as "a recording apparatus" which performs recording on paper which serves as "a medium", a relay unit 3, and an after-treatment unit 4. The recording system 1 is provided with the recording unit 2, the relay unit 3, and the after-treatment unit 4 in order from right to left viewing FIG. 1 from the front, for example. These devices are connected to each other and are configured to be capable of transporting the medium from the recording unit 2 to the after-treatment unit 4. In the present embodiment, the relay unit 3 is "an adjacent unit" which is provided to be adjacent to the recording unit 2 (the recording apparatus).

The recording system 1 is configured such that it is possible to input processes (condition settings, execution instructions, and the like of the recording operation) which are performed on the medium in the recording unit 2, the relay unit 3, and the after-treatment unit 4 from an operation panel (not illustrated) which is provided on the recording unit 2.

Hereinafter, a description will be given of the schematic configuration of each of the recording unit 2, the relay unit 3, and the after-treatment unit 4 in order with reference to FIG. 1, mainly.

Recording Unit

The recording unit 2 (the recording apparatus) illustrated in FIG. 1 is configured as a multifunction device which is provided with a printer unit 5 and a scanner unit 6. The printer unit 5 is provided with a line head 10 which serves as "the recording section" which discharges an ink which serves as an example of "the liquid" onto paper to perform recording. In the present embodiment, the ink is a water-based ink such as an aqueous ink and the printer unit 5 is a so-called ink jet printer.

The recording unit 2 is configured to be capable of duplex recording in which the recording unit 2 performs recording onto a first surface (also referred to as an obverse surface) of the paper and subsequently inverts the paper and performs recording onto a second surface (also referred to as a reverse surface).

A plurality of paper storage cassettes 7 is provided on a device bottom portion of the recording unit 2. The paper which is stored in the paper storage cassettes 7 is fed toward the line head 10 and the recording operation is performed. A configuration is adopted such that the paper, after being recorded on by the line head 10, is output from either a first output portion 8 which is provided in the recording unit 2 or a second output portion 40 which is provided in the after-treatment unit 4.

In a case in which the paper after the recording is output from the second output portion 40, the paper is fed from a delivery portion 28 to the relay unit 3 and is further fed from the relay unit 3 toward the after-treatment unit 4. The medium is output to the second output portion 40 after the medium is subjected to after-treatment such as cutting and stapling in the after-treatment unit 4.

The medium transport path in the printer unit 5 will be described in detail later.

Relay Unit

The relay unit 3 (the adjacent unit) illustrated in FIG. 1 is disposed between the recording unit 2 and the after-treatment unit 4, and is configured to receive the paper which is delivered from the delivery portion 28 using an upstream side relay section 34 and transport the paper after the paper is subjected to recording by the line head 10 from the recording unit 2 to the after-treatment unit 4.

The paper which is transported through the inner portion of the relay unit 3 is fed into the after-treatment unit 4 from a downstream side relay section 35 which is provided in the relay unit 3 via a receiving portion 41 of the after-treatment unit 4.

A description will be given of the details of a relay unit path 32 (an adjacent unit path) which is the medium transport path in the relay unit 3 after the description of the present embodiment (the first embodiment) and the second and third embodiment which will be described after the first embodiment.

After-Treatment Unit

The after-treatment unit 4 illustrated in FIG. 1 is configured to perform the after-treatment on the paper which is subjected to recording in the recording unit 2. Examples of the after-treatment include cutting, folding, hole-punching, stapling, and sorting.

The details of the medium transport path (an after-treatment unit path 33) in the after-treatment unit 4 will be described later together with the relay unit path 32 in the printer unit 5.

Medium Transport Path of Recording Unit

Next, a description will be given of the medium transport path in the recording unit 2 using FIG. 2.

Figure 2:
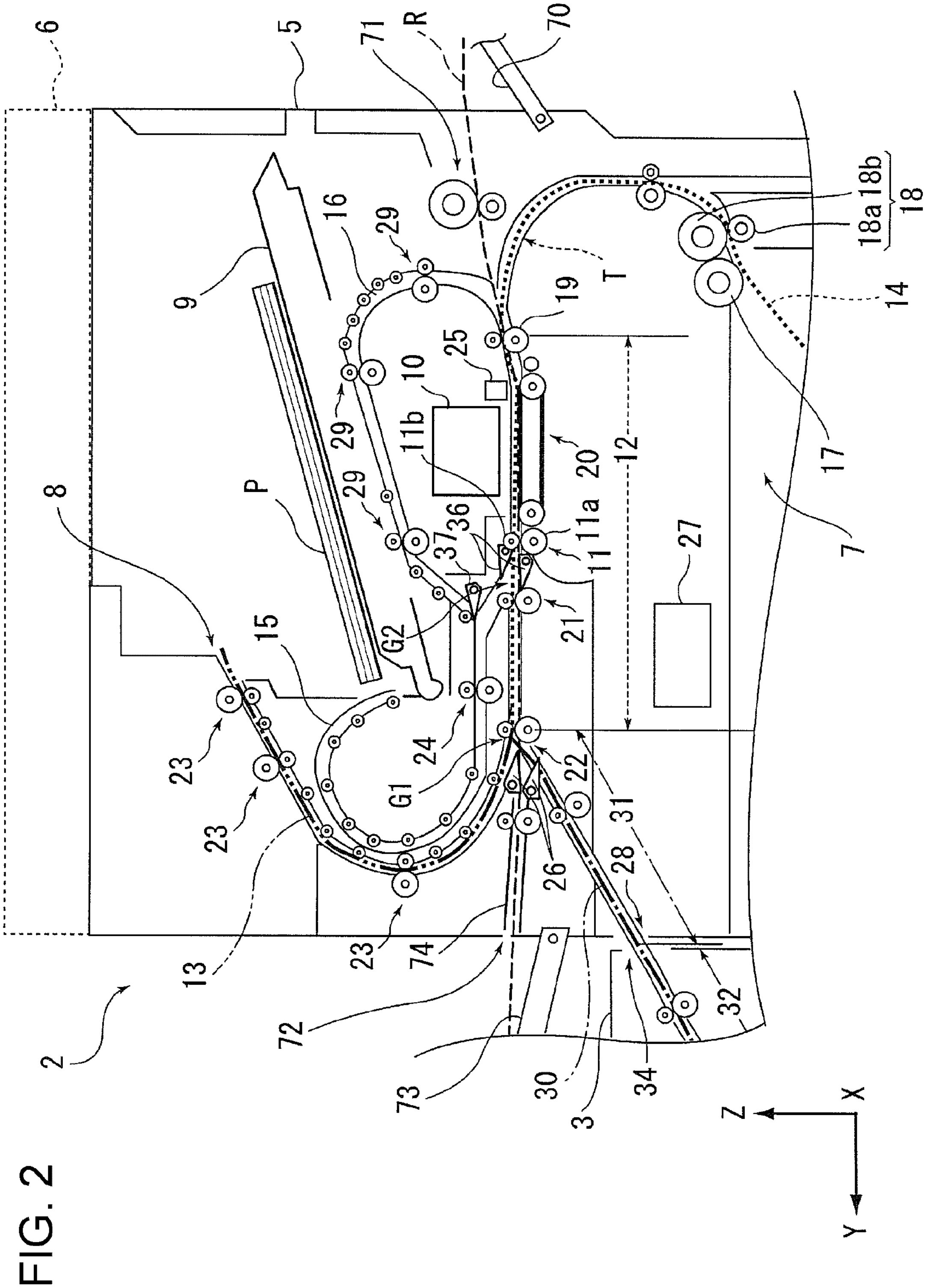
FIG. 2 is a schematic diagram of a portion of a recording unit and the main parts of a relay unit.

In FIG. 2, a dotted line indicated by a reference numeral T illustrates a portion of the medium transport path from the paper storage cassettes 7. The medium transport path T is configured to include a feed path 14 which feeds the paper which is picked up from the paper storage cassettes 7 and a straight path 12 which is connected to the feed path 14 and includes a recording region of the line head 10.

Furthermore, a recording unit path 31 which configures a first downstream side transport path 13 (illustrated by a double-dot-dashed line in FIG. 2) and a second downstream side transport path 30 (illustrated by a dotted line in FIGS. 1 and 2) is provided on the downstream side of the straight path 12. The first downstream side transport path 13 feeds the paper to the first output portion 8 and the second downstream side transport path 30 is a path which passes the delivery portion 28 and reaches the second output portion 40 of the after-treatment unit 4 illustrated in FIG. 1.

The first downstream side transport path 13 and the second downstream side transport path 30 are both transport paths of the paper after the recording. In other words, the first downstream side transport path 13 and the second downstream side transport path 30 are a plurality of downstream side transport paths which branches at a branching portion G1 which is positioned on the downstream side of the line head 10. The first downstream side transport path 13 is a path linking to the first output portion 8 which outputs the paper after the recording without delivering the paper to the relay unit 3. In other words, the first downstream side transport path 13 is a path from the branching portion G1 to the first output portion 8 on the downstream side of the line head 10. The second downstream side transport path 30 is a path linking to the second output portion 40 to which the paper after the recording is output after being transported on the relay unit path 32 which is the medium transport path of the relay unit 3. In other words, the second downstream side transport path 30 is a path from the branching portion G1 to the second output portion 40 on the downstream side of the line head 10.

In the present embodiment, the second downstream side transport path 30 is a path which is configured to be longer than the first downstream side transport path 13.

The medium transport path which is between the line head 10 and the branching portion G1 is provided with a heat roller pair 11 which serves as "a drying unit" which contacts the paper which is transported and performs the drying of the paper after the recording by heating the paper. The detailed configuration of the heat roller pair 11 will be described after the description of the medium transport path in the recording unit 2.

In the present embodiment, the heat roller pair 11 is provided directly on the downstream side of a belt transporting unit 20 (described later).

A switching unit 26 such as a guide flap which switches the transport destination of the paper after the recording between the second downstream side transport path 30 which links to the delivery portion 28 and the first downstream side transport path 13 which links to the first output portion 8 is provided at the branching portion G1 at which the straight path 12 branches into the first downstream side transport path 13 and the recording unit path 31 which configures the second downstream side transport path 30. In other words, a configuration is adopted in which the switching unit 26 switches between whether to feed the paper to the first downstream side transport path 13 or to feed the paper to the second downstream side transport path 30 which configures the recording unit path 31.

The operation of the switching unit 26 is controlled by a control unit 27. The control unit 27 controls operation relating to the recording, including the transporting of the paper in the recording unit 2, the operation of the switching unit 26, and the operation of the heat roller pair 11 (the drying unit).

A characteristic of the disclosure is in the control of the operation of the heat roller pair 11 by the control unit 27. A description will also be given of the control of the operation of the heat roller pair 11 which is performed by the control unit 27 after the description of the medium transport path in the recording unit 2.

Hereinafter, a description will be given of the medium transport path in the recording unit 2, that is, the transporting of the paper from the paper storage cassettes 7 to the first output portion 8 and the transporting of the paper when performing the duplex recording. Regarding Medium Transport Path from Paper Storage Cassette to First Output Portion A feed roller 17 and a separation roller pair 18 which separates a plurality of sheets of paper into single sheets are provided in the feed path 14 illustrated in FIG. 2 in this order along the medium transport direction.

The feed roller 17 is configured to be rotationally driven by a drive source (not illustrated). The separation roller pair 18 is also referred to as a return roller and is configured to include a drive roller 18*a* and a driven roller 18*b*. The drive roller 18*a* feeds the paper toward the straight path 12 (described later), and the driven roller 18*b* nips the paper between the drive roller 18*a* and the driven roller 18*b* to separate the paper.

It is possible to store a plurality of sheets of paper in the paper storage cassettes 7 and the topmost sheet of paper is picked up by the feed roller 17 and transported to the downstream side in the transport direction. At this time, there is a case in which the next or more sheets of the paper are also transported together with the topmost sheet of the paper. However, the topmost sheet of paper and the next or more sheets of the paper are separated by the separation roller pair 18 and only the topmost sheet of the paper is fed to the feed path 14.

A resist roller pair 19 is provided on the downstream side of the separation roller pair 18 in the transport direction. In the present embodiment, the feed path 14 and the straight path 12 are connected to each other at the position of the resist roller pair 19.

The straight path 12 is configured as a path which extends in a substantially straight-line shape and a belt transporting unit 20, a destaticizing unit 25, and the line head 10 are provided on the downstream side of the resist roller pair 19.

In the present embodiment, the belt transporting unit 20 is disposed in a region facing the head surface of the line head 10 and supports the opposite side of the paper from the recording surface of the paper.

The line head 10 is configured to execute the recording by ejecting the ink (the liquid) onto the recording surface of the paper when the paper is transported to a position facing the line head 10 on the belt transporting unit 20. The line head 10 is a recording head which is provided such that the nozzles which eject the ink cover the entire width of the paper and is configured as a recording head which is capable of recording on the entire width of the medium without moving in the medium width direction.

Although the recording unit 2 of the present embodiment is provided with the line head 10, the recording unit 2 may be provided with a serial recording head which is installed on a carriage and performs the recording by ejecting the liquid onto the medium while moving reciprocally in a direction which intersects the medium transport direction.

The paper which is transported in the straight path 12 is subsequently fed to the first downstream side transport path 13. At this time, the switching unit 26 rocks to block the recording unit path 31 which serves as the second downstream side transport path 30 and guides the paper to the first downstream side transport path 13.

The paper which enters the first downstream side transport path 13 is transported by the transport roller pairs 21 and 22 and a transport roller pair group 23, is output from the first output portion 8, and is placed on a medium placement portion 9 with the recording surface facing downward.

Regarding Transport Path During Duplex Recording

The recording unit 2 illustrated in FIG. 2 is configured to be capable of executing duplex recording and is provided with a duplex recording switchback path 15 and an inverting path 16. The duplex recording switchback path 15 branches from the straight path 12 at a position on the downstream side of the line head 10 and closer to the upstream side than the first downstream side transport path 13 (the upstream side of the transport roller pair 21 in FIG. 2 in the present embodiment) and the inverting path 16 is connected to the duplex recording switchback path 15 and inverts the obverse and reverse (the first surface and the second surface) of the paper to return the paper to the straight path 12. The connecting portion of the straight path 12 and the duplex recording switchback path 15 is provided with a guide flap 36, the connecting portion of the duplex recording switchback path 15 and the inverting path 16 is provided with a guide flap 37, and the path to which the paper is fed is switched by switching the guide flaps 36 and 37. The operation of the guide flaps 36 and 37 is controlled by the control unit 27. The transport timing at which to drive the belt transporting unit 20 and the various transport roller pairs is also controlled by the control unit 27.

In the present embodiment, the duplex recording switchback path 15 is also a transport path of the paper after the recording and is one of the plurality of downstream side transport paths which branch at the downstream side of the line head 10. The branching portion of the duplex recording switchback path 15 is a branching portion G2. It may be said that the heat roller pair 11 is disposed between the line head 10 and the branching portion G2. Hereinafter, there is a case in which the duplex recording switchback path 15 is referred to as a third downstream side transport path.

A description will be given of the transporting of the paper when performing the duplex recording with reference to FIGS. 2 and 3.

Figure 3:
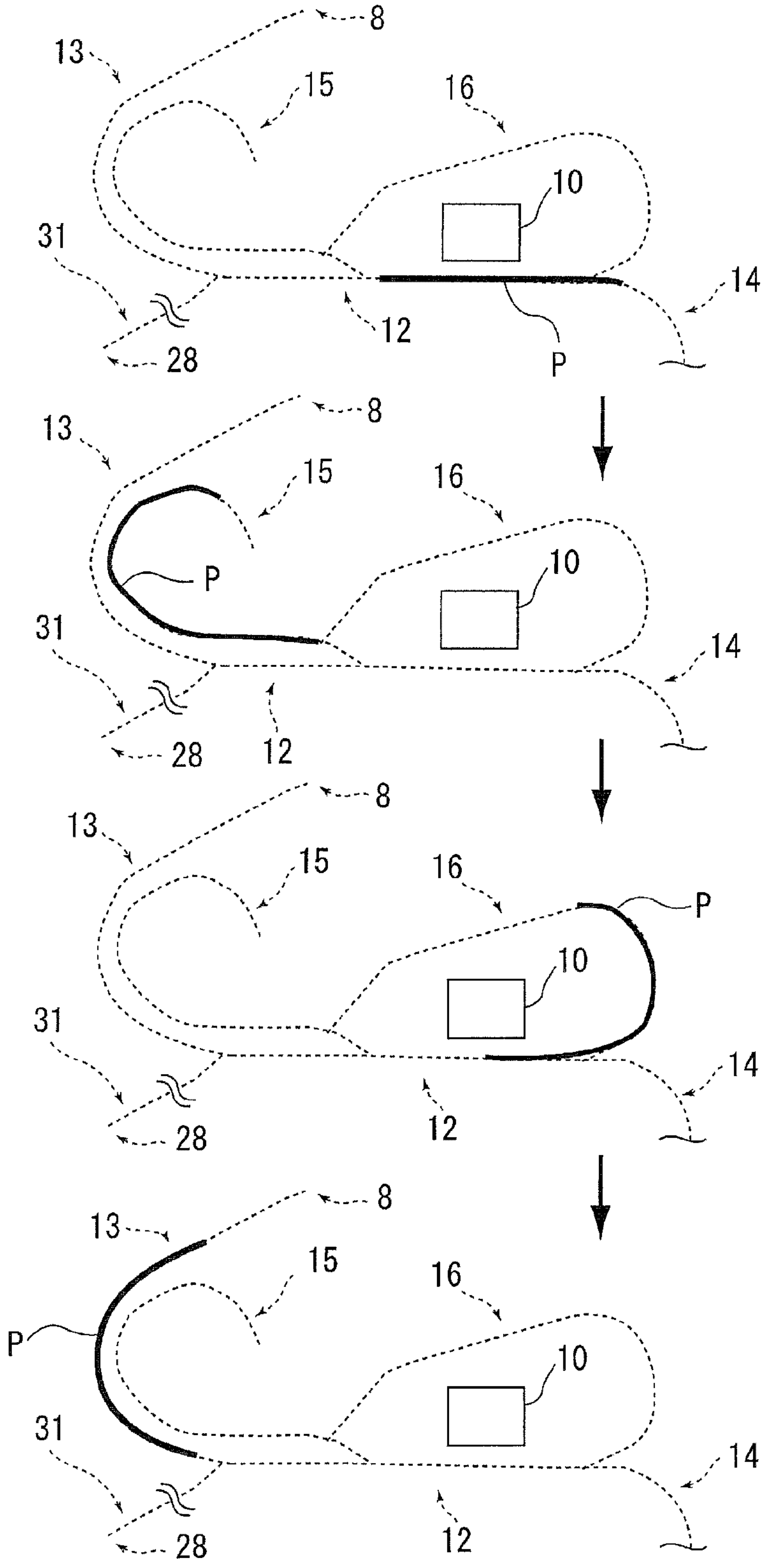
FIG. 3 is a diagram explaining a transport path during duplex recording.

The topmost portion of FIG. 3 illustrates a state in which recording is performed on the first surface of the paper (indicated by reference numeral P in each portion of FIG. 3) by the line head 10. After the recording onto the first surface, as illustrated in the second portion from the top in FIG. 3, the paper P is fed from the straight path 12 to the duplex recording switchback path 15 (also refer to FIG. 2).

Next, the paper P is fed by a transport roller pair 24 illustrated in FIG. 2 from the duplex recording switchback path 15 in an opposite direction (the −Y-axis direction) from the direction (the +Y-axis direction) in which the paper P is fed into the duplex recording switchback path 15, after entering the inverting path 16, the recording surface is inverted and the paper P enters the straight path 12 again, as illustrated in the second portion from the bottom in FIG. 3, and the recording is performed on the second surface by the line head 10. A reference numeral 29 in FIG. 2 is a transport roller pair which is provided in the inverting path 16.

The paper P which is subjected to the duplex recording enters the first downstream side transport path 13 from the straight path 12 as illustrated in the bottommost portion of FIG. 3, is output from the first output portion 8, and is placed on the medium placement portion 9 illustrated in FIG. 2.

Regarding Configuration of Heat Roller Pair

Hereinafter, a description will be given of the configuration of a heat roller pair which serves as "a drying unit".

As illustrated in FIG. 2, the heat roller pair 11 is a roller pair which pinches the paper between a drive roller 11*a* which serves as "a second roller" and a driven roller 11*b* which serves as "a first roller". In the present embodiment, the drive roller 11*a* is configured to be heated. In other words, the drive roller 11*a* is configured to heat the reverse surface of the most recent recording surface.

As in the present embodiment, the heat roller pair 11 may be configured such that at least one of the drive roller 11*a* and the driven roller 11*b* which configure the heat roller pair 11 is heated and may be configured such that only the driven roller 11*b* is heated.

It is also possible to adopt a configuration in which both the drive roller 11*a* and the driven roller 11*b* are heated. If the configuration in which both the drive roller 11*a* and the driven roller 11*b* are heated is adopted, both surfaces of the paper are heated and it is possible to realize more reliable drying of the paper.

Figure 4:
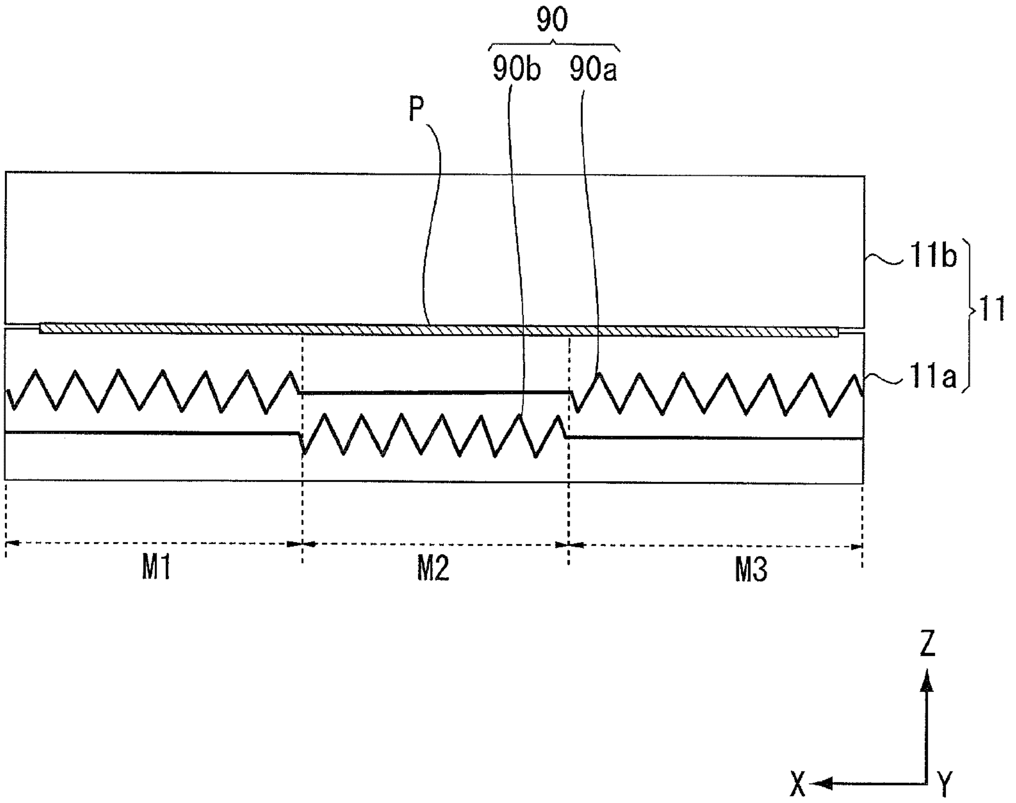
FIG. 4 is a diagram explaining the configuration of a heat roller pair.

In the heat roller pair 11, a heating region is divided into a plurality of subdivisions in the width direction (the X-axis direction) which intersects the medium transport direction. In the present embodiment, as illustrated in FIG. 4, the heating region is divided into three subdivision regions M1, M2, and M3. The subdivision regions M1, M2, and M3 are configured such that it is possible to modify the heating state for each subdivision region. The number of subdivisions of the heating region is not limited to three as long as it is a plurality. If the number of subdivisions of the heating region is great, more detailed control of the heating region becomes possible.

In the case of a configuration in which both the drive roller 11*a* and the driven roller 11*b* are heated, the subdivision regions in the drive roller 11*a* are disposed to correspond to the subdivision regions M1, M2, and M3 in the driven roller 11*b*. It is possible to adopt a configuration in which the heating of the drive roller 11*a* and the driven roller 11*b* may be controlled individually.

For example, as illustrated in FIG. 4, the heating of the drive roller 11*a* may use an induction heating system in which induction coils 90 are provided in the inner portion of the roller and the rollers are heated using the action of a magnetic field which is generated by causing a current to flow in the induction coils 90.

It is possible to adjust the heating temperature of the drive roller 11*a* by turning on and off the heating by the induction coils 90. For example, it is possible to achieve temperature adjustability by controlling the duty ratio of the current which is caused to flow in the induction coils 90. A temperature detection unit (not illustrated) which detects the roller temperature is provided in the drive roller 11*a*.

In the present embodiment, of the drive roller 11*a* and the driven roller 11*b*, the drive roller 11*a* which is heated is provided to extend along the entire width direction and is configured such that the heating state is possible to modify partially in the width direction. The driven roller 11*b* is also provided to extend along the entire width direction.

A first induction coil 90*a* and a second induction coil 90*b* are provided in the inner portion of the drive roller 11*a* In the first induction coil 90*a*, coil portions are disposed at positions corresponding to the subdivision region M1 and the subdivision region M3, and in the second induction coil 90*b*, a coil portion is disposed at a position corresponding to the subdivision region M2.

It is possible to control the first induction coil 90*a* and the second induction coil 90*b* individually using the control unit 27. When the first induction coil 90*a* is heated, the subdivision regions M1 and M3 are heated, and when the second induction coil 90*b* is heated, the subdivision region M2 is heated.

Naturally, it is also possible to adopt a configuration in which the induction coil which heats the subdivision region M1 and the induction coil which heats which heats the subdivision region M3 are separated and are capable of heating the subdivision region M1 and the subdivision region M3 separately.

By adopting such a configuration, it is possible to render the heating states of each of the subdivision regions M1, M2, and M3 modifiable.

Figure 5:
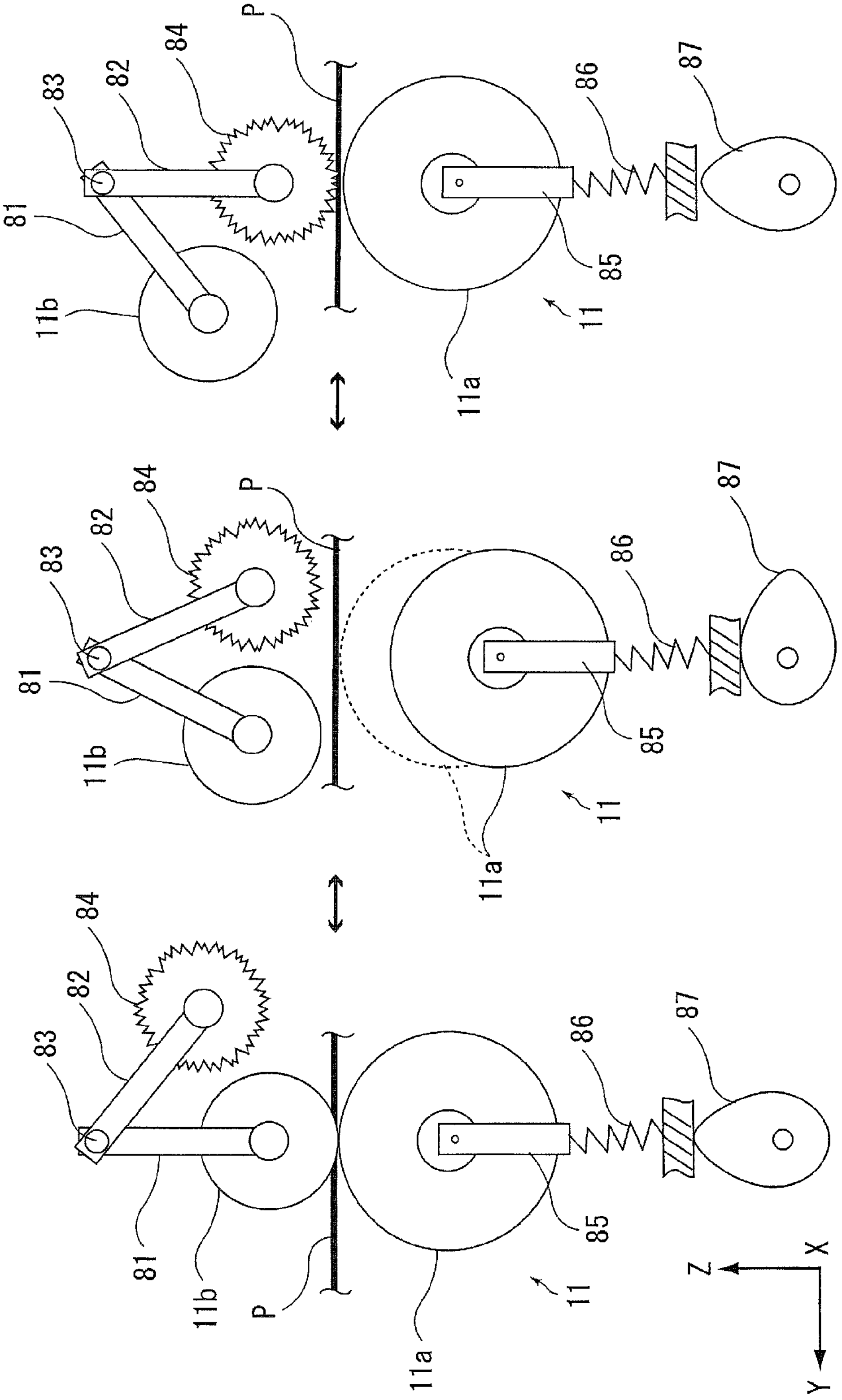
FIG. 5 is a diagram explaining the configuration of the heat roller pair.

The heat roller pair 11 is configured to be capable of switching between a pinching state capable of pinching the paper between the drive roller 11*a* and the driven roller 11*b* as illustrated in the left portion of FIG. 5, and separated states in which the drive roller 11*a* and the driven roller 11*b* are separated from each other as illustrated in the middle and right portions of FIG. 5. By adopting this configuration, it is possible to reduce the degree to which the ink of the recording surface adheres to the heat roller pair 11.

Hereinafter, of the separated states, the state of the middle portion of FIG. 5 is referred to as a first separated state and the state of the right portion of FIG. 5 is referred to as a second separated state.

More specifically, in the pinching state of the heat roller pair 11 (the left portion of FIG. 5), both of the drive roller 11*a* and the driven roller 11*b* are configured to proceed toward the medium transport path (the path in which the paper P is positioned in each portion of FIG. 5).

In the first separated state (the middle portion of FIG. 5) of the heat roller pair 11, both of the drive roller 11*a* and the driven roller 11*b* are configured to withdraw from the medium transport path. Hereinafter, a description will be given of an example of a configuration in which the drive roller 11*a* and the driven roller 11*b* are caused to withdraw from the medium transport path.

The drive roller 11*a* is configured to be capable of proceeding and withdrawing in the Z-axis direction. More specifically, as illustrated in FIG. 5, the drive roller 11*a* is held by a holder 85 and the drive roller 11*a* is pressed into the medium transport path side due to the holder 85 being pressed by a pressing member 86.

The drive roller 11*a* is configured to be capable of being displaced so as to proceed and withdraw in the Z-axis direction together with the holder 85. It is possible to switch between a pinching state (the left portion of FIG. 5) in which the drive roller 11*a* proceeds into the medium transport path to contact the driven roller 11*b* and a separated state (the middle portion of FIG. 5) in which the drive roller 11*a* withdraws from the medium transport path and separates from the driven roller 11*b* by allowing the rotation of an eccentric cam 87 which receives a motive force from a drive source (not illustrated) which is controlled by the control unit 27 and rotates.

As illustrated in each portion of FIG. 5, the driven roller 11*b* is held by a first holding unit 81 to be capable of rotational movement and is configured to proceed and withdraw with respect to the medium transport path due to the first holding unit 81 rocking using a shaft portion 83 as an axis.

As illustrated in the middle portion of FIG. 5, due to both the drive roller 11*a* and the driven roller 11*b* assuming the first separated state of being withdrawn from the medium transport path, it is possible to reduce a concern that the ink of the recording surface will adhere to the heat roller pair 11 when the paper P contacts the heat roller pair 11 in a state in which the heating of the driven roller 11*b* is insufficient, for example.

In the present embodiment, a serrated roller 84 which serves as a "spur" capable of proceeding and withdrawing with respect to the medium transport path is provided on the same side as the driven roller 11*b* (the first roller), that is, on (above in the present embodiment) the most recent recording surface of the paper P, and the serrated roller 84 is configured to assume a state of proceeding into the medium transport path and to pinch the paper P between the serrated roller 84 and the drive roller 11*a* (the second roller) in the second separated state in which the driven roller 11*b* is separated from the medium transport path.

The serrated roller 84 is held by a second holding unit 82 to be capable of rotating and is configured to rock following the rocking of the driven roller 11*b*, using the same shaft portion 83 as the first holding unit 81 which holds the driven roller 11*b* as an axis.

In the second separated state, the drive roller 11*a* assumes a state of proceeding with respect to the medium transport path.

Accordingly, even in the state (the second separated state) in which the drive roller 11*a* and the driven roller 11*b* are separated from each other, it is possible to transport the paper using the drive roller 11*a* and the serrated roller 84. Since a serrated roller is used, it is also possible to suppress the transferring of the ink of the recording surface onto the serrated roller. It is also possible to omit the serrated roller 84.

Regarding Control of Operations of Heat Rollers by Control Unit

Next, a description will be given of the control of the operation of the heat roller pair 11 by the control unit 27.

The control unit 27 is configured to control the heating state of each of the subdivision regions M1, M2, and M3 in the heat roller pair 11 according to the conditions when performing the drying of the paper P using the heat roller pair 11.

Examples of the conditions when performing the drying of the paper P include the type of the paper, the paper size, the ink discharge amount, the margin size, the transport speed of the paper, whether or not the most recent recording surface of the paper is the reverse surface of the surface on which the recording is already performed, and the recording environment (temperature, humidity). The type of the paper includes not only the material, but also the type according to differences in the basis weight (the weight per unit area), the paper grain (longitudinal grain or latitudinal grain), and the like.

The control unit 27 is capable of suppressing wasteful power consumption by controlling the heating state of each of the subdivision regions M1, M2, and M3 in the heat roller pair 11 according to the conditions when performing the drying of the paper P using the heat roller pair 11.

For example, as long as the conditions when performing the drying of the paper P are conditions under which it is not necessary to achieve a uniform heating state along the entirety of the heat roller pair 11 in the width direction, it is possible to suppress the power consumption in the heat roller pair 11 by setting the heating states in a portion of the subdivision regions among the plurality of subdivision regions M1, M2, and M3 to a low temperature, not heating the portion of the subdivision regions, or the like.

A description will be given of the operation of the heat roller pair 11 giving specific examples of the conditions when performing the drying of the paper using the heat roller pair 11.

Control According to Conditions During Drying of Paper by Heat Roller Pair

First Control: Control According to Paper Size

When the drying of the end portions in the width direction of the paper P is insufficient, the end portions in the width direction lift up easily and there is a concern that the end portions will be scuffed or catch on the inside of the transport path.

Using the size of the paper P in the width direction as the condition when performing the drying of the paper P, the control unit 27 sets the heating state of the subdivision regions corresponding to regions other than the end portions in the width direction of the paper P to the first state, and sets the heating state of the subdivision regions corresponding to the end portions in the width direction of the paper P to the second state in which more heating is performed than the first state.

Table 1 illustrates an example of operational control (the first control) of the heat roller pair 11 according to the paper size.

TABLE 1

| SEGMENT SIZE | PAPER SIZE | SUBDIVISION REGION M1 | SUBDIVISION REGION M2 | SUBDIVISION REGION M3 |
|---|---|---|---|---|
| SMALL | BUSINESS CARD, POSTCARD, B6, A5, B5, A4, LETTER (LTR) | FIRST STATE | SECOND STATE | FIRST STATE |
| LARGE | B4, A3, LEGAL (LGL), LEDGER (LDR) | SECOND STATE | FIRST STATE | SECOND STATE |

Figure 6:
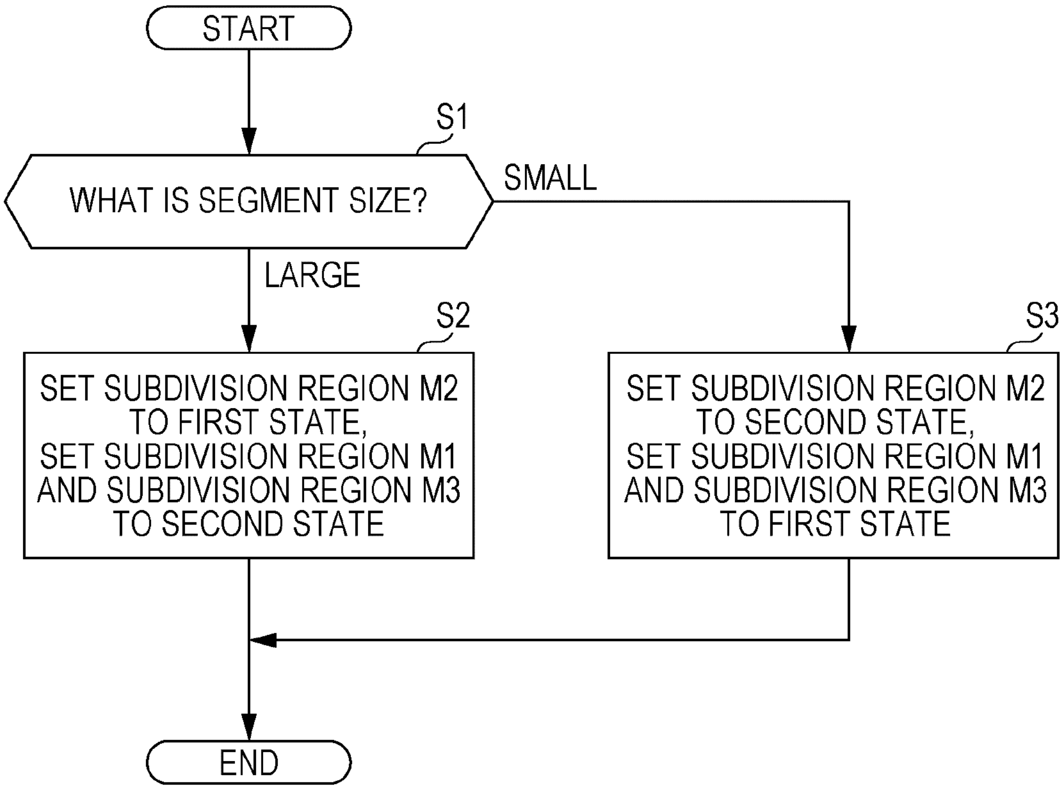
FIG. 6 is a flowchart illustrating the flow of a case in which the control unit controls the operation of the heat roller pair using paper size as a condition when performing the drying of paper using the heat roller pair.

Hereinafter, a description will be given of an example of the control which uses the size of the paper P in the width direction as the condition when performing the heating of the paper P, with reference to the flowchart illustrated in FIG. 6.

When the recording on the paper P is started, the control unit 27 determines the segment size of the paper in step S1.

In the present embodiment, business card, postcard, A4, A5, B5, B6, letter (LTR), and the like are set as small sizes, and larger sizes than the small sizes (for example, A3, B4, legal (LGL), ledger (LDR) size, and the like) are set as large sizes.

In the recording unit 2, the end portions of large size paper such as B4, A3, legal (LGL), and ledger (LDR) are positioned in the subdivision regions M1 and M3.

For the paper P of a small size such as business card, postcard, A4, A5, B5, B6, and letter (LTR), the entirety of the paper including the end portions in the width direction is included in the subdivision region M2.

In step S1, in a case in which it is determined that the paper size is the large size, the process proceeds to step S2, the heating state of the subdivision regions M1 and M3 in which the end portions in the width direction of the large size paper are positioned is set to the second state in which more heating is performed than the first state, and the heating state of the subdivision region M2 which is the center region in the width direction is set to the first state which is not heated more than the second state.

In step S1, in a case in which it is determined that the paper size is the small size, the process proceeds to step S3, the heating state of the subdivision regions M1 and M3 in which the end portions are not included is set to the first state, and the heating state of the subdivision region M2 in which the end portions in the width direction are positioned is set to the second state in which more heating is performed than the first state.

By controlling the heat roller pair 11 in this manner, it is possible to reliably perform the drying of the end portions in the width direction of the paper P and to reduce the concern of the occurrence of problems caused by the paper end portions lifting up, and it is possible to suppress the power consumption in the heat roller pair 11.

Second Control: Control According to Discharge Amount of Ink

The control unit 27 is also capable of controlling the heat roller pair 11 using the discharge amount of the ink (the liquid) as the condition when performing the drying of the paper P.

Figure 7:
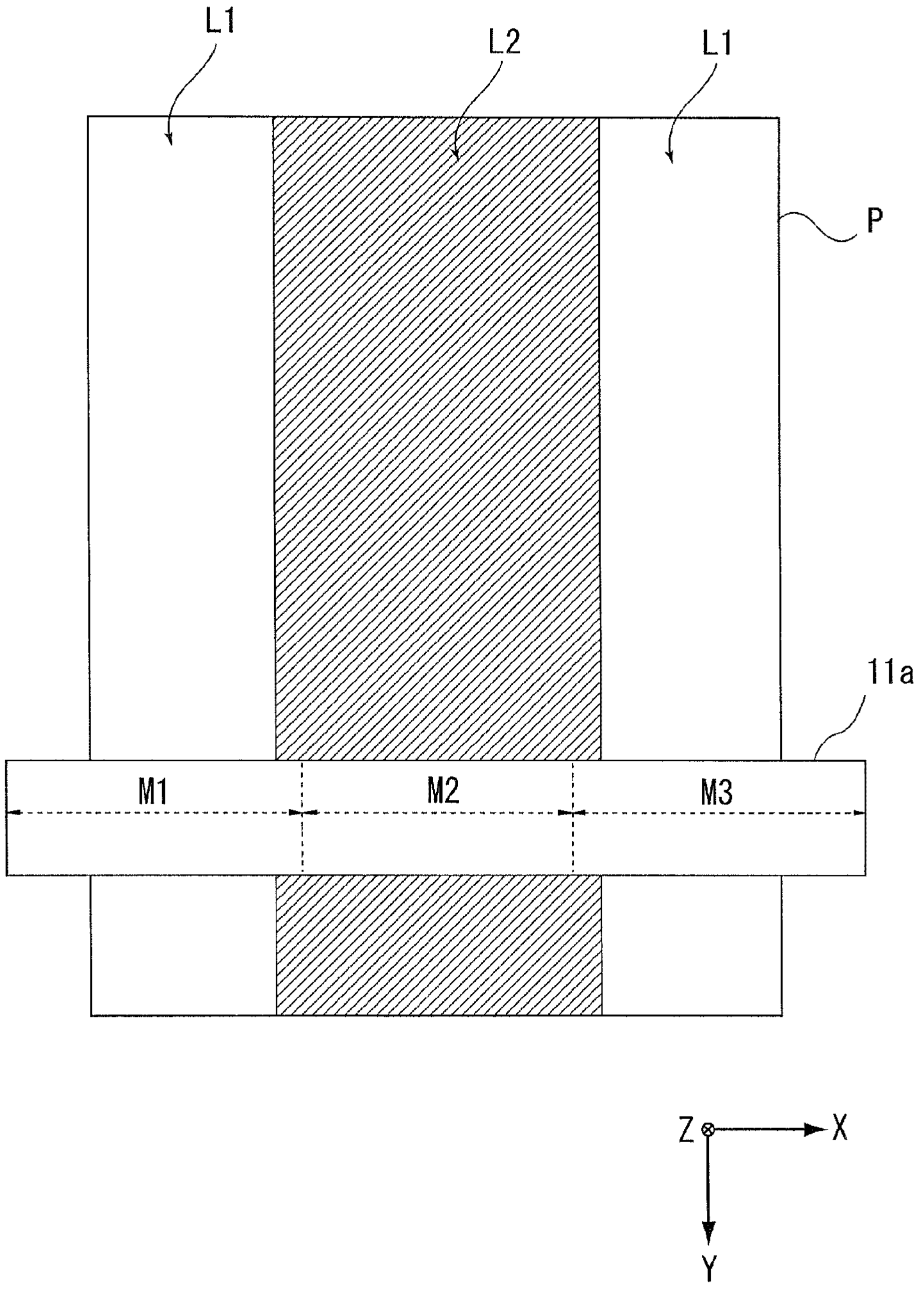
FIG. 7 is a diagram illustrating the case in which the control unit controls the operation of the heat roller pair using ink discharge amount as a condition when performing the drying of the paper using the heat roller pair.

More specifically, in the width direction of the paper P illustrated in FIG. 7, the control unit 27 sets the heating state of the subdivision regions M1 and M3 corresponding to a recording region L1 in which the discharge amount of the ink is less than or equal to a threshold value T1 to the first state, and sets the heating state of the subdivision region M2 corresponding to a recording region L2 in which the discharge amount of the ink exceeds the predetermined threshold value T1 to the second state in which more heating is performed than the first state.

Table 2 illustrates an example of operational control (the second control) of the heat roller pair 11 according to the discharge amount of the ink onto the paper P illustrated in FIG. 7.

TABLE 2

| RECORDING REGION OF PAPER IN WIDTH DIRECTION | INK DISCHARGE AMOUNT | CORRESPONDING SUBDIVISION REGION | SUBDIVISION REGION M3 |
|---|---|---|---|
| L1 | LESS THAN OR EQUAL TO THRESHOLD VALUE T1 | M1, M3 | FIRST STATE |
| L2 | EXCEEDS THRESHOLD VALUE T1 | M2 | SECOND STATE |

Since, in the width direction of the paper P, using the discharge amount of the ink as the condition when performing the drying of the paper P, the control unit 27 sets the heating states of the subdivision regions M1 and M3 corresponding to the recording region L1 in which the discharge amount of the ink is less than or equal to the threshold value T1 to the first state, and sets the heating state of the subdivision region M2 corresponding to the recording region L2 in which the discharge amount of the ink exceeds the threshold value T1 to the second state in which more heating is performed than the first state, it is possible to more reliably perform the trying of the paper P in the second state, and it is possible to suppress the power consumption in the first state to obtain suppression of the running costs.

The control unit 27 is also capable of controlling the heat roller pair 11 according to a condition when performing the drying of the paper P other than conditions such as the paper size and the discharge amount of the ink onto the paper P which are described above.

Modification Example of Configuration of Heat Roller Pair

Figure 8:
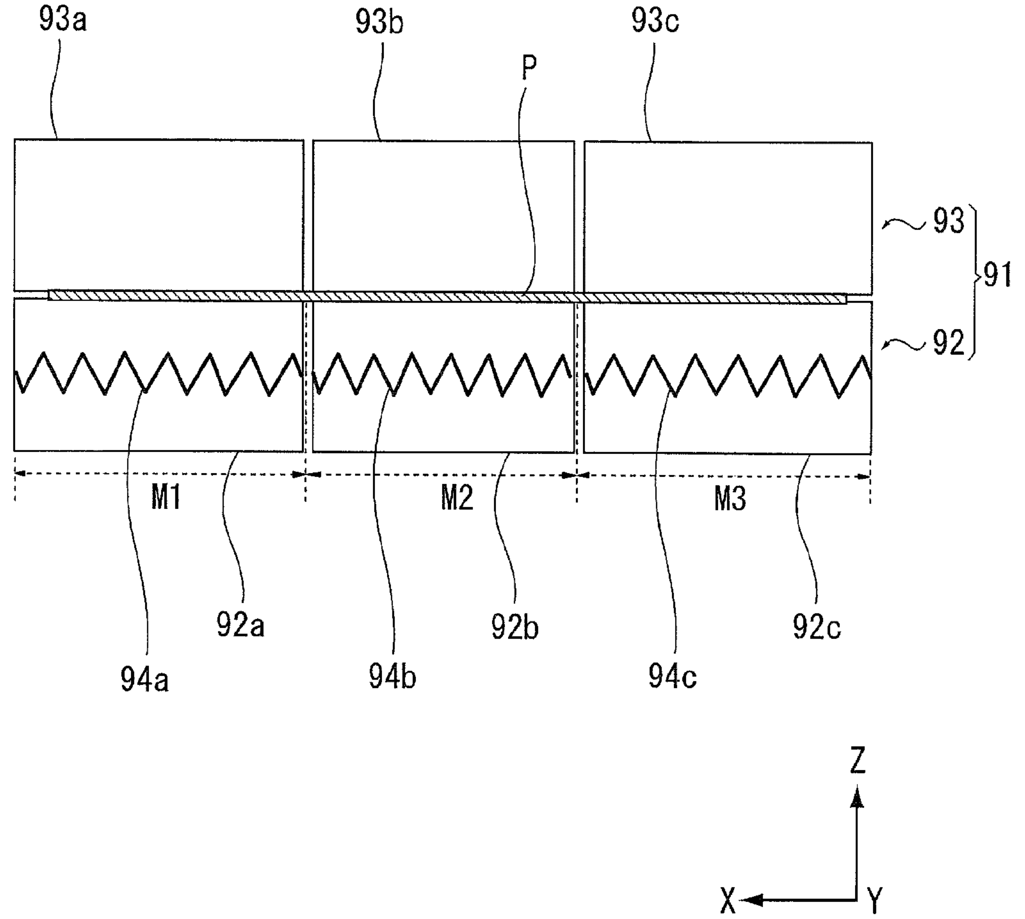
FIG. 8 is a diagram explaining a first modification example of the heat roller pair.
Figure 9:
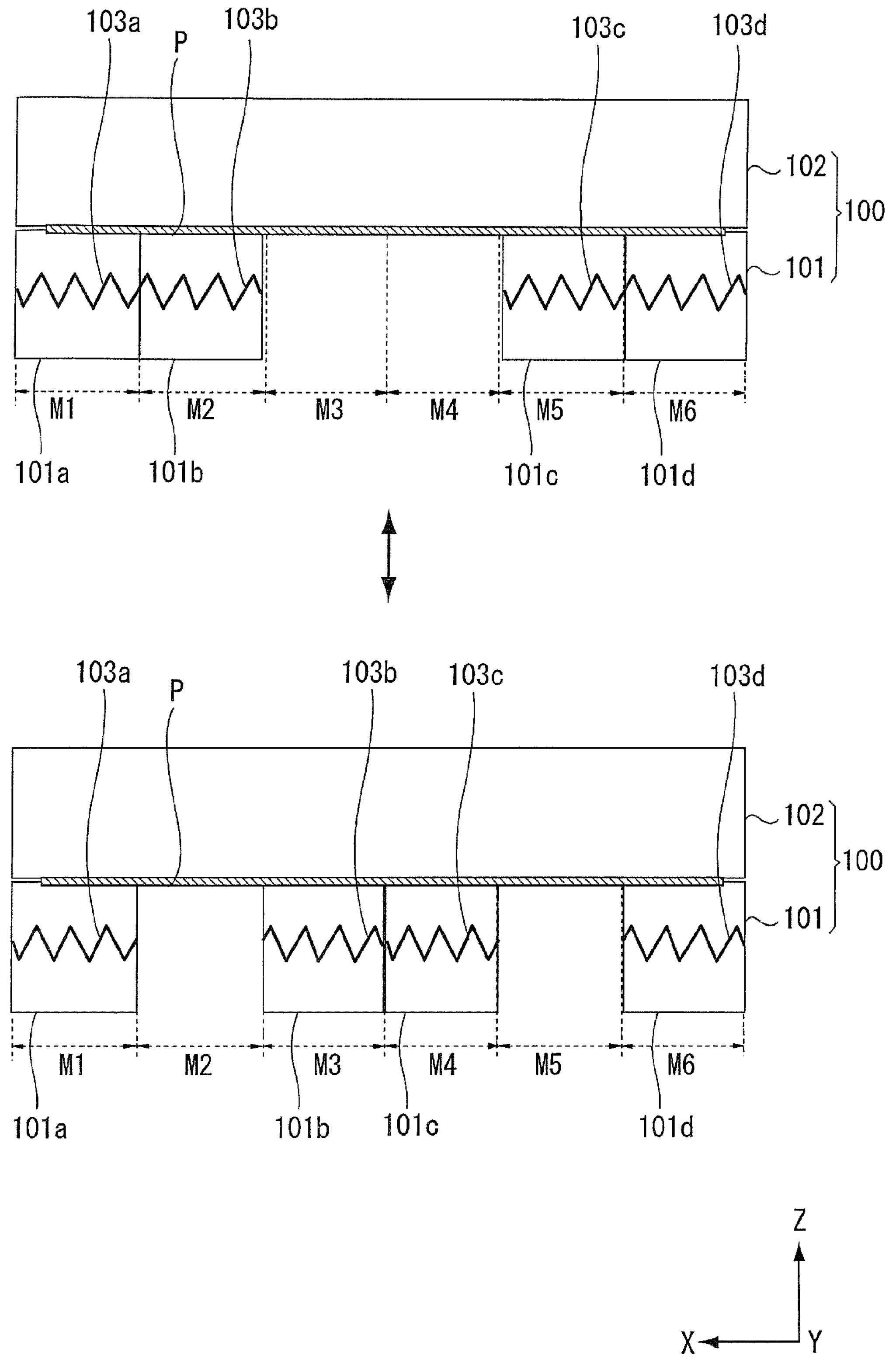
FIG. 9 is a diagram explaining a second modification example of the heat roller pair.

In addition, it the configuration in FIG. 4, it is possible to adopt configurations such as the first modification example illustrated in FIG. 8 or the second modification example illustrated in FIG. 9 for the heat roller pair 11.

First Modification Example

In heat roller pairs 91 illustrated in FIG. 8, a plurality of drive rollers 92 is disposed in the width direction and the drive rollers 92 are configured such that it is possible to control the heating state thereof individually.

The heat roller pairs 91 are provided with the drive rollers 92 and driven rollers 93, and the drive rollers 92 are configured by three drive rollers 92*a*, 92*b*, and 92*c* of lengths corresponding to the subdivision regions M1, M2, and M3. The drive rollers 92*a*, 92*b*, and 92*c* are provided with induction coils 94*a*, 94*b*, and 94*c*, respectively, which are capable of being controlled individually by the control unit 27.

The driven rollers 93 are configured by driven rollers 93*a*, 93*b*, and 93*c* which correspond to the drive rollers 92*a*, 92*b*, and 92*c*. The driven rollers 93 may be provided as a single roller which is provided to extend in the width direction.

Of the drive rollers 92 and the driven rollers 93 which configure the heat roller pairs 91, since the drive rollers 92 which are heated are provided with the plurality of drive rollers 92*a*, 92*b*, and 92*c* which is disposed in the width direction, and the drive rollers 92 are configured such that it is possible to individually control the heating states of the drive rollers 92*a*, 92*b*, and 92*c*, it is possible to easily perform modification of the heating states in the subdivision regions M1, M2, and M3 of the heat roller pairs 91.

In the same manner as in the heat roller pair 11 illustrated in FIG. 5, in the heat roller pairs 91, it is possible to configure the drive rollers 92*a*, 92*b*, and 92*c* and the driven rollers 93*a*, 93*b*, and 93*c* which correspond to the drive rollers 92*a*, 92*b*, and 92*c* to be capable of switching between a pinching state in which the paper P is pinched by the driven rollers 93*a*, 93*b*, and 93*c* and the drive rollers 92*a*, 92*b*, and 92*c* and a separated state in which the driven rollers 93*a*, 93*b*, and 93*c* and the drive rollers 92*a*, 92*b*, and 92*c* are separated from each other.

Second Modification Example

In a heat roller pair 100 illustrated in the top and bottom portions of FIG. 9, of drive rollers 101 and a driven roller 102, at least two of the drive rollers 101 which are heated are provided in the width direction and each is configured to be capable of movement in the width direction.

In the present embodiment, the drive rollers 101 are provided with four rollers which are capable of moving in the width direction, drive rollers 101*a*, 101*b*, 101*c*, and 101*d*.

The drive rollers 101*a*, 101*b*, 101*c*, and 101*d* are provided with induction coils 103*a*, 103*b*, 103*c*, and 103*d* which are capable of being controlled individually by the control unit 27.

In both portions of FIG. 9, the heating region of the heat roller pair 100 is divided in the width direction into six subdivisions which are equidistant subdivision regions M1, M2, M3, M4, M5, and M6 in order from the +X direction side. The length in the width direction of each of the drive rollers 101*a*, 101*b*, 101*c*, and 101*d* corresponds to the length in the width direction of the subdivision region of one segment.

As described earlier, the drive rollers 101*a*, 101*b*, 101*c*, and 101*d* are capable of moving in the width direction and are capable of moving to positions corresponding to four of the subdivision regions among the subdivision regions M1, M2, M3, M4, M5, and M6.

For example, in the top portion of FIG. 9, the drive rollers 101*a*, 101*b*, 101*c*, and 101*d* are disposed at positions corresponding to the subdivision regions M1, M2, M5, and M6. By disposing the drive rollers 101*a*, 101*b*, 101*c*, and 101*d* in this manner, it is possible to adopt a configuration in which the subdivision regions M1, M2, M5, and M6 which are at the end portion sides in the width direction of the paper P are heated and the subdivision regions M3 and M4 which are the center region in the width direction of the paper P are not heated.

It is possible to adopt a configuration in which, when the drive rollers 101*b* and 101*c* are moved from the state of FIG. 9 to the center region side in the width direction, the subdivision regions M1, M3, M4, and M6 are heated and the subdivision regions M2 and M5 are not heated. In other words, it is possible to adopt a configuration in which both the paper end portions and the center region are heated, leaving an interval in the width direction.

By adopting the configuration described above, it is possible to easily perform modification of the heating state in the subdivision regions M1 to M6 of the heat roller pair 100.

It is also possible to configure the drive rollers 101*a*, 101*b*, 101*c*, and 101*d* to be capable of separating from individually corresponding driven rollers 102. Accordingly, it is possible to further increase the freedom of modification of the heating state in the subdivision regions M1 to M6.

In addition to a case in which the driven roller 102 is formed by a single roller which is provided to extend in the width direction as illustrated in FIG. 9, it is possible to form the driven roller 102 by disposing short rollers corresponding to the drive rollers 101*a*, 101*b*, 101*c*, and 101*d* lined up in the width direction in the same manner as the driven rollers 93 of the first modification example (FIG. 8).

Regarding Switching Between First State and Second State of Heat Roller Pair

In a case in which the drive rollers 92 and the driven rollers 93 are formed by lining up short roller pairs corresponding to the subdivision regions M1, M2, and M3 in the width direction as in the heat roller pairs 91 illustrated in FIG. 8, it is possible to perform the switching between the first state and the second state of the heat roller pairs 91 in the following manner.

In other words, the control unit 27 sets the first state of the heat roller pairs 91 to a non-heating state in which the heat roller pairs 91 are not heated and to the separated state (refer to the middle or right portions of FIG. 5 which explain the heat roller pair 11), and sets the second state of the heat roller pairs 91 to the heating state in which the heat roller pairs 91 are heated and to the pinching state (refer to the left portion of FIG. 5 which explains the heat roller pair 11).

If the heat roller pairs 91 are set to the non-heating state in which the heat roller pairs 91 are not heated in a case in which the first state of the heat roller pairs 91 is adopted, although it is possible to effectively suppress the power consumption, when the heat roller pairs 91 are set to the non-heating state in which the heat roller pairs 91 are not heated, the paper contacts the heat roller pairs 91 straight after the recording in a state in which the temperature of the heat roller pairs 91 is low. Since the ink easily adheres to the roller surface having a low temperature, the ink of the recording surface may adhere to the heat roller pairs 91.

However, since the control unit 27 sets the heat roller pairs 11 to the separated state when the heat roller pairs 91 are set to the non-heating state in which the heat roller pairs 91 are not heated, it is possible to suppress the concern of the ink of the recording surface adhering to the heat roller pairs 11 which are set to the non-heating state and have a low temperature.

When a state in which the heat roller pairs 91 reach a temperature which is suitable for performing the drying of the paper is set to a target heating state, the temperature of the heat roller pairs 91 of the target heating state is set to a high temperature in the vicinity of 180° C., for example.

Therefore, there is a case in which it takes time from when the heating of the heat roller pairs 91 is started until the temperature rises to the target heating state. When the heat roller pairs 91 having a low temperature which is not the target heating state are set to the pinching state, there is a concern that the ink of the recording surface will adhere to the heat roller pairs 91 having a low temperature.

Therefore, in a case in which the heat roller pairs 91 do not reach the target heating state, the control unit 27 sets the heat roller pairs 91 to the separated state, and in a case in which the heat roller pairs 91 reach the target heating state, the control unit 27 sets the heat roller pairs 91 to the pinching state.

Accordingly, it is possible to suppress the concern of the paper contacting the heat roller pairs 91 in a state in which the heat roller pairs 91 do not reach the target heating state and the ink of the recording surface adhering to the heat roller pairs 91.

In a case in which a configuration is adopted in which the drive rollers 92*a*, 92*b*, and 92*c* are heated in addition to the driven rollers 93*a*, 93*b*, and 93*c* in the heat roller pairs 91, the control unit 27 is also capable of performing control differentiating between the heating state of the driven roller 93*a* and the heating state of the drive roller 92*a*, for example.

For example, the control unit 27 performs control such that the driven roller 93*a* is heated more than the drive roller 92*a*. Since the driven roller 93*a* which contacts the most recent recording surface is heated more than the drive roller 92*a* which contacts the opposite surface from the most recent recording surface, it is possible to suppress the power consumption while reliably performing the drying of the recording surface.

Second Embodiment

Figure 10:
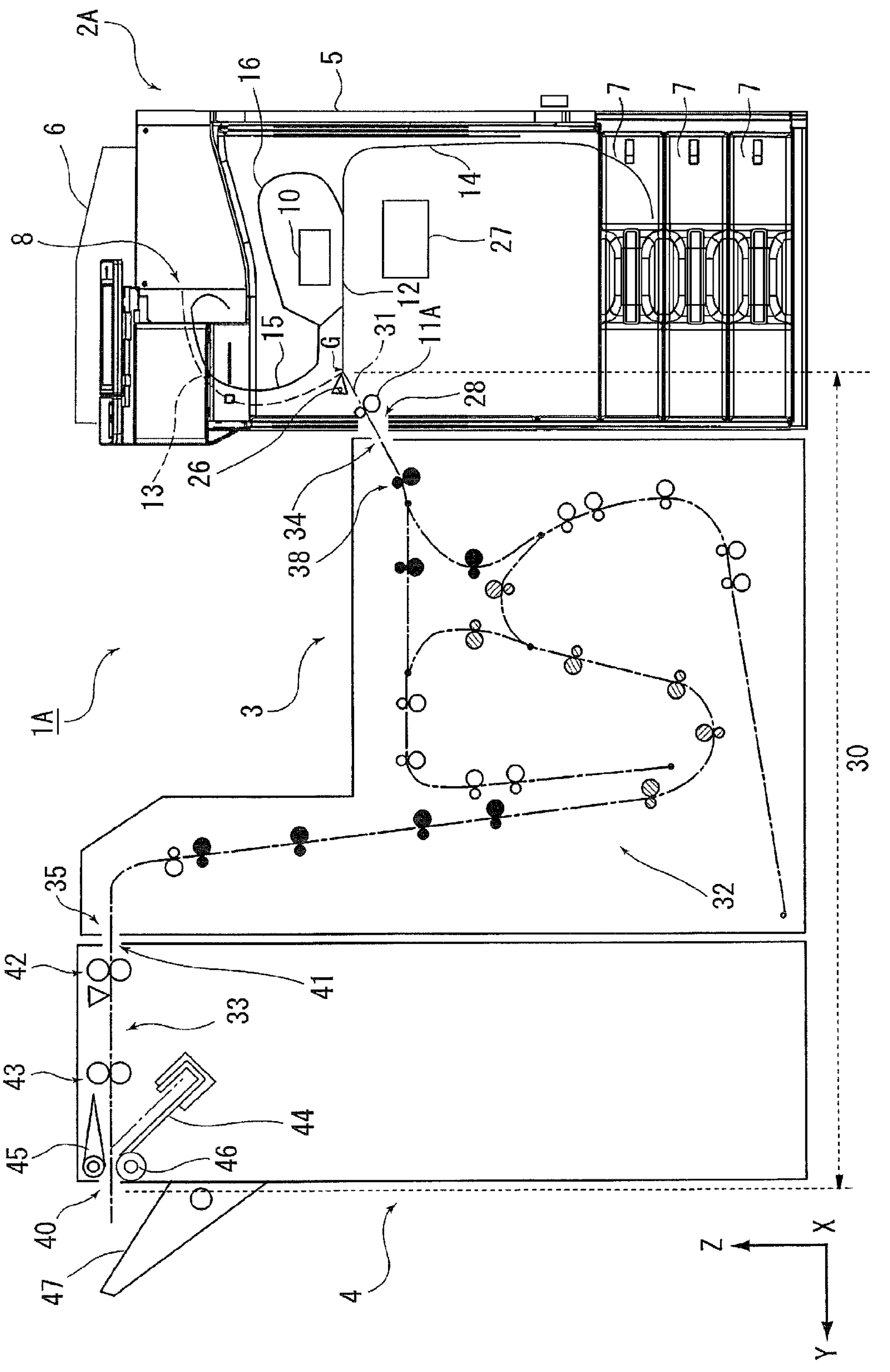
FIG. 10 is a schematic diagram illustrating a recording system according to a second embodiment.

In the present embodiment, a description will be given of a recording system 1A which is provided with a recording unit 2A in which the disposition of the heat roller pair which serves as "the drying unit" is different, with reference to FIG. 10.

In the present embodiment, the constituent elements that are the same as those of the first embodiment will be given the same reference numerals as in the first embodiment and the description thereof will be omitted.

In the recording unit 2A (the recording system 1A), of the plurality of downstream side transport paths including the first downstream side transport path 13 to which the paper is fed after the recording and the second downstream side transport path 30 which has a longer path length than the first downstream side transport path 13, a heat roller pair 11A which serves as "the drying unit" which performs the drying of the paper after the recording by contacting the paper and heating the paper is not provided in the first downstream side transport path 13 and is provided in the second downstream side transport path 30.

More specifically, the heat roller pair 11A is provided in the recording unit path 31 of the recording unit 2A. In other words, the heat roller pair 11A is provided in the medium transport path between the branching portion G and the delivery portion 28.

The heat roller pair 11A has the same configuration as the heat roller pair 11 which is described in the first embodiment. It is also possible to adopt a similar configuration to that of the heat roller pairs 91 which are described as the first modification example of the heat roller pair 11 or the heat roller pair 100 which is described as the second modification example.

Due to the heat roller pair 11A not being provided in the first downstream side transport path 13 but being provided in the second downstream side transport path 30, in a case in which the paper is fed to the second downstream side transport path 30 which has a long path length in which problems such as paper jams occur easily inside the path when the drying of the paper is insufficient, it is possible to reliably perform the drying of the paper and to reduce a concern of problems occurring.

Meanwhile, in a case in which the paper is fed to the first downstream side transport path 13 in which problems do not occur easily, the drying by the drying unit is not performed, wasteful power consumption is avoided, and it is possible to suppress the running cost of the recording apparatus.

As long as the heat roller pair 11A which is provided in the recording system 1A is provided in the second downstream side transport path 30, the heat roller pair 11A is not limited to being provided inside the recording unit 2A and may be provided in the relay unit 3, for example. For example, it is possible to use a transport roller pair 38 which is on the most upstream side as the heat roller pair.

It is also possible to provide the heat roller pair 11A in the medium transport path (the after-treatment unit path) of the after-treatment unit 4 depending on the shape and path length of the medium transport path (the relay unit path 32) inside the relay unit 3.

Third Embodiment

Figure 11:
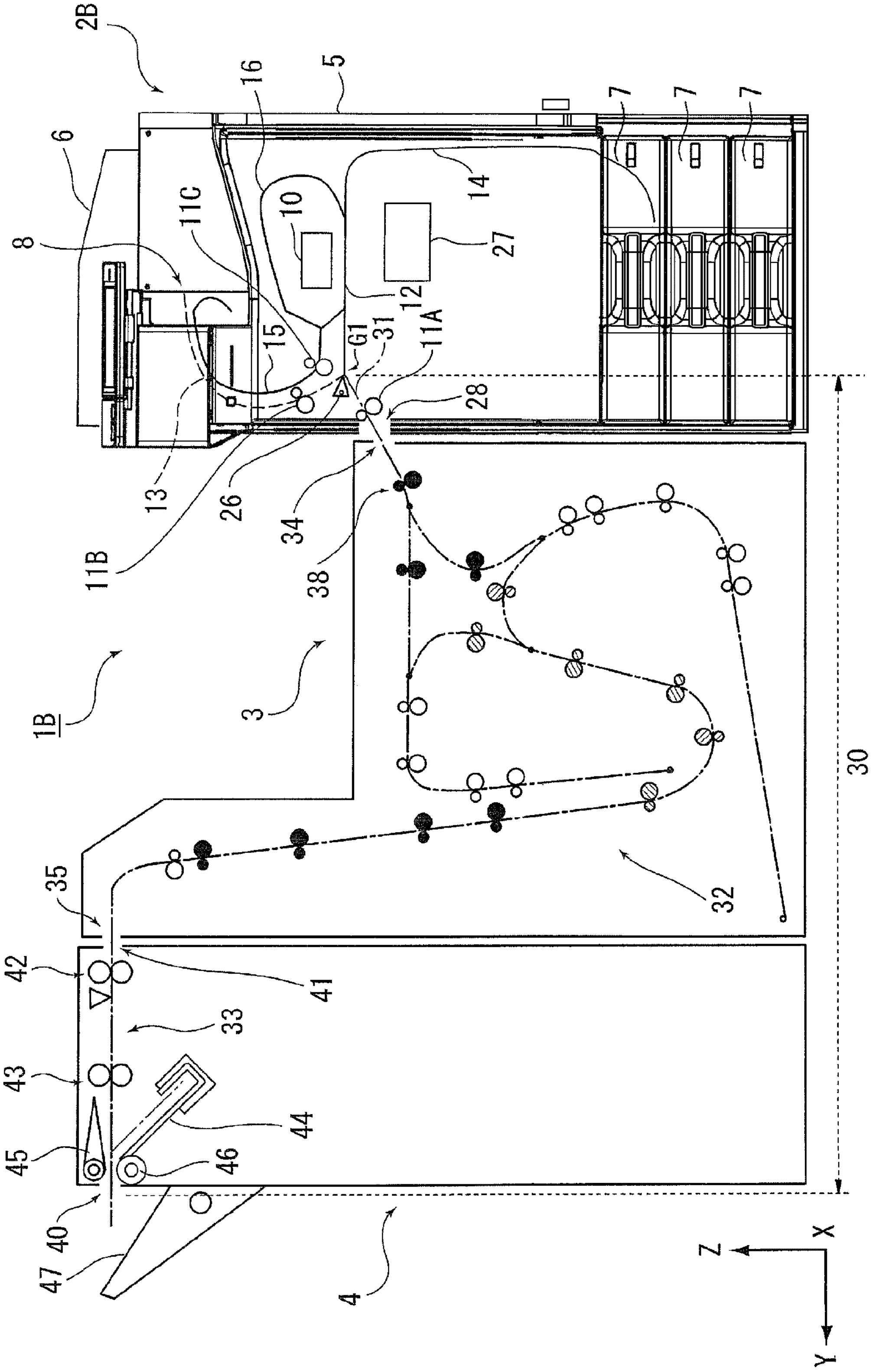
FIG. 11 is a schematic diagram illustrating a recording system according to a third embodiment.

In the present embodiment, a description will be given of still another example of the recording system according to the disclosure with reference to FIG. 11.

In the present embodiment, the constituent elements that are the same as those of the previously described embodiments will be given the same reference numerals as in the first embodiment and the description thereof will be omitted.

In a recording system 1B according to the present embodiment, a recording unit 2B (the recording apparatus) is provided with heat roller pairs 11A, 11B, and 11C which serve as "the drying unit" in the first downstream side transport path 13, the second downstream side transport path 30, and the duplex recording switchback path 15 which serves as the third downstream side transport path, respectively. The first to the third downstream side transport paths serve as the plurality of downstream side transport paths which branch at the branching portions G1 and G2 which are positioned on the downstream side of the line head 10.

Each of the heat roller pairs 11A, 11B, and 11C is controlled individually by the control unit 27.

Even in the present embodiment, each of the heat roller pairs 11A, 11B, and 11C has the same configuration as the heat roller pair 11 which is described in the first embodiment. Naturally, it is possible to adopt the same configuration as the heat roller pairs 91 (FIG. 8) or the heat roller pair 100 (FIG. 9).

Due to the heat roller pairs 11A, 11B, and 11C being provided in the first downstream side transport path 13, the second downstream side transport path 30, and the duplex recording switchback path 15 which serve as the plurality of downstream side transport paths, respectively, it is possible to perform the drying of the paper under conditions which are suitable for each of the downstream side transport paths.

Therefore, it is possible to suitably dry the paper and it is possible to suppress the power consumption.

As long as the disposition of the heat roller pair 11A which is provided in the second downstream side transport path 30 is in the second downstream side transport path 30, the heat roller pair 11A is not limited to being provided inside the recording unit 2A and may be provided in the relay unit 3, for example. For example, it is possible to use the transport roller pair 38 which is on the most upstream side as the heat roller pair. It is also possible to provide the heat roller pair 11A in the medium transport path (the after-treatment unit path) of the after-treatment unit 4 depending on the shape and path length of the medium transport path (the relay unit path 32) inside the relay unit 3.

Regarding Path of Case in which Paper is Fed to Second Output Portion Via Relay Unit Hereinafter, a description will be given of the second downstream side transport path 30 which is the paper transport path in a case in which the paper, after the recording in the line head 10, is output from the second output portion 40 in the recording system 1 illustrated in FIG. 1, with reference to FIGS. 12 to 14, mainly.

As illustrated in FIG. 1, the second downstream side transport path 30 is provided with the recording unit path 31, the relay unit path 32 which is the transport path in the relay unit 3, and the after-treatment unit path 33 which is the transport path in the after-treatment unit 4.

The paper after the recording is fed from the delivery portion 28 of the recording unit 2 to the relay unit 3. Specifically, the paper after the recording is fed to the recording unit path 31 illustrated in FIG. 1, passes through the delivery portion 28, and enters the relay unit path 32 from the upstream side relay section 34 of the relay unit 3.

Hereinafter, a description will be given of the relay unit path 32 with reference to FIG. 12. In each of the transport roller pairs illustrated in FIG. 12, the drive roller which is driven by a drive source such as a motor is depicted by a large circle and the driven roller which is driven to rotate is depicted by a small circle. The driving of the drive roller of each of the transport roller pairs is controlled by the control unit 27 (FIGS. 1 and 2) and the paper is transported in the relay unit path 32.

Figure 12:
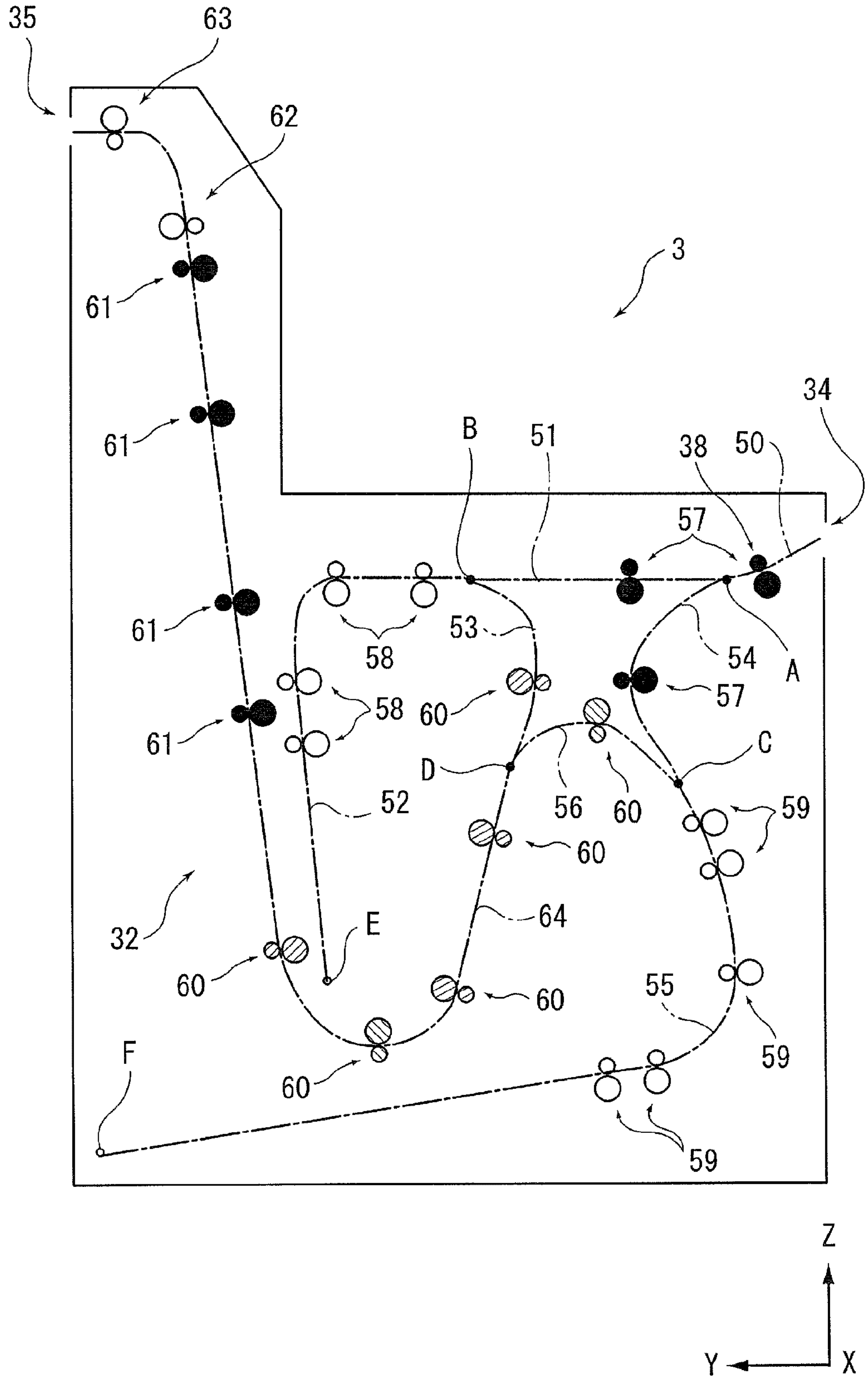
FIG. 12 is a schematic diagram illustrating a transport path of a relay unit path.

The relay unit path 32 illustrated in FIG. 12 includes branching points A, B, and C at which the transport path branches, a merging point D at which transport paths merge, and end portions E and F which form the ends of the transport paths of the paper. The branching points A, B, and C are provided with guide flaps (not illustrated) which allocate the transport paths of the paper.

Furthermore, the relay unit path 32 is configured by an introduction path 50 (between the upstream side relay section 34 and the branching point A), a first branching path 51 (between the branching point A and the branching point B), a first switchback path 52 (between the branching path B and the end portion E), a first merging path 53 (between the branching point B and the merging point D), a second branching path 54 (between the branching point A and the branching point C), a second switchback path 55 (between the branching point C and the end portion F), a second merging path 56 (between the branching point C and the merging point D), and a lead-out path 64 (between the merging point D and the downstream side relay section 35).

A first transport roller pair group 57 is provided in the introduction path 50, the first branching path 51, and the second branching path 54. A second transport roller pair group 58 is provided in the first switchback path 52. A third transport roller pair group 59 is provided in the second switchback path 55. A fourth transport roller pair group 60 is provided in the first merging path 53, the second merging path 56, and on the upstream side in the lead-out path 64 in the transport direction of the paper. A fifth transport roller pair group 61, a correction roller pair 62, and an output roller pair 63 are provided on the downstream side in the lead-out path 64 in the transport direction of the paper.

The correction roller pair 62 is a roller pair which rectifies the skewing of the paper in a case in which skewing (oblique motion) of the paper occurs with respect to the transport direction in the relay unit path 32. Specifically, the rectification of the skewing of the paper is performed by the control unit 27 causing the paper to abut the correction roller pair 62 (a medium transport unit) in a stopped state. The abutting of the paper to the correction roller pair 62 in the stopping state is performed at high speed by raising the transport speed of the paper of the fifth transport roller pair group 61, and so it is possible to effectively correct the skewing. The paper which is caused to abut the correction roller pair 62 to rectify the oblique motion is nipped by the correction roller pair 62 and is fed to the downstream side relay section 35.

The correction roller pair 62 is positioned on the downstream side in the transport direction with respect to the fifth transport roller pair group 61 and is disposed such that the leading end of the paper reaches the downstream side relay section 35 during the transporting by the correction roller pair 62. In other words, the correction roller pair 62 is disposed close to the downstream side relay section 35.

The second transport roller pair group 58 and the third transport roller pair group 59 are capable of rotating in a forward rotation direction or a reverse rotation direction and are capable of inverting the transport direction of the paper in the first switchback path 52 and the second switchback path 55.

Next, a description will be given of the flow of the paper transporting in the relay unit path 32 with reference to FIGS. 13 and 14. FIGS. 13 and 14 are diagrams corresponding to FIG. 12 and the depiction of the constituent elements of the transport system such as the first transport roller pair group 57 to the fifth transport roller pair group 61, the correction roller pair 62, and the output roller pair 63 is omitted. Furthermore, in FIGS. 13 and 14, the portion of the relay unit path 32 that is used in the transporting of the paper is indicated by a solid line, and the portion of the relay unit path 32 that is not used in the transporting of the paper is indicated by a dashed line. In FIGS. 13 and 14, the arrows in the diagrams indicate the transport direction of the paper and each is given a reference numeral from among H1 to H6.

Figure 13:
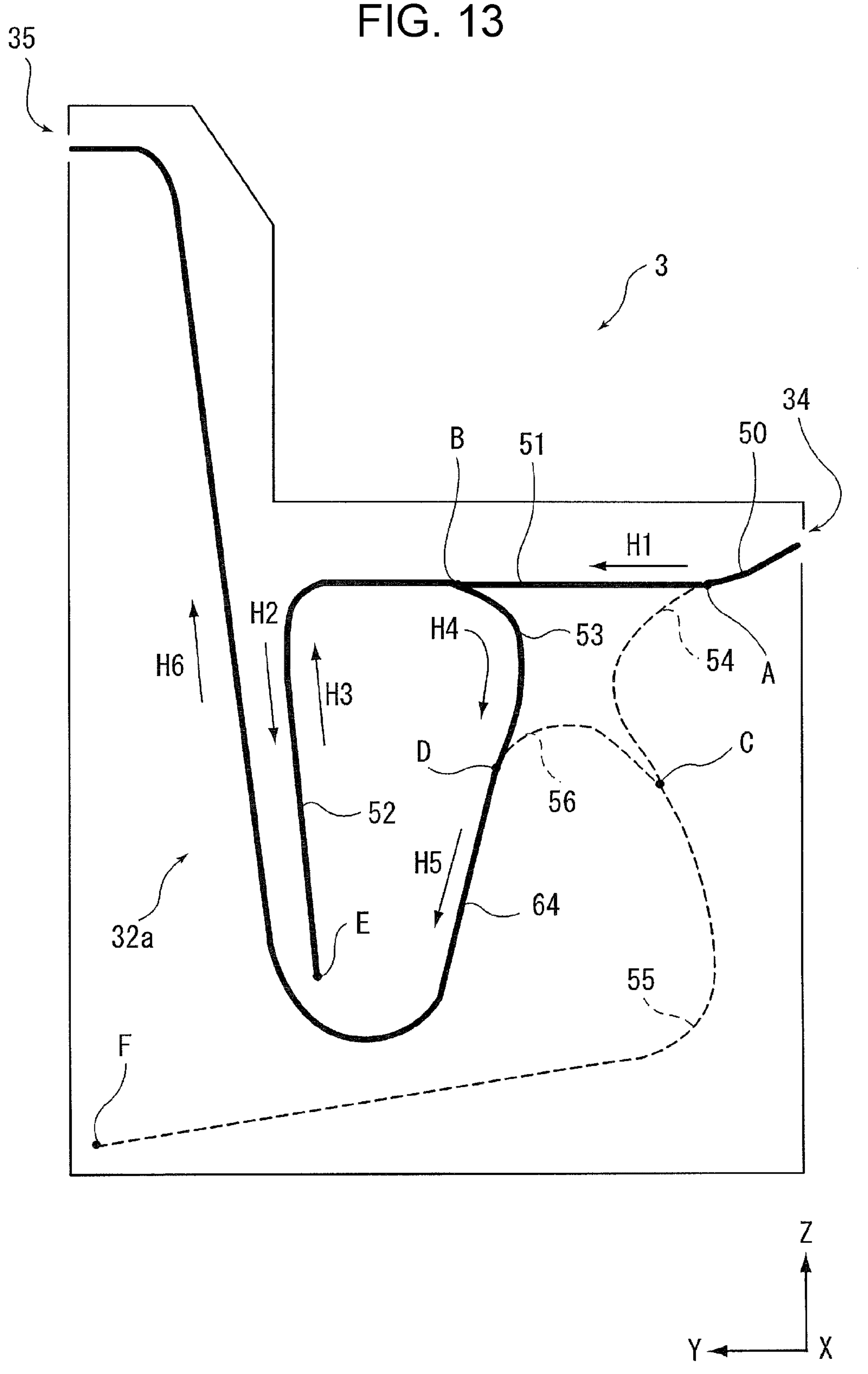
FIG. 13 is a schematic diagram illustrating a first path of the relay unit path.
Figure 14:
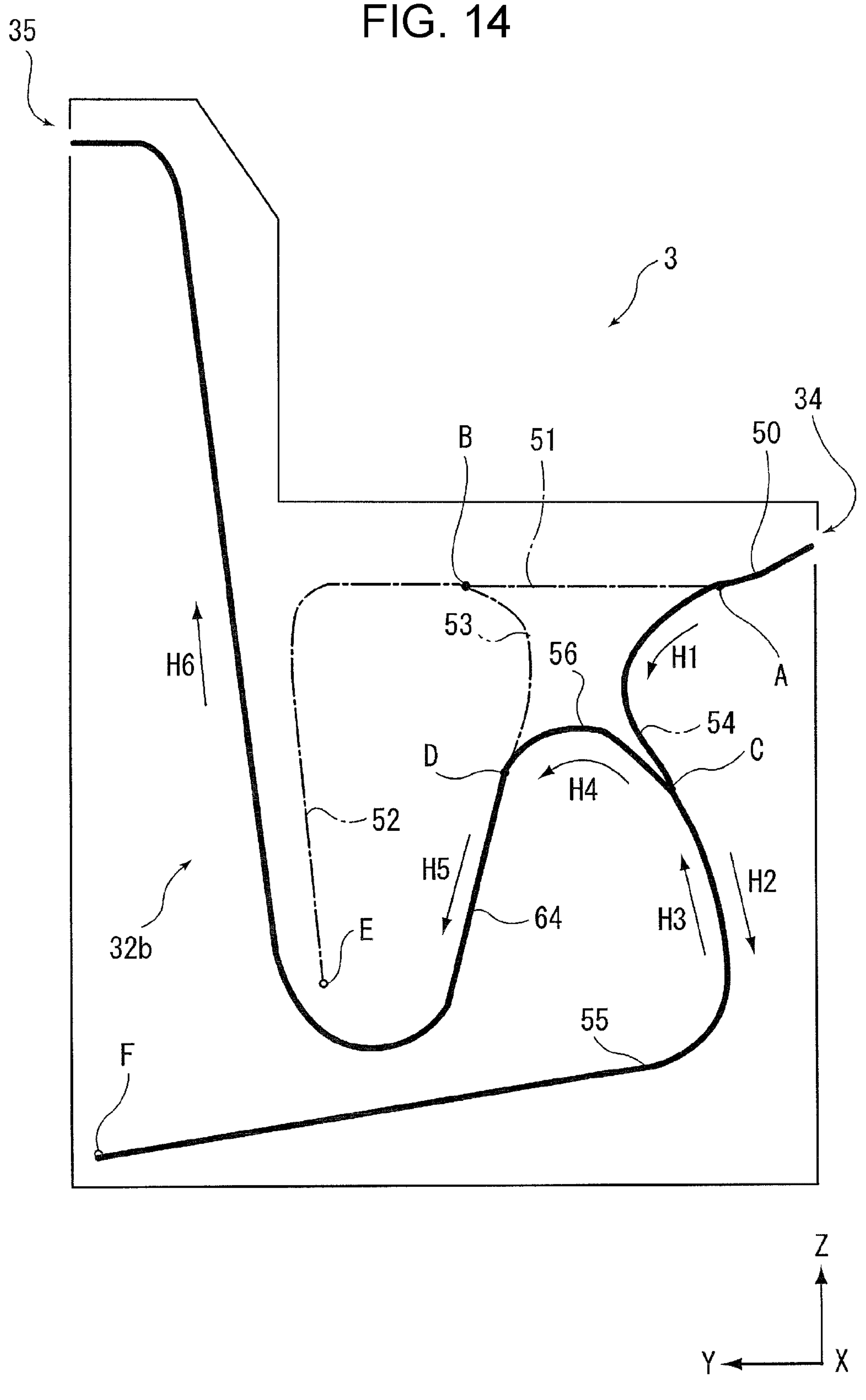
FIG. 14 is a schematic diagram illustrating a second path of the relay unit path.

The relay unit path 32 is capable of transporting the paper in two paths, a first path 32*a* illustrated in FIG. 13 (the path indicated by the solid line in FIG. 13) and a second path 32*b* illustrated in FIG. 14 (the path indicated by the solid line in FIG. 14).

As indicated by the solid line in FIG. 13, the first path 32*a* to which the paper is transported is configured by the introduction path 50, the first branching path 51, the first switchback path 52, the first merging path 53, and the lead-out path 64.

In the first path 32*a* illustrated in FIG. 13, the paper which is fed from the upstream side relay section 34 passes through the introduction path 50, progresses in the transport direction H1 in the first branching path 51, and enters the first switchback path 52. The paper which is transported into the first switchback path 52 proceeds in the direction of the transport direction H2, the progression direction of the paper is subsequently inverted (switched back), the paper progresses in the transport direction H3 which is the opposite direction from the transport direction H2, and enters the first merging path 53. Next, the paper progresses in the transport direction H4 in the first merging path 53 to enter the lead-out path 64, progresses in the transport direction H5 and the transport direction H6 in the lead-out path 64, and is transported out from the downstream side relay section 35 toward the receiving portion 41 (FIG. 1) of the after-treatment unit 4.

Meanwhile, the second path 32*b* indicated by the solid line in FIG. 14 is configured by the introduction path 50, the second branching path 54, the second switchback path 55, the second merging path 56, and the lead-out path 64.

In the second path 32*b* illustrated in FIG. 14, the paper which is transported in from the upstream side relay section 34 passes through the introduction path 50, progresses in the transport direction H1 in the second branching path 54, and is transported into the second switchback path 55. The paper which is transported into the second switchback path 55 proceeds in the transport direction H2, the progression direction of the paper is subsequently inverted (switched back), the paper progresses in the transport direction H3 which is the opposite direction from the transport direction H2, and is transported into the second merging path 56. Next, the paper progresses in the transport direction H4 in the second merging path 56 to enter the lead-out path 64, progresses in the transport direction H5 and the transport direction H6 in the lead-out path 64, and is transported out from the downstream side relay section 35 toward the receiving portion 41 (FIG. 1) of the after-treatment unit 4.

In a case in which the recording is performed consecutively on a plurality of sheets of paper, regarding the paper which is transported into the upstream side relay section 34, the leading medium on which the recording is previously performed, for example, is guided into the first path 32*a* by a guide flap (not illustrated) which is provided at the branching point A. Next, the following medium which is transported in from the upstream side relay section 34 is guided into the second path 32*b* by a guide flap (not illustrated) which is provided at the branching point A.

The transporting of the paper by the first path 32*a* and the transporting of the paper by the second path 32*b* are repeated alternately.

As described above, in the second downstream side transport path 30, since the relay unit path 32 is configured to include the first switchback path 52 and the second switchback path 55, the paper is transported for a longer transporting distance.

Next, the paper which is transported out from the downstream side relay section 35 of the relay unit 3 is transported from the receiving portion 41 of the after-treatment unit 4 illustrated in FIG. 1 into the after-treatment unit path 33. The paper which enters the after-treatment unit path 33 is fed by transport roller pairs 42 and 43 and the leading end side reaches the second output portion 40. A guide flap 45 is provided in the vicinity of the upstream side of the second output portion 40 and the paper is guided by the guide flap 45 and is stacked in an after-treatment section 44 with the paper rear end side facing the −Z-axis direction side.

When a plurality of sheets (or a single sheet) of paper which is set is stack in the after-treatment section 44, the after-treatment (cutting, a stapling process, or the like) is executed. The sheet or the stack of paper after the after-treatment is executed is output in the +Y-axis direction by an output roller 46 and is placed on an output tray 47.

In the first switchback path 52 or the second switchback path 55 of the relay unit path 32, before and after the progression direction of the paper is switched back, the position of the surface (for example, the first surface) of the paper is inverted with respect to the transport direction.

Therefore, the obverse and the reverse of the paper which is transported in from the upstream side relay section 34 is inverted (the positions of the first surface and the second surface) with respect to the transport direction while the paper is being transported in the first path 32*a* or the second path 32*b*. The paper is transported out from the downstream side relay section 35 to the after-treatment unit 4 (FIG. 1) in a state in which the obverse and the reverse are inverted with respect to the transport direction.

Other Configuration in Recording Unit

Hereinafter, a description will be given of the other configuration in the recording unit 2.

In addition to a case in which the recording unit 2 illustrated in FIG. 2 feeds the paper which is stored in the paper storage cassettes 7 and performs the recording, the recording unit 2 is configured such that it is possible to feed the paper from a manual tray 70. In FIG. 2, a dotted line R indicates the transport path of a case in which the paper is fed from the manual tray 70.

The paper which is fed from the manual tray 70 is fed by a transport roller pair 71, merges with the straight path 12, and the recording is performed by the line head 10. In a case in which duplex recording is performed, after the recording onto the first surface, the paper passes through the duplex recording switchback path 15 and the inverting path 16 to be inverted, and the recording is performed onto the second surface.

The paper after the recording is transported in a fourth downstream side transport path 74 which connects to the straight path 12 and is provided to extend linearly, passes through an output portion 72, and is placed on a paper output tray 73.

Since the fourth downstream side transport path 74 is short and the shape is substantially linear and simple, in a case in which the paper after the recording is fed to the fourth downstream side transport path 74, it is preferable that the paper be dried in the first state in the same manner as a case in which the paper is fed to the first downstream side transport path 13.

Other Examples of Control of Operation of Heat Roller Pair by Control Unit

In addition to the first control and the second control which are described above, the control unit 27 is also capable of performing a third control and a fourth control, as described below, on the heat roller pair 11 (the drying unit) illustrated in the first embodiment, for example.

Third Control

As described earlier, the heat roller pair 11 (the drying unit) is provided in the medium transport path between the line head 10 (the recording section) and the branching portion G1 at which the medium transport path branches into a plurality of downstream side transport paths (the first downstream side transport path 13 and the second downstream side transport path 30). The position at which the heat roller pair 11 is provided is also between the branching portion G2, at which the medium transport path branches into the duplex recording switchback path 15 which serves as the third downstream side transport path, and the line head 10.

The control unit 27 is configured to control the operation of the heat roller pair 11 according to which path the paper is to be fed into after the recording by the line head 10 from among the plurality of downstream side transport paths [the first downstream side transport path 13, the second downstream side transport path 30, and the duplex recording switchback path 15 (the third downstream side transport path)].

Of the first downstream side transport path 13 for outputting the paper from the first output portion 8 which is provided in the recording unit 2 and the second downstream side transport path 30 to which the paper is outputted after being fed to the after-treatment unit 4 via the relay unit 3, the second downstream side transport path 30 is longer and the medium transport path thereof is more complex than the first downstream side transport path 13 (refer to FIG. 1).

In a case in which the paper passes through the long and complex medium transport path after the recording, when the drying of the paper after the recording is insufficient, there is an increased concern of catching, jamming, and the like of the paper in the medium transport path originating in curling which occurs in the paper after the recording, a reduction in the rigidity of the paper caused by the paper containing the ink (the liquid), or the like. Therefore, it is necessary to thoroughly dry the paper after the recording.

Meanwhile, when the paper is transported in the first downstream side transport path 13 which is the medium transport path having a comparatively simple shape, even if the drying of the paper after the recording is insufficient, there is little concern of the occurrence of catching, jamming, and the like of the paper in the medium transport path. Therefore, there is a case in which a certain degree of drying is sufficient.

Here, due to the control unit 27 controlling the operation of the heat roller pair 11 according to which path the paper is to be fed into after the recording by the line head 10 from among the first downstream side transport path 13, the second downstream side transport path 30, and the duplex recording switchback path 15, it is possible to suppress wasteful power consumption and to suppress the running cost in the recording unit 2 (the recording apparatus).

Hereinafter, further explanation will be given with a specific example.

As described earlier, the recording system 1 includes the first downstream side transport path 13 and the second downstream side transport path 30 which has a longer path length than the first downstream side transport path 13 as the plurality of downstream side transport paths.

In a case in which the paper after the recording is fed to the first downstream side transport path 13, in a case in which the control unit 27 sets the heat roller pair 11 to the third state and the paper after the recording is fed to the second downstream side transport path 30, the control unit 27 sets the heat roller pair 11 to the fourth state in which more heating is performed than the third state.

The third state and the fourth state of the heat roller pair 11 referred to here mean that the heating state of the heat roller pair 11 is a relatively more heated state in the fourth state than the third state and the third state and the fourth state have the same relationship as the relationship between the first state and the second state of the heat roller pair 11 described earlier.

The heating of the heat roller pair 11 may satisfy the expression third state <fourth state, and in a case in which only the third control is performed without performing the first or the second control, for example, the third state may be the same as the first state and the fourth state may be the same as the second state.

In a case in which the first control or the second control is performed and it is determined that predetermined subdivision regions (for example the subdivision regions M1 and M3) are to be dried in the second state of the heat roller pair 11, it is possible to further change the second state according to the transport destination of the paper after the recording. The same applies to a case in which the first control or the second control is performed and it is determined that the predetermined subdivision regions are to be dried in the first state.

In this case, the heating of the heat roller pair 11 sets the third state (low temperature) and the fourth state (high temperature) within a range that satisfies the expression first state <second state.

Figure 15:
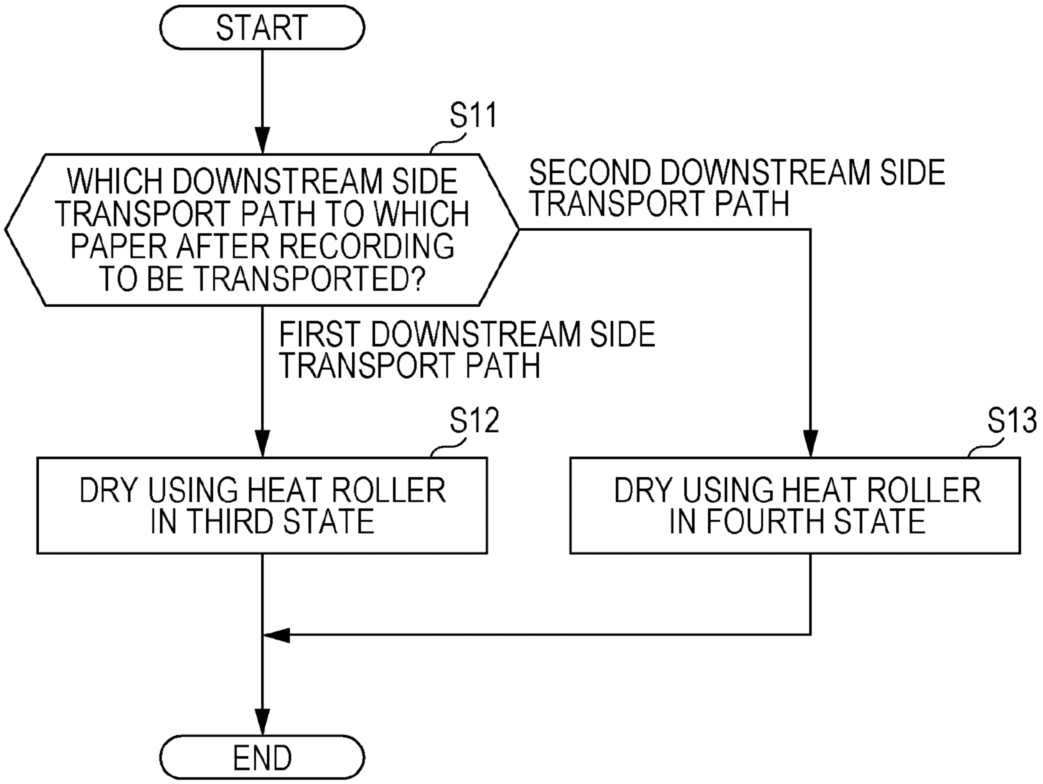
FIG. 15 is a flowchart illustrating the flow of a case in which the control unit controls the operation of the heat roller pair according to a transport destination of the paper after the recording.

Explaining with reference to the flowchart illustrated in FIG. 15, the control unit 27 determines which of the downstream side transport paths to transport the paper after the recording to (step S11).

In step S11, in a case in which it is determined that the paper after the recording is to be transported to the first downstream side transport path 13 which is the medium transport path having a comparatively simple shape, the heating of the heat roller pair 11 is set to the third state which is more suppressed than the fourth state and the paper is dried (step S12). In step S11, in a case in which it is determined that the paper after the recording is to be transported to the second downstream side transport path 30 which is more complex and has a longer path length than the first downstream side transport path 13, the heat roller pair 11 is set to the fourth state in which more heating is performed than the third state and the paper is dried (step S13).

In a case in which the heating of the heat roller pair 11 is suppressed in the third state, the heating may be turned off, that is, the heat roller pair 11 may be set to a non-heated state.

Due to the control unit 27 executing such control, in a case in which the paper after the recording is fed to the second downstream side transport path 30 which has a long path length in which problems such as paper jams occur easily inside the path when the drying of the paper is insufficient, it is possible to reliably perform the drying of the paper and to reduce a concern of problems occurring.

Meanwhile, in a case in which the paper after the recording is fed to the first downstream side transport path 13 in which problems do not occur easily relative to the second downstream side transport path 30, it is possible to suppress the heating of the heat roller pair 11, and it is possible to suppress the running cost of the apparatus.

In addition to controlling the degree of heating of the heat roller pair 11, the control unit 27 is capable of executing control which sets the heating state of the heat roller pair 11 to the same state (for example, the fourth state) and changes the heating time according to which of the downstream side transport paths to which the paper after the recording is transported.

Specifically, in a case in which the paper after the recording is transported to the first downstream side transport path 13, the heating time of the heat roller pair 11 is set to a first heating time, and in a case in which the paper after the recording is transported to the second downstream side transport path 30, the heating time of the heat roller pair 11 is set to a second heating time which is relatively longer than the first heating time. Accordingly, the reliability of the drying of the paper which is transported to the second downstream side transport path 30 is increased, and even in a case in which the paper after the recording is fed to the first downstream side transport path 13 in which problems do not occur easily relative to the second downstream side transport path 30, it is possible to shorten the heating time of the heat roller pair 11, and it is possible to suppress the running cost of the apparatus.

Even in a case in which the paper after the recording is transported to the duplex recording switchback path 15 which serves as "the third downstream side transport path", the operation of the heat roller pair 11 is controlled by the control unit 27. Since the paper which is transported in the duplex recording switchback path 15 is transported to the inverting path 16, as a result, the path length is longer than the first downstream side transport path 13 and the paper is transported in a medium transport path which has greater path curvature and which is more complex. Accordingly, for example, it is possible to perform the drying of the paper under similar conditions to those of the second downstream side transport path 30.

Since the duplex recording switchback path 15 and the inverting path 16 have a shorter path length than the second downstream side transport path 30 and the shape of the path is simpler, it is possible to heat the heat roller pair 11 more than a case in which the paper is fed to the first downstream side transport path 13 and to suppress the heating of the heat roller pair 11 as compared to a case in which the paper is fed to the second downstream side transport path 30.

Since the heat roller pair 11 is provided in the medium transport path which is closer to the upstream side than the branching portions G1 and G2 which branch into the plurality of downstream side transport paths, even in a case in which the paper after the recording by the line head 10 is fed to one of the plurality of downstream side transport paths, it is possible to dry the paper using one heat roller pair 11, and it is possible to obtain a suppression of an increase in the size of the apparatus and a suppression of an increase in the cost of the apparatus.

Fourth Control

As described earlier, in addition to the third control in which the control unit 27 controls the operation of the heat roller pair 11 according to which of the downstream side transport paths to which the paper after the recording is to be transported, it is possible for the control unit 27 to further control the heat roller pair 11 according to the conditions when performing the drying of the paper using the heat roller pair 11.

In addition to being capable of performing only the fourth control without performing the first control to the third control, for example, in a case in which the first control or the second control is performed and it is determined that the predetermined subdivision regions (for example, the subdivision regions M1 and M3) are to be heated in the second state of the heat roller pair 11, it is possible to further change the second state according to the conditions when performing the drying of the paper using the heat roller pair 11. The same applies to a case in which the first control or the second control is performed and it is determined that the predetermined subdivision regions are to be dried in the first state.

In a case in which the third control is performed and it is determined that the paper after the recording is to be transported to the second downstream side transport path 30 which is more complex and has a longer path length than the first downstream side transport path 13, it is possible to change the fourth state of the heat roller pair 11 according to the conditions when performing the drying of the paper using the heat roller pair 11.

Similarly, in a case in which the third control is performed and it is determined that the paper after the recording is to be transported to the first downstream side transport path 13, it is possible to change the third state of the heat roller pair 11 according to the conditions when performing the drying of the paper using the heat roller pair 11.

Examples of the conditions when performing the drying of the paper P here include the type of the paper, the paper size, the ink discharge amount, the margin size, the transport speed of the paper, whether or not the most recent recording surface of the paper is the reverse surface of the surface on which the recording is already performed, and the recording environment (temperature, humidity). The type of the paper includes not only the material, but also the type according to differences in the thickness, the basis weight (the weight per unit area), and the like.

The control unit 27 is capable of suppressing wasteful power consumption by controlling the heat roller pair 11 according to the conditions when performing the drying of the paper using the heat roller pair 11.

For example, if the conditions when performing the drying of the power consumption are favorable conditions for the drying of the paper, it is possible to suppress the power consumption in the heat roller pair 11 by shortening the heating time of the heat roller pair 11, by lowering the heating temperature for the drying, by not performing the heating for the drying, or the like.

A description will be given of the operation of the heat roller pair 11 giving specific examples of the conditions when performing the drying of the paper using the heat roller pair 11.

Control According to Conditions During Drying of Paper by Heat Roller Pair

Control According to Paper Type

Examples of the paper which is used in the recording unit 2 of the recording system 1 include, in addition to so-called normal paper, coated paper in which a coating agent is applied to the surface of the paper, a postcard, and an envelope.

The control unit 27 is capable of controlling the operation of the heat roller pair 11 according to the paper type.

Table 3 illustrates an example of operational control of the heat roller pair 11 according to the paper type.

TABLE 3

| PAPER TYPE | OPERATION OF HEAT ROLLER PAIR |
|---|---|
| NORMAL PAPER | SIXTH STATE |
| COATED PAPER | FIFTH STATE |
| POSTCARD | FIFTH STATE |
| ENVELOPE | FIFTH STATE |

In a case in which the paper type is coated paper, a postcard, or an envelope, the control unit 27 sets the heat roller pair 11 to a fifth state, and in a case in which the paper type is normal paper, the control unit 27 sets the heat roller pair 11 to a sixth state in which more heating is performed than the fifth state.

The fifth state and the sixth state of the heat roller pair 11 referred to here mean that the heating state of the heat roller pair 11 is a relatively more heated state in the sixth state than the fifth state and the fifth state and the sixth state have the same relationship as the relationship between the first state (high temperature) and the second state (low temperature) or as the relationship between the third state (high temperature) and the fourth state (low temperature) of the heat roller pair 11 described earlier.

In a case in which the paper which is subjected to recording is normal paper, the drying is performed by the heat roller pair 11 in the sixth state in which more heating is performed. Meanwhile, since the coating agent is applied to the surface for the coated paper, there is a concern that heating the coated paper will damage the coating agent. Therefore, the drying is performed using the heat roller pair 11 in the fifth state in which the heating is more suppressed than in the sixth state.

In a postcard which is thicker than normal paper or an envelope in which there are two layers of paper, since there is little concern of the paper curling and the rigidity being reduced by the ink which is discharged, the drying is performed using the heat roller pair 11 in the fifth state.

In a case in which the heating of the heat roller pair 11 is suppressed in the fifth state, the heating may be turned off, that is, the heat roller pair 11 may be set to a non-heated state.

As described above, since the switching between the fifth state (including a case in which the heating is off) and the sixth state of the heat roller pair 11 is performed according to the paper type, it is possible to suppress the power consumption in the heat roller pair 11.

In the above description, although the control of switching the heating state of the heat roller pair 11 is exemplified, it is also possible to perform control of shortening the heating time of the heat roller pair 11. Hereinafter, when explaining the other conditions when performing the drying of the paper by the heat roller pair 11, although generally a case in which the switching between the fifth state and the sixth state is performed as the operational control of the heat roller pair 11, it is also possible to perform control of changing the heating time.

A detailed description will be given later of the configuration in which the switching is performed between the fifth state and the sixth state of the heat roller pair 11.

Control According to Paper Basis Weight

For example, even if the paper type (paper quality) is the same, there is a case in which the paper basis weight (g/m$^2$) is different.

The control unit 27 is capable of controlling the operation of the heat roller pair 11 according to the paper basis weight.

Table 4 illustrates an example of operational control of the heat roller pair 11 according to the paper basis weight.

TABLE 4

| PAPER BASIS WEIGHT (g/m$^2$) | OPERATION OF HEAT ROLLER PAIR |
|---|---|
| LESS THAN 100 | SIXTH STATE |
| GREATER THAN OR EQUAL TO 100 | FIFTH STATE |

The paper which has a great basis weight and is thick does not curl due to ink absorption as easily as paper which has a small basis weight and is thin. Therefore, in a case in which the paper basis weight is less than 100 g/m$^2$, for example, the drying is performed using the heat roller pair 11 in the sixth state in which more heating is performed than the fifth state. In a case in which the paper basis weight is greater than or equal to 100 g/m$^2$, the drying is performed using the heat roller pair 11 in the fifth state in which the heating is suppressed.

As described above, since the switching between the fifth state and the sixth state of the heat roller pair 11 is performed according to the paper basis weight, it is possible to suppress the power consumption in the heat roller pair 11.

It is also possible to further finely divide the condition of being less than the paper basis weight 100 g/m$^2$ (for example, less than 60 g/m$^2$, greater than or equal to 60 g/m$^2$, less than 80 g/m$^2$, greater than or equal to 80 g/m$^2$, less than 100 g/m$^2$, and the like), reducing the heating temperature stepwise, shortening the heating time stepwise, and the like as the basis weight decreases.

Control According to Paper Size

The control unit 27 is capable of controlling the operation of the heat roller pair 11 according to the paper size.

Table 5 illustrates an example of operational control of the heat roller pair 11 according to the paper size.

TABLE 5

| PAPER SIZE | OPERATION OF HEAT ROLLER PAIR |
|---|---|
| A4 | SIXTH STATE |
| B5 | SIXTH STATE |
| LETTER (LTR) | SIXTH STATE |
| A3 | SIXTH STATE |
| B4 | SIXTH STATE |
| LEGAL (LGL) | SIXTH STATE |
| LEDGER (LDR) | SIXTH STATE |
| OTHER (BUSINESS CARD, POSTCARD, USER-DEFINED SIZE, AND THE LIKE) | FIFTH STATE |

Since the paper is generally thick in a case in which the paper size is small such as postcard size, since there is little concern of the paper curling or the rigidity decreasing due to the ink which is discharged, the drying is performed using the heat roller pair 11 in the fifth state.

As described above, since the switching between the fifth state and the sixth state of the heat roller pair 11 is performed according to the paper size, it is possible to suppress the power consumption in the heat roller pair 11.

Control According to Discharge Amount of Ink

The control unit 27 is capable of controlling the operation of the heat roller pair 11 according to a discharge amount W (ml/m$^2$) of the ink onto the paper.

Table 6 illustrates an example of operational control of the heat roller pair 11 according to the discharge amount W of the ink onto the paper.

TABLE 6

| INK DISCHARGE AMOUNT W (ml/m$^2$) | OPERATION OF HEAT ROLLER PAIR |
|---|---|
| LESS THAN OR EQUAL TO W1 | FIFTH STATE |
| EXCEEDS W1 | SIXTH STATE |

When the discharge amount W of the ink onto the paper is great, since the paper curls easily and the rigidity of the paper is also reduced, the paper catches more easily in the medium transport path. The ink of the recording surface also adheres easily to the various rollers and the like.

Therefore, in order to reliably dry the paper in which the discharge amount W of the ink is great, for example, in a case in which the discharge amount W (ml/m$^2$) onto the paper of the ink per unit area exceeds a predetermined threshold value W1, the drying is performed using the heat roller pair 11 in the sixth state in which more heating is performed than the fifth state. In a case in which the discharge amount W of the ink is not notably great and is less than or equal to the threshold value W1, the drying is performed using the heat roller pair 11 in the fifth state (in which the heating is more suppressed than in the sixth state).

As described above, since the switching between the fifth state and the sixth state of the heat roller pair 11 is performed according to the discharge amount W of the ink onto the paper, it is possible to suppress the power consumption in the heat roller pair 11.

It is also possible to further finely divide the condition of the discharge amount W of the ink, for example, reducing the heating temperature stepwise, shortening the heating time stepwise, and the like as the discharge amount W of the ink decreases.

Control According to Margin Size

The control unit 27 is capable of controlling the operation of the heat roller pair 11 according to a margin size N (mm) of the leading end region of the paper.

Table 7 illustrates an example of operational control of the heat roller pair 11 according to the margin size N of the leading end region of the paper.

TABLE 7

| MARGIN SIZE N (mm) | OPERATION OF HEAT ROLLER PAIR |
|---|---|
| LESS THAN OR EQUAL TO N1 | SIXTH STATE |
| EXCEEDS N1 | FIFTH STATE |

In a case in which the margin size N of the leading end region of the paper is small, there is a tendency for the paper leading end to curl easily. Therefore, the paper catches more easily in the medium transport path. Conversely, in a case in which the margin size N of the leading end region of the paper is large, there is a tendency for the paper leading end to not curl easily.

Therefore, for example, in a case in which the margin size N of the leading end region of the paper is less than or equal to a predetermined threshold N1, the drying is performed using the heat roller pair 11 in the sixth state in which more heating is performed than the fifth state. In a case in which the margin size N of the leading end region of the paper exceeds the predetermined threshold N1, the drying is performed using the heat roller pair 11 in the fifth state in which the heating is suppressed.

It is also possible to further finely divide the condition of the margin size N of the paper leading end, for example, reducing the heating temperature stepwise, shortening the heating time stepwise, and the like as the margin size N increases.

As described above, since the switching between the fifth state and the sixth state of the heat roller pair 11 is performed according to the margin size N of the paper, it is possible to suppress the power consumption in the heat roller pair 11.

Control According to Transport Speed of Paper

The control unit 27 is capable of controlling the operation of the heat roller pair 11 according to the transport speed of the paper when performing the drying using the heat roller pair 11.

In the present embodiment, it is possible to modify the transport speed of the paper which is transported by the belt transporting unit 20 which is positioned on the upstream side of the heat roller pair 11 between a predetermined transport speed V, a speed which is ¾ of the transport speed V (hereinafter ¾ V), a speed which is ½ of the transport speed V (hereinafter ½ V), and a speed which is ¼ of the transport speed V (hereinafter, ¼ V).

Table 8 illustrates an example of operational control of the heat roller pair 11 according to the transport speed of the paper.

TABLE 8

| TRANSPORT SPEED OF PAPER | OPERATION OF HEAT ROLLER PAIR |
|---|---|
| V | SIXTH STATE |
| ¾ V | SIXTH STATE |
| ½ V | FIFTH STATE |
| ¼ V | FIFTH STATE |
| Other | FIFTH STATE |

In a case in which the transport speed of the paper is fast (for example, the transport speeds V or ¾ V), since the contact time between the paper and the heat roller pair 11 is short, the drying is performed using the heat roller pair 11 in the sixth state in which more heating is performed. In a case in which the transport speed of the paper is slow (for example, the transport speeds ½ V or ¼ V), and other cases, such as a case in which the paper stops in the pinching state of the heat roller pair 11, for example, the drying is performed using the heat roller pair 11 in the fifth state in which the heating is suppressed.

As described above, since the switching between the fifth state and the sixth state of the heat roller pair 11 is performed according to the transport speed of the paper, it is possible to suppress the power consumption in the heat roller pair 11.

Control According to Whether Most Recent Recording Surface of Paper is Reverse Surface of Surface on which Recording Already Performed The control unit 27 is capable of controlling the operation of the heat roller pair 11 according to whether or not the most recent recording surface of the paper which is dried is the reverse surface of the surface on which recording is already performed. The expression "the most recent recording surface of the paper is the reverse surface of the surface on which recording is already performed" indicates, in other words, the second surface of the paper in which the recording is performed on the second surface after the recording onto the first surface during the duplex recording. The expression "the most recent recording surface of the paper is not the reverse surface of the surface on which recording is already performed" indicates, in addition to one surface of the paper in a case in which simplex recording is simply performed, the first surface of the paper after the recording onto the first surface in a case in which the duplex recording is performed.

Table 9 illustrates an example of operational control of the heat roller pair 11 according to the transport speed of the paper.

TABLE 9

| MOST RECENT RECORDING SURFACE OF PAPER | OPERATION OF HEAT ROLLER PAIR |
|---|---|
| FIRST SURFACE | FIFTH STATE |
| SECOND SURFACE | SIXTH STATE |

For the paper in which the most recent recording surface of the paper is the first surface, that is, in which the recording is performed only on the first surface, the drying is performed using the heat roller pair 11 in the fifth state in which the heating is suppressed. Meanwhile, since the paper in which the most recent recording surface of the paper is the second surface, that is, the paper after the duplex recording is performed has a more easily reduced rigidity than the paper after the simplex recording, the drying is performed using the heat roller pair 11 in the sixth state in which more heating is performed than the fifth state.

As described above, since the switching between the fifth state and the sixth state of the heat roller pair 11 is performed according to whether or not the most recent recording surface of the paper is the reverse surface of the surface on which the recording is already performed, it is possible to suppress the power consumption in the heat roller pair 11.

Control According to Environment During Drying

The control unit 27 is capable of controlling the operation of the heat roller pair 11 according to the environment when performing the drying. For example, it is possible to use one or both of temperature and humidity for the environment when performing the drying. It is possible to use the temperature and the humidity inside the room in which the recording system 1 is installed for the temperature and the humidity of the environment. A hygrometer unit and a thermometer unit which are not illustrated may be provided inside the recording unit 2 and the measurement results of the hygrometer unit and the thermometer unit may be used.

Figure 16:
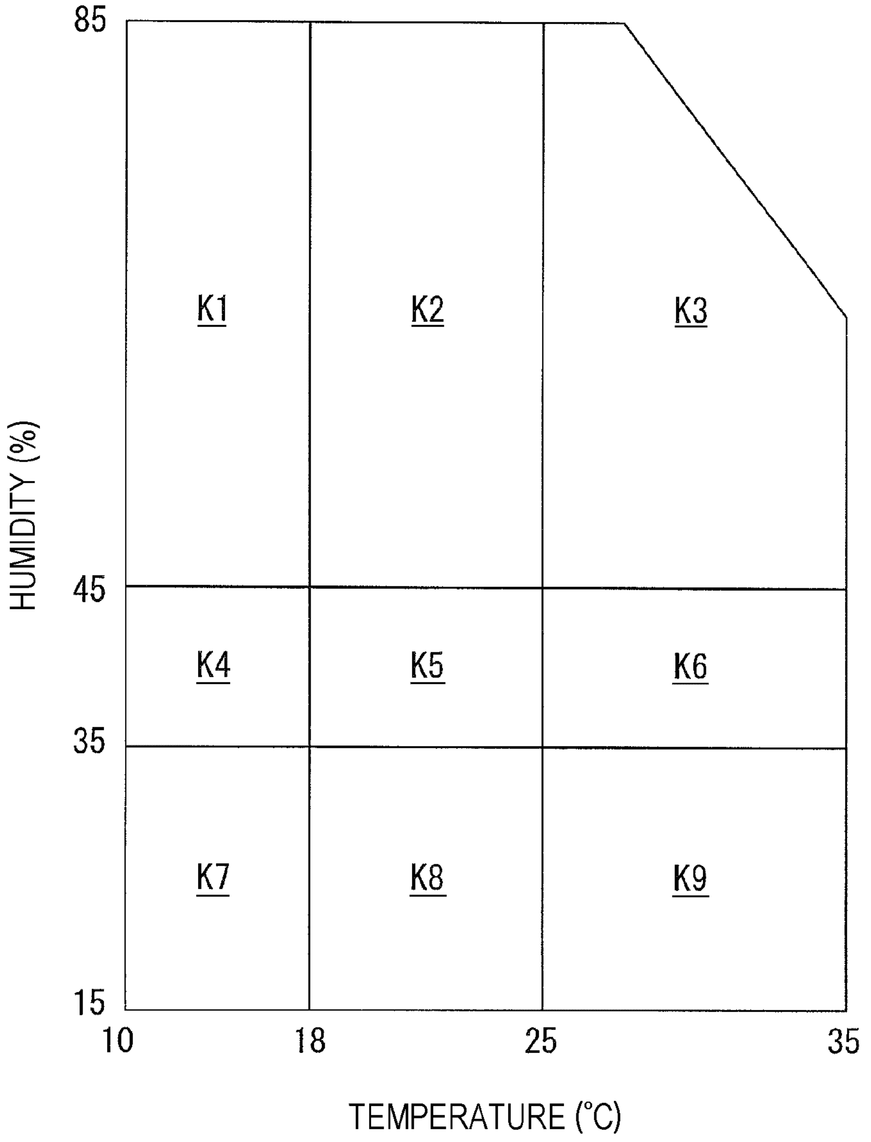
FIG. 16 illustrates segments corresponding to a relationship between temperature and humidity in a drying environment.

In the present embodiment, the recording environment is divided into nine segments K1 to K9 as illustrated in FIG. 16 according to the relationship between the temperature and the humidity in the hydrothermal environment and the operation of the heat roller pair 11 is controlled according to the segments K1 to K9.

Table 10 illustrates an example of operational control of the heat roller pair 11 according to the hydrothermal environment.

TABLE 10

| HYDROTHERMAL ENVIRONMENT (SEGMENTS) | OPERATION OF HEAT ROLLER PAIR |
|---|---|
| K1 | SIXTH STATE |
| K2 | FIFTH STATE |
| K3 | FIFTH STATE |
| K4 | SIXTH STATE |
| K5 | SIXTH STATE |
| K6 | FIFTH STATE |
| K7 | SIXTH STATE |
| K8 | SIXTH STATE |
| K9 | FIFTH STATE |
| Other | FIFTH STATE |

From the perspective of only the temperature in the hydrothermal environment, it is harder to perform the drying the lower the temperature and it is easier to perform the drying the higher the temperature. Accordingly, in a case in which the operation of the heat roller pair 11 is controlled according to the temperature of the hydrothermal environment, it is possible to reduce the heating temperature of the heat roller pair 11 stepwise, shorten the heating time of the heat roller pair 11 stepwise, and the like as the temperature increases.

From the perspective of only the humidity in the hydrothermal environment, it is harder to perform the drying the higher the humidity and it is easier to perform the drying the lower the humidity. Accordingly, in a case in which the operation of the heat roller pair 11 is controlled according to the humidity of the hydrothermal environment, it is possible to reduce the heating temperature of the heat roller pair 11 stepwise, shorten the heating time of the heat roller pair 11 stepwise, and the like as the humidity decreases.

As described above, since the switching between the fifth state and the sixth state of the heat roller pair 11 is performed according to the environment when performing the drying, it is possible to suppress the power consumption in the heat roller pair 11.

Of the conditions when performing the drying of the paper which is described above, in particular, the operation of the heat roller pair 11 may be controlled according to the conditions which have a great influence on the ease of drying the paper.

For example, the discharge amount of the ink, the type of the paper, whether duplex recording or simplex recording is to be performed, and the like particularly easily influence the ease of drying the paper. The influence of the drying environment (the temperature and the humidity) also increases depending on the season. By using these conditions preferentially, it is possible to effectively control the operation (for example, the switching of the temperature) of the heat roller pair 11 and to efficiently suppress the power consumption.

Each of the conditions such as the type of the paper, the paper size, the discharge amount of the ink, and the margin size, has a characteristic coefficient which changes according to differences in the conditions, and it is possible to determine the operation of the heat roller pair 11 by multiplying the coefficients.

For example, a reference temperature of a case in which the paper after the recording is transported to the second downstream side transport path 30 and the paper is dried by the heat roller pair 11 in the sixth state is set to T1. The reference temperature T1 is a fixed temperature which is defined regardless of the drying environment.

Using the reference temperature T1 as a reference, T1 is caused to fluctuate according to the drying environment. For example, in a case in which a high-temperature segment of Table 10 is assumed, the reference temperature T1 is multiplied by a coefficient greater than 1 (for example, "1.2" or the like). Conversely, in a case in which a low-temperature segment is assumed, the reference temperature T1 is multiplied by a coefficient smaller than 1 (for example, "0.8" or the like). Accordingly, it is possible to perform more suitable drying.

In this case, the coefficients are further multiplied sequentially according to the other conditions and the final temperature of the heat roller pair 11 may be determined.

Furthermore, in this case, the coefficients may be changed in light of the magnitude of the influence of the coefficients on the ease of drying the paper. For example, the influence of the paper size on the ease of drying the paper is considered to be smaller than from the perspective of conditions such as the discharge amount of the ink and the paper type.

Accordingly, the coefficient of a case in which a high-temperature segment is assumed from the perspective of the paper size may be set to "1.1", for example, the coefficient of a case in which a high-temperature segment is assumed from the perspective of the discharge amount of the ink may be set to "1.2", for example, to perform weighting according to the conditions. In this case, for example, it can be said that the perspectives of the paper type, the ink discharge amount, the margin size, and whether or not the most recent recording surface is the reverse surface of the surface on which recording is already performed have heavier weights than those of the perspectives of the paper size and the transport speed of the paper.

Regarding Control Using Plurality of Conditions

The control unit 27 is capable of controlling the heat roller pair 11 based on a plurality of conditions, using a plurality of conditions as the conditions when performing the drying of paper using the heat roller pair 11.

The plurality of conditions includes at least two of the ink discharge amount, the type of the paper (the paper type, the basis weight, the thickness, the rigidity, and the like), the paper size, the temperature in the drying environment, the humidity in the drying environment, the margin size of the leading end region of the paper, whether or not the most recent recording surface of the paper is the reverse surface of the surface on which recording is already performed, and the transport speed of the paper which are described earlier.

Figure 17:
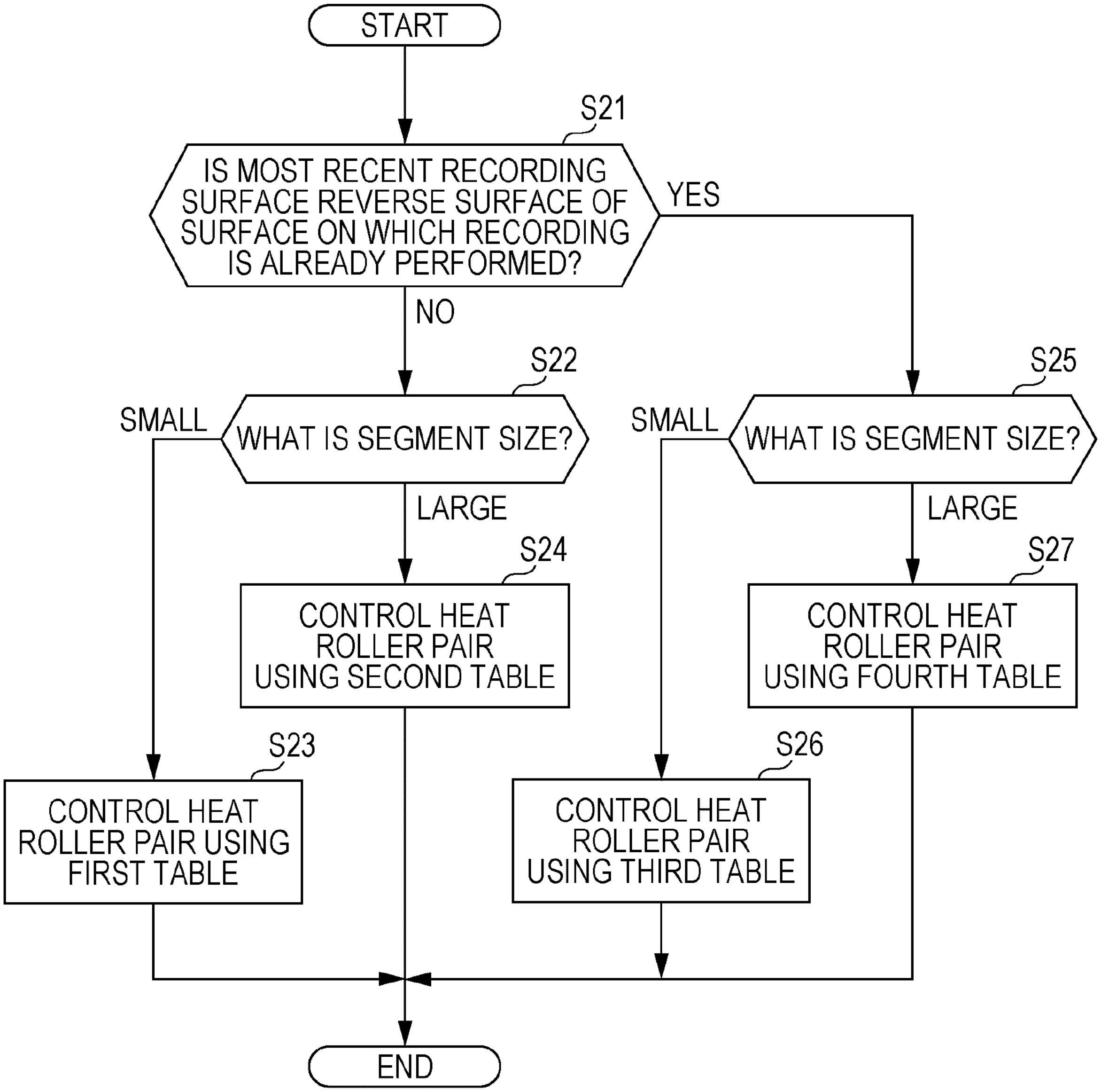
FIG. 17 is a flowchart illustrating the flow of a case in which the control unit controls the operation of the heat roller pair using a plurality of conditions as the conditions when performing the drying of paper using the heat roller pair.

Hereinafter, a description will be given of an example of control which uses a plurality of conditions with reference to the flowchart illustrated in FIG. 17.

First, the control unit 27 determines whether or not the most recent recording surface of the paper is the reverse surface of the surface on which the recording is already performed (step S11). In a case in which the most recent recording surface of the paper is not the reverse surface of the surface on which the recording is already performed (NO in step S11), the process proceeds to step S12, and in a case in which the most recent recording surface of the paper is the reverse surface of the surface on which the recording is already performed (YES in step S11), the process proceeds to step S15.

Hereinafter, "a case in which the most recent recording surface is not the reverse surface of the surface on which the recording is already performed" will be referred to as after the simplex recording and "a case in which the most recent recording surface is the reverse surface of the surface on which the recording is already performed" will be referred to as after the duplex recording.

Next, the control unit 27 determines the segment size of the paper in step S12 or step S15.

In the present embodiment, A4, A5, A6, B5, B6, and letter (LTR) are set as small sizes, and larger sizes than the small sizes (for example, A3, B4, legal (LGL) size, and the like) are set as large sizes.

Here, the control unit 27 is provided with four control tables (a first table to a fourth table) corresponding to the discharge amount of the ink, the temperature in the drying environment, the humidity in the drying environment, and the transport speed of the paper with respect to "the small size paper after the simplex recording", "the large size paper after the duplex recording", "the small size paper after the duplex recording", and "the large size paper after the duplex recording", respectively. Table 11 illustrates an example of the first table which is the control table for the small size paper after the simplex recording. Table 12 illustrates an example of the second table which is the control table for the large size paper after the simplex recording. Table 13 illustrates an example of the third table which is the control table for the small size paper after the duplex recording. Table 14 illustrates an example of the fourth table which is the control table for the large size paper after the duplex recording.

In each table, the recording density (%) is a value which increases and decreases corresponding to the ink discharge amount and is the proportion of the total ink discharge amount (g) with respect to the maximum dischargeable ink amount (g) onto the recordable region of one sheet of paper. In other words, the recording density (%) is the total ink discharge amount (g)/the maximum dischargeable ink amount (g) onto one sheet of paper×100. It is possible to obtain the maximum dischargeable ink amount (g) onto the recordable region of one sheet of paper from the maximum dischargeable ink amount (g) per unit area of the line head 10 which is provided in the recording unit 2.

The recording density (%) is not limited thereto and may be a proportion of the area of a region onto which the ink is discharged to an area of a sheet of paper.

TABLE 11

First Table

| | ENVIRONMENT | | | | | |
|---|---|---|---|---|---|---|
| | SEGMENT K1 | | SEGMENT K2 | | SEGMENT K3 | |
| RECORDING DENSITY (%) | TRANSPORT SPEED | HEATER OPERATION | TRANSPORT SPEED | HEATER OPERATION | TRANSPORT SPEED | HEATER OPERATION |
| GREATER THAN OR EQUAL TO 0 AND LESS THAN 10 | V | FIFTH STATE | V | FIFTH STATE | V | FIFTH STATE |
| GREATER THAN OR EQUAL TO 10 AND LESS THAN 20 | V | FIFTH STATE | V | FIFTH STATE | V | FIFTH STATE |
| GREATER THAN OR EQUAL TO 20 AND LESS THAN 30 | V | SIXTH STATE | V | FIFTH STATE | V | FIFTH STATE |
| GREATER THAN OR EQUAL TO 30 AND LESS THAN 40 | ½ V | SIXTH STATE | V | SIXTH STATE | V | FIFTH STATE |
| GREATER THAN OR EQUAL TO 40 AND LESS THAN 50 | ½ V | SIXTH STATE | ½ V | SIXTH STATE | V | SIXTH STATE |
| GREATER THAN OR EQUAL TO 50 AND LESS THAN 60 | ¼ V | SIXTH STATE | ½ V | SIXTH STATE | ½ V | SIXTH STATE |
| GREATER THAN OR EQUAL TO 60 AND LESS THAN 70 | ¼ V | SIXTH STATE | ¼ V | SIXTH STATE | ½ V | SIXTH STATE |
| GREATER THAN OR EQUAL TO 70 AND LESS THAN 80 | ¼ V | SIXTH STATE | ¼ V | SIXTH STATE | ¼ V | SIXTH STATE |
| GREATER THAN OR EQUAL TO 80 AND LESS THAN 90 | ¼ V | SIXTH STATE | ¼ V | SIXTH STATE | ¼ V | SIXTH STATE |
| GREATER THAN OR EQUAL TO 90 AND LESS THAN 100 | ¼ V | SIXTH STATE | ¼ V | SIXTH STATE | ¼ V | SIXTH STATE |
| GREATER THAN OR EQUAL TO 100 | ¼ V | SIXTH STATE | ¼ V | SIXTH STATE | ¼ V | SIXTH STATE |

TABLE 11-continued

First Table

| RECORDING DENSITY (%) | ENVIRONMENT | | | | | |
|---|---|---|---|---|---|---|
| | SEGMENT K4 | | SEGMENT K5 | | SEGMENT K6 | |
| | TRANSPORT SPEED | HEATER OPERATION | TRANSPORT SPEED | HEATER OPERATION | TRANSPORT SPEED | HEATER OPERATION |
| GREATER THAN OR EQUAL TO 0 AND LESS THAN 10 | V | FIFTH STATE | V | FIFTH STATE | V | FIFTH STATE |
| GREATER THAN OR EQUAL TO 10 AND LESS THAN 20 | V | FIFTH STATE | V | FIFTH STATE | V | FIFTH STATE |
| GREATER THAN OR EQUAL TO 20 AND LESS THAN 30 | V | FIFTH STATE | V | FIFTH STATE | V | FIFTH STATE |
| GREATER THAN OR EQUAL TO 30 AND LESS THAN 40 | V | SIXTH STATE | V | FIFTH STATE | V | FIFTH STATE |
| GREATER THAN OR EQUAL TO 40 AND LESS THAN 50 | ½ V | SIXTH STATE | V | SIXTH STATE | V | FIFTH STATE |
| GREATER THAN OR EQUAL TO 50 AND LESS THAN 60 | ½ V | SIXTH STATE | ½ V | SIXTH STATE | V | SIXTH STATE |
| GREATER THAN OR EQUAL TO 60 AND LESS THAN 70 | ¼ V | SIXTH STATE | ½ V | SIXTH STATE | ½ V | SIXTH STATE |
| GREATER THAN OR EQUAL TO 70 AND LESS THAN 80 | ¼ V | SIXTH STATE | ¼ V | SIXTH STATE | ½ V | SIXTH STATE |
| GREATER THAN OR EQUAL TO 80 AND LESS THAN 90 | ¼ V | SIXTH STATE | ¼ V | SIXTH STATE | ¼ V | SIXTH STATE |
| GREATER THAN OR EQUAL TO 90 AND LESS THAN 100 | ¼ V | SIXTH STATE | ¼ V | SIXTH STATE | ¼ V | SIXTH STATE |
| GREATER THAN OR EQUAL TO 100 | ¼ V | SIXTH STATE | ¼ V | SIXTH STATE | ¼ V | SIXTH STATE |

| RECORDING DENSITY (%) | ENVIRONMENT | | | | | |
|---|---|---|---|---|---|---|
| | SEGMENT K7 | | SEGMENT K8 | | SEGMENT K8 | |
| | TRANSPORT SPEED | HEATER OPERATION | TRANSPORT SPEED | HEATER OPERATION | TRANSPORT SPEED | HEATER OPERATION |
| GREATER THAN OR EQUAL TO 0 AND LESS THAN 10 | V | FIFTH STATE | V | FIFTH STATE | V | FIFTH STATE |
| GREATER THAN OR EQUAL TO 10 AND LESS THAN 20 | V | FIFTH STATE | V | FIFTH STATE | V | FIFTH STATE |
| GREATER THAN OR EQUAL TO 20 AND LESS THAN 30 | V | SIXTH STATE | V | FIFTH STATE | V | FIFTH STATE |
| GREATER THAN OR EQUAL TO 30 AND LESS THAN 40 | ½ V | SIXTH STATE | V | FIFTH STATE | V | FIFTH STATE |
| GREATER THAN OR EQUAL TO 40 AND LESS THAN 50 | ½ V | SIXTH STATE | V | FIFTH STATE | V | FIFTH STATE |
| GREATER THAN OR EQUAL TO 50 AND LESS THAN 60 | ¼ V | SIXTH STATE | V | SIXTH STATE | V | FIFTH STATE |
| GREATER THAN OR EQUAL TO 60 AND LESS THAN 70 | ¼ V | SIXTH STATE | ½ V | SIXTH STATE | V | FIFTH STATE |
| GREATER THAN OR EQUAL TO 70 AND LESS THAN 80 | ¼ V | SIXTH STATE | ½ V | SIXTH STATE | ½ V | FIFTH STATE |
| GREATER THAN OR EQUAL TO 80 AND LESS THAN 90 | ¼ V | SIXTH STATE | ¼ V | SIXTH STATE | ½ V | FIFTH STATE |
| GREATER THAN OR EQUAL TO 90 AND LESS THAN 100 | ¼ V | SIXTH STATE | ¼ V | SIXTH STATE | ½ V | FIFTH STATE |
| GREATER THAN OR EQUAL TO 100 | ¼ V | SIXTH STATE | ¼ V | SIXTH STATE | ¼ V | SIXTH STATE |

TABLE 12

Second Table

| RECORDING DENSITY (%) | ENVIRONMENT | | | | | |
|---|---|---|---|---|---|---|
| | SEGMENT K1 | | SEGMENT K2 | | SEGMENT K3 | |
| | TRANSPORT SPEED | HEATER OPERATION | TRANSPORT SPEED | HEATER OPERATION | TRANSPORT SPEED | HEATER OPERATION |
| GREATER THAN OR EQUAL TO 0 AND LESS THAN 10 | V | FIFTH STATE | V | FIFTH STATE | V | FIFTH STATE |
| GREATER THAN OR EQUAL TO 10 AND LESS THAN 20 | V | FIFTH STATE | V | FIFTH STATE | V | FIFTH STATE |
| GREATER THAN OR EQUAL TO 20 AND LESS THAN 30 | ½ V | SIXTH STATE | V | FIFTH STATE | V | FIFTH STATE |
| GREATER THAN OR EQUAL TO 30 AND LESS THAN 40 | ½ V | SIXTH STATE | ½ V | SIXTH STATE | V | FIFTH STATE |
| GREATER THAN OR EQUAL TO 40 AND LESS THAN 50 | ¼ V | SIXTH STATE | ½ V | SIXTH STATE | ½ V | SIXTH STATE |
| GREATER THAN OR EQUAL TO 50 AND LESS THAN 60 | ¼ V | SIXTH STATE | ¼ V | SIXTH STATE | ½ V | SIXTH STATE |
| GREATER THAN OR EQUAL TO 60 AND LESS THAN 70 | ¼ V | SIXTH STATE | ¼ V | SIXTH STATE | ¼ V | SIXTH STATE |
| GREATER THAN OR EQUAL TO 70 AND LESS THAN 80 | ¼ V | SIXTH STATE | ¼ V | SIXTH STATE | ¼ V | SIXTH STATE |
| GREATER THAN OR EQUAL TO 80 AND LESS THAN 90 | ¼ V | SIXTH STATE | ¼ V | SIXTH STATE | ¼ V | SIXTH STATE |
| GREATER THAN OR EQUAL TO 90 AND LESS THAN 100 | ¼ V | SIXTH STATE | ¼ V | SIXTH STATE | ¼ V | SIXTH STATE |
| GREATER THAN OR EQUAL TO 100 | ¼ V | SIXTH STATE | ¼ V | SIXTH STATE | ¼ V | SIXTH STATE |

| RECORDING DENSITY (%) | ENVIRONMENT | | | | | |
|---|---|---|---|---|---|---|
| | SEGMENT K4 | | SEGMENT K5 | | SEGMENT K6 | |
| | TRANSPORT SPEED | HEATER OPERATION | TRANSPORT SPEED | HEATER OPERATION | TRANSPORT SPEED | HEATER OPERATION |
| GREATER THAN OR EQUAL TO 0 AND LESS THAN 10 | V | FIFTH STATE | V | FIFTH STATE | V | FIFTH STATE |
| GREATER THAN OR EQUAL TO 10 AND LESS THAN 20 | V | FIFTH STATE | V | FIFTH STATE | V | FIFTH STATE |
| GREATER THAN OR EQUAL TO 20 AND LESS THAN 30 | V | FIFTH STATE | V | FIFTH STATE | V | FIFTH STATE |

TABLE 12-continued

Second Table

| | | | | | | |
|---|---|---|---|---|---|---|
| GREATER THAN OR EQUAL TO 30 AND LESS THAN 40 | ½ V | SIXTH STATE | V | FIFTH STATE | V | FIFTH STATE |
| GREATER THAN OR EQUAL TO 40 AND LESS THAN 50 | ½ V | SIXTH STATE | ½ V | SIXTH STATE | V | FIFTH STATE |
| GREATER THAN OR EQUAL TO 50 AND LESS THAN 60 | ¼ V | SIXTH STATE | ½ V | SIXTH STATE | ½ V | SIXTH STATE |
| GREATER THAN OR EQUAL TO 60 AND LESS THAN 70 | ¼ V | SIXTH STATE | ¼ V | SIXTH STATE | ½ V | SIXTH STATE |
| GREATER THAN OR EQUAL TO 70 AND LESS THAN 80 | ¼ V | SIXTH STATE | ¼ V | SIXTH STATE | ¼ V | SIXTH STATE |
| GREATER THAN OR EQUAL TO 80 AND LESS THAN 90 | ¼ V | SIXTH STATE | ¼ V | SIXTH STATE | ¼ V | SIXTH STATE |
| GREATER THAN OR EQUAL TO 90 AND LESS THAN 100 | ¼ V | SIXTH STATE | ¼ V | SIXTH STATE | ¼ V | SIXTH STATE |
| GREATER THAN OR EQUAL TO 100 | ¼ V | SIXTH STATE | ¼ V | SIXTH STATE | ¼ V | SIXTH STATE |

| | ENVIRONMENT | | | | | |
|---|---|---|---|---|---|---|
| | SEGMENT K7 | | SEGMENT K8 | | SEGMENT K8 | |
| RECORDING DENSITY (%) | TRANS-PORT SPEED | HEATER OPERATION | TRANS-PORT SPEED | HEATER OPERATION | TRANS-PORT SPEED | HEATER OPERATION |
| GREATER THAN OR EQUAL TO 0 AND LESS THAN 10 | V | FIFTH STATE | V | FIFTH STATE | V | FIFTH STATE |
| GREATER THAN OR EQUAL TO 10 AND LESS THAN 20 | V | FIFTH STATE | V | FIFTH STATE | V | FIFTH STATE |
| GREATER THAN OR EQUAL TO 20 AND LESS THAN 30 | ½ V | SIXTH STATE | V | FIFTH STATE | V | FIFTH STATE |
| GREATER THAN OR EQUAL TO 30 AND LESS THAN 40 | ½ V | SIXTH STATE | V | FIFTH STATE | V | FIFTH STATE |
| GREATER THAN OR EQUAL TO 40 AND LESS THAN 50 | ¼ V | SIXTH STATE | V | FIFTH STATE | V | FIFTH STATE |
| GREATER THAN OR EQUAL TO 50 AND LESS THAN 60 | ¼ V | SIXTH STATE | ½ V | SIXTH STATE | V | FIFTH STATE |
| GREATER THAN OR EQUAL TO 60 AND LESS THAN 70 | ¼ V | SIXTH STATE | ½ V | SIXTH STATE | ½ V | FIFTH STATE |
| GREATER THAN OR EQUAL TO 70 AND LESS THAN 80 | ¼ V | SIXTH STATE | ¼ V | SIXTH STATE | ½ V | FIFTH STATE |
| GREATER THAN OR EQUAL TO 80 AND LESS THAN 90 | ¼ V | SIXTH STATE | ¼ V | SIXTH STATE | ½ V | FIFTH STATE |
| GREATER THAN OR EQUAL TO 90 AND LESS THAN 100 | ¼ V | SIXTH STATE | ¼ V | SIXTH STATE | ¼ V | FIFTH STATE |
| GREATER THAN OR EQUAL TO 100 | ¼ V | SIXTH STATE | ¼ V | SIXTH STATE | ¼ V | SIXTH STATE |

TABLE 13

Third Table

| | ENVIRONMENT | | | | | |
|---|---|---|---|---|---|---|
| | SEGMENT K1 | | SEGMENT K2 | | SEGMENT K3 | |
| RECORDING DENSITY (%) | TRANS-PORT SPEED | HEATER OPERATION | TRANS-PORT SPEED | HEATER OPERATION | TRANS-PORT SPEED | HEATER OPERATION |
| GREATER THAN OR EQUAL TO 0 AND LESS THAN 10 | V | FIFTH STATE | V | FIFTH STATE | V | FIFTH STATE |
| GREATER THAN OR EQUAL TO 10 AND LESS THAN 20 | V | SIXTH STATE | V | FIFTH STATE | V | FIFTH STATE |
| GREATER THAN OR EQUAL TO 20 AND LESS THAN 30 | V | SIXTH STATE | V | SIXTH STATE | V | FIFTH STATE |
| GREATER THAN OR EQUAL TO 30 AND LESS THAN 40 | ½ V | SIXTH STATE | V | SIXTH STATE | V | SIXTH STATE |
| GREATER THAN OR EQUAL TO 40 AND LESS THAN 50 | ½ V | SIXTH STATE | ½ V | SIXTH STATE | V | SIXTH STATE |
| GREATER THAN OR EQUAL TO 50 AND LESS THAN 60 | ¼ V | SIXTH STATE | ½ V | SIXTH STATE | ½ V | SIXTH STATE |
| GREATER THAN OR EQUAL TO 60 AND LESS THAN 70 | ¼ V | SIXTH STATE | ¼ V | SIXTH STATE | ½ V | SIXTH STATE |
| GREATER THAN OR EQUAL TO 70 AND LESS THAN 80 | ¼ V | SIXTH STATE | ¼ V | SIXTH STATE | ¼ V | SIXTH STATE |
| GREATER THAN OR EQUAL TO 80 AND LESS THAN 90 | ¼ V | SIXTH STATE | ¼ V | SIXTH STATE | ¼ V | SIXTH STATE |
| GREATER THAN OR EQUAL TO 90 AND LESS THAN 100 | ¼ V | SIXTH STATE | ¼ V | SIXTH STATE | ¼ V | SIXTH STATE |
| GREATER THAN OR EQUAL TO 100 | ¼ V | SIXTH STATE | ¼ V | SIXTH STATE | ¼ V | SIXTH STATE |

| | ENVIRONMENT | | | | | |
|---|---|---|---|---|---|---|
| | SEGMENT K4 | | SEGMENT K5 | | SEGMENT K6 | |
| RECORDING DENSITY (%) | TRANS-PORT SPEED | HEATER OPERATION | TRANS-PORT SPEED | HEATER OPERATION | TRANS-PORT SPEED | HEATER OPERATION |
| GREATER THAN OR EQUAL TO 0 AND LESS THAN 10 | V | FIFTH STATE | V | FIFTH STATE | V | FIFTH STATE |
| GREATER THAN OR EQUAL TO 10 AND LESS THAN 20 | V | SIXTH STATE | V | FIFTH STATE | V | FIFTH STATE |
| GREATER THAN OR EQUAL TO 20 AND LESS THAN 30 | V | SIXTH STATE | V | SIXTH STATE | V | FIFTH STATE |
| GREATER THAN OR EQUAL TO 30 AND LESS THAN 40 | V | SIXTH STATE | V | SIXTH STATE | V | SIXTH STATE |
| GREATER THAN OR EQUAL TO 40 AND LESS THAN 50 | ½ V | SIXTH STATE | V | SIXTH STATE | V | SIXTH STATE |
| GREATER THAN OR EQUAL TO 50 AND LESS THAN 60 | ½ V | SIXTH STATE | ½ V | SIXTH STATE | V | SIXTH STATE |
| GREATER THAN OR EQUAL TO 60 AND LESS THAN 70 | ¼ V | SIXTH STATE | ½ V | SIXTH STATE | ½ V | SIXTH STATE |
| GREATER THAN OR EQUAL TO 70 AND LESS THAN 80 | ¼ V | SIXTH STATE | ¼ V | SIXTH STATE | ½ V | SIXTH STATE |
| GREATER THAN OR EQUAL TO 80 AND LESS THAN 90 | ¼ V | SIXTH STATE | ¼ V | SIXTH STATE | ¼ V | SIXTH STATE |
| GREATER THAN OR EQUAL TO 90 AND LESS THAN 100 | ¼ V | SIXTH STATE | ¼ V | SIXTH STATE | ¼ V | SIXTH STATE |
| GREATER THAN OR EQUAL TO 100 | ¼ V | SIXTH STATE | ¼ V | SIXTH STATE | ¼ V | SIXTH STATE |

TABLE 13-continued

Third Table

| RECORDING DENSITY (%) | ENVIRONMENT<br>SEGMENT K7<br>TRANSPORT SPEED | SEGMENT K7<br>HEATER OPERATION | SEGMENT K8<br>TRANSPORT SPEED | SEGMENT K8<br>HEATER OPERATION | SEGMENT K8<br>TRANSPORT SPEED | SEGMENT K8<br>HEATER OPERATION |
|---|---|---|---|---|---|---|
| GREATER THAN OR EQUAL TO 0 AND LESS THAN 10 | V | SIXTH STATE | V | FIFTH STATE | V | FIFTH STATE |
| GREATER THAN OR EQUAL TO 10 AND LESS THAN 20 | V | SIXTH STATE | V | FIFTH STATE | V | FIFTH STATE |
| GREATER THAN OR EQUAL TO 20 AND LESS THAN 30 | V | SIXTH STATE | V | FIFTH STATE | V | FIFTH STATE |
| GREATER THAN OR EQUAL TO 30 AND LESS THAN 40 | ½ V | SIXTH STATE | V | SIXTH STATE | V | FIFTH STATE |
| GREATER THAN OR EQUAL TO 40 AND LESS THAN 50 | ½ V | SIXTH STATE | V | SIXTH STATE | V | FIFTH STATE |
| GREATER THAN OR EQUAL TO 50 AND LESS THAN 60 | ¼ V | SIXTH STATE | V | SIXTH STATE | V | FIFTH STATE |
| GREATER THAN OR EQUAL TO 60 AND LESS THAN 70 | ¼ V | SIXTH STATE | ½ V | SIXTH STATE | V | FIFTH STATE |
| GREATER THAN OR EQUAL TO 70 AND LESS THAN 80 | ¼ V | SIXTH STATE | ½ V | SIXTH STATE | ½ V | FIFTH STATE |
| GREATER THAN OR EQUAL TO 80 AND LESS THAN 90 | ¼ V | SIXTH STATE | ¼ V | SIXTH STATE | ½ V | SIXTH STATE |
| GREATER THAN OR EQUAL TO 90 AND LESS THAN 100 | ¼ V | SIXTH STATE | ¼ V | SIXTH STATE | ½ V | SIXTH STATE |
| GREATER THAN OR EQUAL TO 100 | ¼ V | SIXTH STATE | ¼ V | SIXTH STATE | ¼ V | SIXTH STATE |

TABLE 14

Fourth Table

| RECORDING DENSITY (%) | ENVIRONMENT<br>SEGMENT K1<br>TRANSPORT SPEED | SEGMENT K1<br>HEATER OPERATION | SEGMENT K2<br>TRANSPORT SPEED | SEGMENT K2<br>HEATER OPERATION | SEGMENT K3<br>TRANSPORT SPEED | SEGMENT K3<br>HEATER OPERATION |
|---|---|---|---|---|---|---|
| GREATER THAN OR EQUAL TO 0 AND LESS THAN 10 | V | SIXTH STATE | V | FIFTH STATE | V | FIFTH STATE |
| GREATER THAN OR EQUAL TO 10 AND LESS THAN 20 | V | SIXTH STATE | V | SIXTH STATE | V | FIFTH STATE |
| GREATER THAN OR EQUAL TO 20 AND LESS THAN 30 | ½ V | SIXTH STATE | V | SIXTH STATE | V | SIXTH STATE |
| GREATER THAN OR EQUAL TO 30 AND LESS THAN 40 | ½ V | SIXTH STATE | ½ V | SIXTH STATE | V | SIXTH STATE |
| GREATER THAN OR EQUAL TO 40 AND LESS THAN 50 | ¼ V | SIXTH STATE | ½ V | SIXTH STATE | ½ V | SIXTH STATE |
| GREATER THAN OR EQUAL TO 50 AND LESS THAN 60 | ¼ V | SIXTH STATE | ¼ V | SIXTH STATE | ½ V | SIXTH STATE |
| GREATER THAN OR EQUAL TO 60 AND LESS THAN 70 | ¼ V | SIXTH STATE | ¼ V | SIXTH STATE | ¼ V | SIXTH STATE |
| GREATER THAN OR EQUAL TO 70 AND LESS THAN 80 | ¼ V | SIXTH STATE | ¼ V | SIXTH STATE | ¼ V | SIXTH STATE |
| GREATER THAN OR EQUAL TO 80 AND LESS THAN 90 | ¼ V | SIXTH STATE | ¼ V | SIXTH STATE | ¼ V | SIXTH STATE |
| GREATER THAN OR EQUAL TO 90 AND LESS THAN 100 | ¼ V | SIXTH STATE | ¼ V | SIXTH STATE | ¼ V | SIXTH STATE |
| GREATER THAN OR EQUAL TO 100 | ¼ V | SIXTH STATE | ¼ V | SIXTH STATE | ¼ V | SIXTH STATE |

| RECORDING DENSITY (%) | ENVIRONMENT<br>SEGMENT K4<br>TRANSPORT SPEED | SEGMENT K4<br>HEATER OPERATION | SEGMENT K5<br>TRANSPORT SPEED | SEGMENT K5<br>HEATER OPERATION | SEGMENT K6<br>TRANSPORT SPEED | SEGMENT K6<br>HEATER OPERATION |
|---|---|---|---|---|---|---|
| GREATER THAN OR EQUAL TO 0 AND LESS THAN 10 | V | FIFTH STATE | V | FIFTH STATE | V | FIFTH STATE |
| GREATER THAN OR EQUAL TO 10 AND LESS THAN 20 | V | SIXTH STATE | V | FIFTH STATE | V | FIFTH STATE |
| GREATER THAN OR EQUAL TO 20 AND LESS THAN 30 | V | SIXTH STATE | V | SIXTH STATE | V | FIFTH STATE |
| GREATER THAN OR EQUAL TO 30 AND LESS THAN 40 | ½ V | SIXTH STATE | V | SIXTH STATE | V | SIXTH STATE |
| GREATER THAN OR EQUAL TO 40 AND LESS THAN 50 | ½ V | SIXTH STATE | ½ V | SIXTH STATE | V | SIXTH STATE |
| GREATER THAN OR EQUAL TO 50 AND LESS THAN 60 | ¼ V | SIXTH STATE | ½ V | SIXTH STATE | ½ V | SIXTH STATE |
| GREATER THAN OR EQUAL TO 60 AND LESS THAN 70 | ¼ V | SIXTH STATE | ¼ V | SIXTH STATE | ½ V | SIXTH STATE |
| GREATER THAN OR EQUAL TO 70 AND LESS THAN 80 | ¼ V | SIXTH STATE | ¼ V | SIXTH STATE | ¼ V | SIXTH STATE |
| GREATER THAN OR EQUAL TO 80 AND LESS THAN 90 | ¼ V | SIXTH STATE | ¼ V | SIXTH STATE | ¼ V | SIXTH STATE |
| GREATER THAN OR EQUAL TO 90 AND LESS THAN 100 | ¼ V | SIXTH STATE | ¼ V | SIXTH STATE | ¼ V | SIXTH STATE |
| GREATER THAN OR EQUAL TO 100 | ¼ V | SIXTH STATE | ¼ V | SIXTH STATE | ¼ V | SIXTH STATE |

| RECORDING DENSITY (%) | ENVIRONMENT<br>SEGMENT K7<br>TRANSPORT SPEED | SEGMENT K7<br>HEATER OPERATION | SEGMENT K8<br>TRANSPORT SPEED | SEGMENT K8<br>HEATER OPERATION | SEGMENT K8<br>TRANSPORT SPEED | SEGMENT K8<br>HEATER OPERATION |
|---|---|---|---|---|---|---|
| GREATER THAN OR EQUAL TO 0 AND LESS THAN 10 | V | SIXTH STATE | V | FIFTH STATE | V | FIFTH STATE |
| GREATER THAN OR EQUAL TO 10 AND LESS THAN 20 | V | SIXTH STATE | V | FIFTH STATE | V | FIFTH STATE |
| GREATER THAN OR EQUAL TO 20 AND LESS THAN 30 | ½ V | SIXTH STATE | V | FIFTH STATE | V | FIFTH STATE |

TABLE 14-continued

| Fourth Table | | | | | | |
|---|---|---|---|---|---|---|
| GREATER THAN OR EQUAL TO 30 AND LESS THAN 40 | ½ V | SIXTH STATE | V | SIXTH STATE | V | FIFTH STATE |
| GREATER THAN OR EQUAL TO 40 AND LESS THAN 50 | ¼ V | SIXTH STATE | V | SIXTH STATE | V | FIFTH STATE |
| GREATER THAN OR EQUAL TO 50 AND LESS THAN 60 | ¼ V | SIXTH STATE | ½ V | SIXTH STATE | V | FIFTH STATE |
| GREATER THAN OR EQUAL TO 60 AND LESS THAN 70 | ¼ V | SIXTH STATE | ½ V | SIXTH STATE | ½ V | FIFTH STATE |
| GREATER THAN OR EQUAL TO 70 AND LESS THAN 80 | ¼ V | SIXTH STATE | ¼ V | SIXTH STATE | ½ V | FIFTH STATE |
| GREATER THAN OR EQUAL TO 80 AND LESS THAN 90 | ¼ V | SIXTH STATE | ¼ V | SIXTH STATE | ½ V | SIXTH STATE |
| GREATER THAN OR EQUAL TO 90 AND LESS THAN 100 | ¼ V | SIXTH STATE | ¼ V | SIXTH STATE | ¼ V | SIXTH STATE |
| GREATER THAN OR EQUAL TO 100 | ¼ V | SIXTH STATE | ¼ V | SIXTH STATE | ¼ V | SIXTH STATE |

In step S12, in a case in which the paper is determined to be a small size, the process proceeds to step S13 and the operation of the heat roller pair 11 is controlled using the first table (Table 11). In step S12, in a case in which the paper is determined to be a large size, the process proceeds to step S14 and the operation of the heat roller pair 11 is controlled using the second table (Table 12).

In step S15, in a case in which the paper is determined to be a small size, the process proceeds to step S16 and the operation of the heat roller pair 11 is controlled using the third table (Table 13). In step S15, in a case in which the paper is determined to be a large size, the process proceeds to step S17 and the operation of the heat roller pair 11 is controlled using the fourth table (Table 14).

As described above, due to the control unit 27 controlling the heat roller pair 11 based on a plurality of conditions, using a plurality of conditions as the conditions when performing the drying of paper using the heat roller pair 11, it is possible to control the heat roller pair 11 more suitably, and thus, it is possible to further reduce the power consumption in the heat roller pair 11.

In the present embodiment, although the recording system 1 is configured by combining the recording unit 2, the relay unit 3, and the after-treatment unit 4 which are individual units, it is also possible to adopt a recording system in which the recording unit 2, the relay unit 3, and the after-treatment unit 4 are configured integrally.

Even when a relay unit and an after-treatment unit having other configurations from those of the relay unit 3 and the after-treatment unit 4 are connected to the recording unit 2, the recording unit 2 is configured to be capable of executing control of the various operation of the heat roller pair 11 using the control of the control unit 27.

Although a description is given of examples of a recording unit which serves as the recording apparatus according to the disclosure and a recording system which is provided with the recording unit, the disclosure is not limited to the embodiments and may be modified in various ways within the scope of the disclosure described in the claims, and the modifications should be construed as being included in the disclosure.

What is claimed is:

1. An after-treatment unit comprising:

a post processing section that is configured to execute post-processing on a medium after a recording section applies a liquid to the medium to thereby perform a recording on the medium, a drying unit configured to contact the medium and perform drying of the liquid on the medium after the recording by heating the medium to avoid jamming, which is caused when the medium is curled; and a control unit configured to control operation of the drying unit, wherein the drying unit is configured such that a heating region is divided into a central subdivision region and non-central subdivision regions in a width direction which intersects a medium transport direction and to be capable of individually modifying a heating state for each subdivision region according to a width size of the medium, wherein the drying unit is configured to include a roller pair of a first roller and a second roller, wherein the roller pair pinches the medium between the first roller and the second roller, wherein at least the first roller is heated, wherein the first roller has a plurality of heat sources in the width direction which intersects the medium transport direction, and wherein the control unit is configured to adjust a power of each heat source individually such that a heat state of the central subdivision region and a heat state of the non-central subdivision regions are different from each other according to the width size of the medium.

2. The after-treatment unit according to claim 1, wherein the control unit is configured to control each heat source so that a temperature of each heat source differs in the width direction when the drying of the medium is performed.

3. The after-treatment unit according to claim 1, wherein, when the width size of the medium is grater then a predetermined width size, the control unit is configured to set the heating state of the central subdivision region to a first state, and set the heating state of the non-central subdivision regions to a second state in which more heating is performed than in the first state.

4. The after-treatment unit according to claim 1, wherein, using a discharge amount of the liquid as a condition when performing the drying, in the width direction of the medium, the control unit is configured to set the heating state of the subdivision regions corresponding to a recording region in which the discharge amount of the liquid is less than or equal to a predetermined threshold value to the first state, and set the heating state of the subdivision regions corresponding to a recording region in which the discharge amount of the liquid exceeds the predetermined threshold value to the second state in which more heating is performed than in the first state.

5. The after-treatment unit according to claim 1, wherein at least one of the heat sources is controlled by the control unit not to be heated when drying the medium.

6. The after-treatment unit according to claim 1, wherein the second roller has a plurality of heat sources in the width direction which intersects the medium transport direction.

7. The after-treatment unit according to claim 1, wherein when a width of the medium is greater than a predetermined threshold, the control unit sets the heating state of the subdivision regions corresponding to regions other than end portions in the width direction to a first state, and sets the heating state of the subdivision regions corresponding to the end portions in the width direction of the medium to a second state in which more heating is performed than the first state.

8. The after-treatment unit according to claim 1, wherein, when the width size of the medium is not greater than a predetermined width size, the control unit is configured to set the heating state of the central subdivision region to a second state, and set the heating state of the non-central subdivision regions to a first state in which less heating is performed than in the second state.

9. An after-treatment unit comprising:

a post processing section that is configured to execute post-processing on a medium after a recording section applies a liquid to the medium to thereby perform recording on the medium, a drying unit which is configured to contact the medium and perform drying of the liquid on the medium after the recording by heating the medium to avoid jamming, which is caused when the medium is curled; and a control unit which is configured to control operation of the drying unit, wherein the drying unit is configured such that a heating region is divided into a central subdivision region and non-central subdivision regions in a width direction which intersects a medium transport direction and to be capable of individually modifying a heating state for each subdivision region according to a width size of the medium, wherein the drying unit is configured to include a roller pair of a first roller and a second roller, wherein the roller pair pinches the medium between the first roller and the second roller, wherein the first roller is heated with a first internal heater internal to the first roller, and the second roller is heated with a second internal heater internal to the second roller, wherein the control unit is configured to adjust a temperature of each of the first internal heater and the second internal heater individually, and the control unit is configured to adjust a power such that a heat state of the central subdivision region and a heat state of the non-central subdivision regions are different from each other according to the width size of the medium.

10. The after-treatment unit according to claim 9, wherein the control unit is configured to control each of a first internal heat source and a second internal heat source so that a temperature of each of the first roller or the second roller differs when the drying of the medium is performed.

11. The after-treatment unit according to claim 9, wherein, when the width size of the medium is greater than a predetermined width size, the control unit is configured to set the heating state of the central subdivision region to a first state, and set the heating state of the non-central subdivision regions to a second state in which more heating is performed than in the first state.

12. The after-treatment unit according to claim 9, wherein, using a discharge amount of the liquid as a condition when performing the drying, in the width direction of the medium, the control unit is configured to set the heating state of the subdivision regions corresponding to a recording region in which the discharge amount of the liquid is less than or equal to a predetermined threshold value to the first state, and set the heating state of the subdivision regions corresponding to a recording region in which the discharge amount of the liquid exceeds the predetermined threshold value to the second state in which more heating is performed than in the first state.

13. The after-treatment unit according to claim 9, wherein at least one of the first internal heater and the second internal heater is controlled by the control unit not to be heated when drying the medium.

14. The after-treatment unit according to claim 9, wherein, when the width size of the medium is not greater than a predetermined width size, the control unit is configured to set the heating state of the central subdivision region to a second state, and set the heating state of the non-central subdivision regions to a first state in which less heating is performed than in the second state.

15. A relay unit comprising:

a relay unit path that is configured to transport a medium after recording from a recording unit to an after-treatment unit, wherein the recording unit applied liquid to the medium to perform the recording, a drying unit which is configured to contact the medium and perform drying of the liquid on the medium after the recording by heating the medium to avoid jamming, which is caused when the medium is curled; and a control unit which is configured to control operation of the drying unit, wherein the drying unit is configured such that a heating region is divided into a central subdivision region and non-central subdivision regions in a width direction which intersects a medium transport direction and to be capable of individually modifying a heating state for each subdivision region according to a width size of the medium, wherein the drying unit is configured to include a roller pair of a first roller and a second roller, wherein the roller pair pinches the medium between the first roller and the second roller, wherein at least one of the first roller and the second roller is heated, wherein at least one of the first roller and the second roller has a plurality of heat sources in the width direction which intersects the medium transport direction, and wherein the control unit is configured to adjust a temperature of each heat source individually such that a heat state of the central subdivision region and a heat state of the non-central subdivision regions are different from each other according to the width size of the medium.

16. The relay unit according to claim 15, wherein the control unit is configured to control each heat source so that a temperature of each heat source differs in the width direction when the drying of the medium is performed.

17. The relay unit according to claim 15, wherein, when the width size of the medium is greater than a predetermined width size, the control unit is configured to set the heating state of the central subdivision region to a first state, and set the heating state of the non-central subdivision regions to a second state in which more heating is performed than in the first state.

18. The relay unit according to claim 15, wherein, using a discharge amount of the liquid as a condition when performing the drying, in the width direction of the medium, the control unit is configured to set the heating state of the subdivision regions corresponding to a recording region in which the discharge amount of the liquid is less than or equal to a predetermined threshold value to the first state, and set the heating state of the subdivision regions corresponding to a recording region in which the discharge amount of the liquid exceeds the predetermined threshold value to the second state in which more heating is performed than in the first state.

19. The relay unit according to claim 15, wherein at least one of the heat sources is controlled by the control unit not to be heated when drying the medium.

20. The relay unit according to claim 15,

Wherein, when the width size of the medium is not greater than a predetermined width size, the control unit is configured to set the heating state of the central subdivision region to a second state, and set the heating state of the non-central subdivision regions to a first state in which less heating is performed than in the second state.

* * * * *